US008732500B2

(12) United States Patent
Katsumata

(10) Patent No.: US 8,732,500 B2
(45) Date of Patent: May 20, 2014

(54) INFORMATION PROCESSING SYSTEM, MANAGEMENT APPARATUS, AND MANAGEMENT METHOD OF EXECUTING A PROCESSING SEQUENCE INCLUDING A PLURALITY OF PROCESSING STEPS

(71) Applicant: Fujitsu Limited, Kawasaki (JP)

(72) Inventor: Michiyuki Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/768,035

(22) Filed: Feb. 15, 2013

(65) Prior Publication Data

US 2013/0290763 A1    Oct. 31, 2013

Related U.S. Application Data

(63) Continuation of application No. PCT/JP2010/064043, filed on Aug. 20, 2010.

(51) Int. Cl.
  *G06F 1/00* (2006.01)
  *G06F 15/173* (2006.01)

(52) U.S. Cl.
  USPC ............................ 713/323; 713/330; 709/223

(58) Field of Classification Search
  USPC ......................................... 713/300, 323, 330
  See application file for complete search history.

(56) References Cited

U.S. PATENT DOCUMENTS

| | | | | |
|---|---|---|---|---|
| 4,907,150 A | * | 3/1990 | Arroyo et al. | 713/323 |
| 5,276,890 A | * | 1/1994 | Arai | 713/323 |
| 5,828,842 A | * | 10/1998 | Sugauchi et al. | 709/223 |
| 6,901,503 B2 | * | 5/2005 | Barlow et al. | 712/210 |
| 7,502,635 B1 | * | 3/2009 | Horikoshi et al. | 455/574 |
| 7,730,330 B1 | * | 6/2010 | Fleischmann et al. | 713/300 |
| 7,949,607 B2 | * | 5/2011 | Ito | 705/59 |
| 8,037,165 B2 | * | 10/2011 | Kameyama et al. | 709/223 |
| 2003/0033464 A1 | | 2/2003 | Larson et al. | |
| 2009/0022244 A1 | | 1/2009 | Kameyama et al. | |

FOREIGN PATENT DOCUMENTS

| | | |
|---|---|---|
| JP | 59-14054 | 1/1984 |
| JP | 2003-150409 | 5/2003 |
| JP | 2007-316837 | 12/2007 |
| WO | WO 2007/097031 | 8/2007 |

OTHER PUBLICATIONS

PICMG® 3.0 Revision 2.0 AdvanctedTCA® Base Specification—PCI Industrial Computers—Manufactures Group (Oct. 28, 2005), pp. 3-31 to 3-53.
PICMG 3.0 Revision 3.0 AdancedTCA Base Specification (Feb. 19, 2008), pp. 3-9, 3-10, 3-23, 3-179 to 3-182 and 3-212 to 3-18.

(Continued)

*Primary Examiner* — Suresh Suryawanshi
(74) *Attorney, Agent, or Firm* — Fujitsu Patent Center

(57) ABSTRACT

An information processing apparatus executes a processing sequence including a plurality of processing steps. A management apparatus makes the information processing apparatus execute the processing steps in predetermined order, and thereby manages execution of the processing sequence. The management apparatus takes over execution management of the processing sequence from a first management apparatus. At this time, an information acquisition unit of the management apparatus acquires state information indicating a progress state of the processing sequence from the information processing apparatus. A control unit of the management apparatus makes the information processing apparatus continue execution of an unexecuted processing step of the processing sequence based on the state information acquired by the information acquisition unit.

13 Claims, 26 Drawing Sheets

(56) References Cited

OTHER PUBLICATIONS

Intel Hewlett-Packard NEC Dell, IPMI—Intelligent Platform Management Interface Specification v2.0, revision 1.0 (Jun. 12, 2009 Markup), pp. ii-xxvii, 1-602 and I-XIV.

Intel Hewlett-Packard NEC Dell, IPMI—Platform Management FRU Information Storage Definition v1.0 Document Revision 1.1 (Sep. 27, 1999) pp. ii-vi and 1-27.

International Search Report, mailed in connection with PCT-JP2010-064043 and mailed Nov. 2, 2010 (with English translation).

* cited by examiner

INFORMATION PROCESSING SYSTEM, MANAGEMENT APPARATUS, AND MANAGEMENT METHOD OF EXECUTING A PROCESSING SEQUENCE INCLUDING A PLURALITY OF PROCESSING STEPS

CROSS-REFERENCE TO RELATED APPLICATION

This application is a continuation application of International Application PCT/JP2010/064043 filed on Aug. 20, 2010 and designated the U.S., the entire contents of which are incorporated herein by reference.

FIELD

The embodiments discussed herein relate to an information processing system, a management apparatus, and a management method of an information processing apparatus.

BACKGROUND

A system has been widely spread that manages processing of information processing apparatuses, such as a computer, from an external apparatus. For example, in an ATCA (Advanced Telecom Computing Architecture) standard ("PICMG 3.0 Revision 2.0 Advanced TCA Base Specification", PCI Industrial Computer Manufactures Group, Oct. 28, 2005, P 3-31 to 3-38) which defines physical/logical specifications of a blade server system, a plurality of states has been prescribed in relation to progress of start-up processing in a server blade, which is an information processing apparatus of the blade server system. Additionally, a management apparatus (shelf manager) provided in a chassis etc. of the blade server system proceeds with the start-up processing of the server blade by managing transition of a state in the server blade. The management apparatus sequentially acquires information, such as power consumption, from the server blade in a process of making a state of the server blade transition, and predicts power demand by hardware resources, such as devices including the server blade in the chassis. If the predicted power demand then falls within a range capable of being supplied from a power supply apparatus in the chassis, the management apparatus makes the server blade start to supply power from the power supply apparatus. As described above, start-up processing in the server blade is made to proceed in previously decided order under management of the management apparatus, and thereby the server blade is reliably started in a state where reliability of the whole blade server system is maintained.

It is to be noted that as another example of a system having an information processing apparatus and a management apparatus, there is included a server system provided with: in a chassis, a plurality of processor cards; and a server management card that detects a rotational speed and temperature of a fan in each processor card, and detects insertion and extraction of the processor card (for example, see Japanese Laid-open Patent Publication No. 2003-150409).

Meanwhile, as a method to improve fault tolerance of a system, there is included a method for preparing a standby system apparatus in addition to an operation system apparatus. For example, there is disclosed a method in which when a service processor of an operation system, which is the system under operation of processing, breaks down in a system in which consistency of information is achieved between a main body apparatus and a service processor, the main body apparatus and a spare service processor are connected to each other, and a spare service processing apparatus reads information held by the main body apparatus (for example, see Japanese Laid-open Patent Publication No. 59-14054).

Meanwhile, it is considered that also in a server system conforming to the AICA standard, for the purpose of improvement in the fault tolerance of the system, a management apparatus of a standby system that stands by while a management apparatus of an operation system is operating is installed in addition to the management apparatus of the operation system, and thereby the management apparatus is made to be redundant. However, when the management apparatus is made to be redundant, there has been a problem of how the management apparatus of the standby system takes over control of state transition in a server blade when the management apparatus of the operation system stops during execution of start-up processing in the server blade, which is an information processing apparatus that performs processing.

As mentioned above, the management apparatus of the operation system proceeds with the start-up processing of the server blade in previously decided order. Even when the management apparatus of the standby system takes over the control of the start-up processing of the server blade, the order of the start-up processing of the server blade is preferably followed. If the order of the start-up processing of the server blade is changed when the management apparatus of the standby system takes over the control of the start-up processing of the server blade, the start-up processing of the server blade stops, and is not normally completed. For example, when a management apparatus of the operation system is changed during the start-up processing of the server blade, if the management apparatus that has newly operated as the operation system performs control so that start-up processing of the server blade is executed from the beginning, the order of the start-up processing is not followed, and thus the start-up processing is not normally completed.

In addition, it is considered that not only in the above-described server system, but also in another system that manages progress of a processing sequence in an information processing apparatus by a management apparatus, a management apparatus of the standby system is installed in addition to a management apparatus of the operation system. Additionally, even in the system as described above in which the management apparatus of the operation system manages the processing sequence in the information processing apparatus and which has the management apparatus of the standby system, there has been a problem of how the management apparatus of the standby system takes over control to the information processing apparatus and continues the processing of the information processing apparatus, when the management apparatus of the operation system stops during execution of processing in the information processing apparatus.

SUMMARY

According to one aspect, there is provided an information processing system including: an information processing apparatus that executes a processing sequence including a plurality of processing steps; and a plurality of management apparatuses that manages execution of the processing sequence by making the information processing apparatus execute the processing steps in predetermined order, wherein one of the management apparatuses operates as an operation system that performs execution management of the processing sequence, and each of others of the management apparatuses operates as a standby system that stands by until taking over the execution management of the processing sequence from the management apparatus operating as the operation system, wherein each of the management apparatuses, when transitioning from the standby system to the operation system and taking over the execution management of the processing sequence from another management apparatus that has been the operation system, acquires state information indicating a progress state of the processing sequence from the information processing apparatus, and makes the information processing apparatus continue execution of an unexecuted processing step of the processing sequence based on the acquired state information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
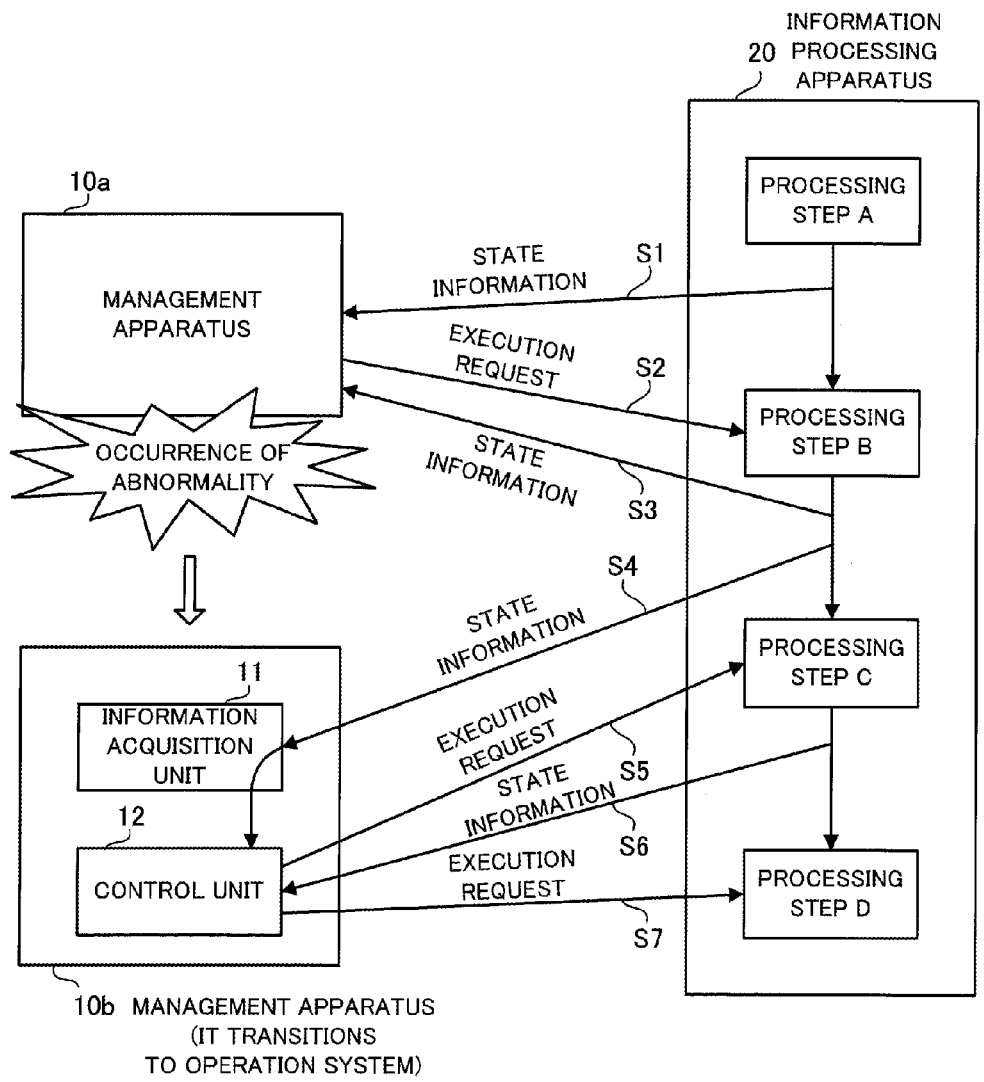
FIG. 1 illustrates a configuration example of an information processing system according to a first embodiment.

Several embodiments will be described in detail below with reference to the accompanying drawings, wherein like reference numerals refer to like elements throughout.

First Embodiment

FIG. 1 illustrates a configuration example of an information processing system according to a first embodiment.

The information processing system illustrated in FIG. 1 includes a plurality of management apparatuses 10a and 10b, and an information processing apparatus 20. The management apparatuses 10a and 10b, and the information processing apparatus 20 are, for example, achieved as computers.

The management apparatuses 10a and 10b manage execution of a processing sequence in the information processing apparatus 20. One of the management apparatuses 10a and 10b operates as an operation system that manages execution of the processing sequence in the information processing apparatus 20. In addition, the other management apparatus operates as a standby system that stands by until it takes over execution management of the processing sequence in the information processing apparatus 20 from the management apparatus of the operation system. For example, when the management apparatus of the operation system stops due to occurrence of abnormality, the management apparatus of the standby system transitions from the standby system to the operation system, and takes over the execution management of the processing sequence from the management apparatus that was the operation system.

In the example illustrated in FIG. 1, the management apparatus of the operation system makes the information processing apparatus 20 execute the processing sequence of processing steps A, B, C, and D in that order. In a processing content in each processing step executed by the information processing apparatus 20, for example, processing may be included that performs predetermined processing according to a request of the management apparatus of the operation system, and responds to the management apparatus of the operation system. Alternatively, processing may be included that is executed according to the request of the management apparatus of the operation system, but does not need a response to the management apparatus of the operation system.

The management apparatuses 10a and 10b each have an information acquisition unit 11 and a control unit 12. Processing of these information acquisition unit 11 and control unit 12 is executed when one management apparatus that was the standby system takes over the execution management of the processing sequence from the other management apparatus that was the operation system. Here, for easier understanding of the description, as an example, there will be described processing of the information acquisition unit 11 and the control unit 12 that the management apparatus 10b includes.

When the management apparatus 10b transitions from the standby system to the operation system, and takes over the execution management of the processing sequence from the other management apparatus 10a that was the operation system, the information acquisition unit 11 acquires state information indicating a progress state of the processing sequence from the information processing apparatus 20. The information acquisition unit 11 executes the processing, for example, when it detects that the management apparatus 10a has stopped, or that reset has been generated in the management apparatus 10a. It is to be noted that the state information may just be the information that enables discrimination on to which stage the processing sequence has been executed in the information processing apparatus 20. For example, the state information is the information indicating a processing step lastly executed by the information processing apparatus 20. In addition, the state information may be the information indicating a state that transitions whenever the information processing apparatus 20 executes a processing step.

The control unit 12 makes the information processing apparatus 20 continue execution of unexecuted processing steps of the processing steps included in the processing sequence based on the state information acquired by the information acquisition unit 11. The control unit 12 makes the information processing apparatus 20 execute the unexecuted processing steps, and thereby the execution management of the processing sequence by the management apparatus 10a is taken over by the management apparatus 10b. Namely, execution of the processing sequence in the information processing apparatus 20 is restarted from a head processing step of the unexecuted processing steps. After that, a processing procedure similar to an execution management procedure of the processing sequence by the management apparatus 10a is executed by the management apparatus 10b.

Next, with reference to FIG. 1, there will be described an example of a processing procedure when execution management of the processing sequence by the management apparatus 10a is taken over to the management apparatus 10b. It is to be noted that in the description below, as an example, execution of the processing sequence in the information processing apparatus 20 is managed in the following procedure. The information processing apparatus 20 notifies the management apparatus 10a of the operation system of state information indicating a processing step execution of which has been ended whenever ending execution of each processing step. The management apparatus 10a that received a notification recognizes the processing step execution of which has been ended by the information processing apparatus 20 based on the notified state information, and makes the information processing apparatus 20 execute a next processing step of the recognized processing step. The management apparatus, for example, makes the information processing apparatus 20 start the first processing decided in the next processing step, and thereby makes it execute the processing step.

First, in an initial state, a processing sequence is executed in the information processing apparatus 20 under management of the management apparatus 10a of the operation system. When ending processing of a processing step A in the processing sequence, the information processing apparatus 20 transmits to the management apparatus 10a state information indicating that execution of the processing step A has been ended (step S1). When receiving the state information indicating the end of the processing step A from the information processing apparatus 20, the management apparatus 10a requests execution of a next processing step B to the information processing apparatus 20 (step S2). When executing the processing step B according to the request of the management apparatus 10a, and ending execution of the processing step B, the information processing apparatus 20 transmits to the management apparatus 10a state information indicating that execution of the processing step B has been ended (step S3).

Here, assume that the management apparatus 10b that was the standby system transitions to the operation system that manages the information processing apparatus 20, for example, due to break-down of the management apparatus 10a, or the like. At this time, the information acquisition unit 11 of the management apparatus 10b acquires state information from the information processing apparatus 20 (step S4). For example, the information acquisition unit 11 of the management apparatus 10b requests notification of state information to the information processing apparatus 20, and the information processing apparatus 20 that received the notification request notifies the management apparatus 10b of the state information.

When the information acquisition unit 11 acquires the state information from the information processing apparatus 20, the control unit 12 of the management apparatus 10b determines from the acquired state information that execution of the processing step B in the information processing apparatus 20 has been ended, and requests execution of a next processing step C to the information processing apparatus 20 (step S5).

When executing the processing step C according to the request of the control unit 12 of the management apparatus 10b, and ending the execution thereof, the information processing apparatus 20 transmits to the management apparatus 10b state information indicating that execution of the processing step C has been ended (step S6). When receiving the state information from the information processing apparatus 20, the control unit 12 of the management apparatus 10b requests execution of a next processing step D to the information processing apparatus 20 (step S7). The information processing apparatus 20 executes the processing step D according to the request of the control unit 12.

In the above processing, the management apparatus 10b acquires the state information from the information processing apparatus 20, and thereby recognizes the processing steps already executed by the information processing apparatus 20. The management apparatus 10b then determines a processing step to be executed next by the information processing apparatus 20, and makes the information processing apparatus 20 execute the processing step. As a result, the management apparatus 10b takes over execution management of the processing sequence that has been executed by the management apparatus 10a, while following processing order in the information processing apparatus 20. In addition, in the information processing apparatus 20, even though the management apparatus of the operation system that manages the information processing apparatus 20 itself is changed during execution of the processing sequence, the processing sequence is continued under control of the changed management apparatus of the operation system. Accordingly, it becomes possible to proceed with processing in the information processing apparatus 20.

Next, as an example of an information processing system, an embodiment will be described when a blade server system conforming to the ATCA standard is applied.

Second Embodiment

Figure 2:
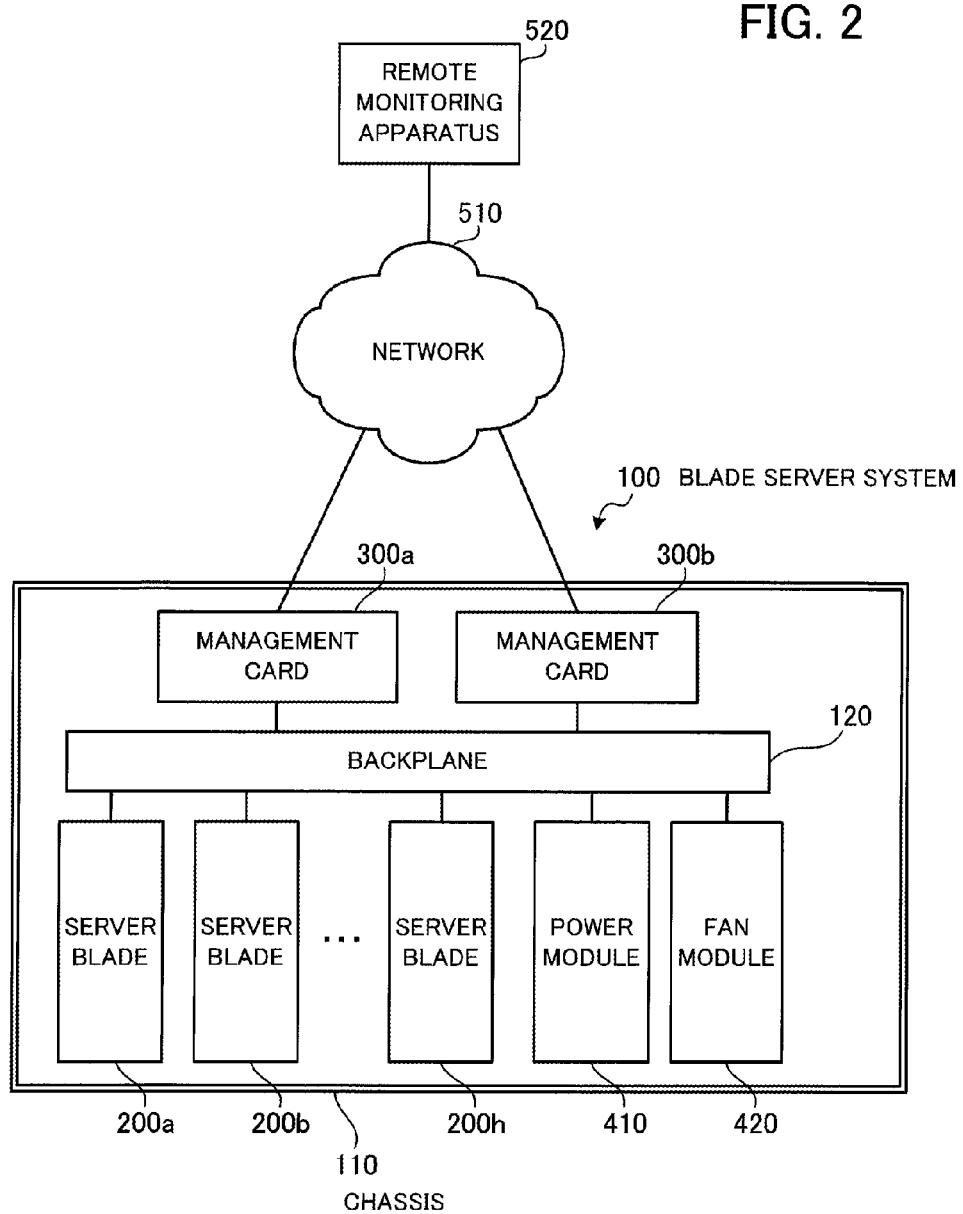
FIG. 2 illustrates a configuration example of a blade server system as an information processing system according to a second embodiment.

FIG. 2 illustrates a configuration example of a blade server system as an information processing system according to a second embodiment.

A blade server system 100 includes a chassis 110, which is a housing provided with a plurality of slots, and a substrate called a blade is attachable to each slot. A backplane 120 that includes a bus through which data is transmitted and received, a power line, and the like is provided inside the chassis 110, and the blades attached to the slots are connected to one another through the backplane 120.

The blade server system 100 illustrated in FIG. 2 includes one or more server blades as a blade. As an example, a maximum of eight server blades 200*a* to 200*h* are assumed to be attachable to the blade server system 100 of the present embodiment. Each of the server blades 200*a* to 200*h* is the blade that includes devices as hardware resources, such as a CPU (Central Processing Unit) and a storage device, and works as various servers. The server blades 200*a* to 200*h* are, for example, the servers that provide communication service.

In addition, the blade server system 100 includes management cards 300*a* and 300*b*. The management cards 300*a* and 300*b* are also blades inserted in predetermined slots in the chassis 110, respectively.

The management cards 300*a* and 300*b* control each blade mounted in the chassis 110. For example, the management cards 300*a* and 300*b* perform control of power distribution from a power module 410 to each blade in the chassis 110, monitoring of occurrence of abnormality in each blade, control of a rotational speed of a fan in a fan module 420 according to a temperature detection result in each blade, and the like. In addition, as will be mentioned later, the management cards 300*a* and 300*b* each also have a function that controls a processing sequence at the time of start-up and power-off of the server blades 200*a* to 200*h*.

Furthermore, the management cards 300*a* and 300*b* may also be connected to an external network 510 by a communication module or the like to thereby control each blade in the chassis 110 according to a request of a remote monitoring apparatus 520 connected to the network 510. The network 510 is, for example, a LAN (Local Area Network). It is to be noted that the remote monitoring apparatus 520 may monitor occurrence of abnormality in each blade mounted in the chassis 110 based on information that either of the management cards 300*a* and 300*b* notifies of.

It is to be noted that one of these two management cards 300*a* and 300*b* operates as an operation system, which is the system under operation of processing, and the other one operates as a standby system that backs up the operation system management card during operation of the operation system. In the description below, the management card operating as the operation system of the management cards 300*a* and 300*b* is referred to as an "operation system management card", and the management card operating as the standby system is referred to as a "standby system management card".

In addition, the power module 410 and the fan module 420 are mounted in the chassis 110 of the blade server system 100. The power module 410 supplies power in common to apparatuses mounted in the chassis 110 through the backplane 120. The fan module 420 rotates the fan according to control from the management cards 300*a* and 300*b*, and adjusts a temperature in the chassis 110.

Figure 3:
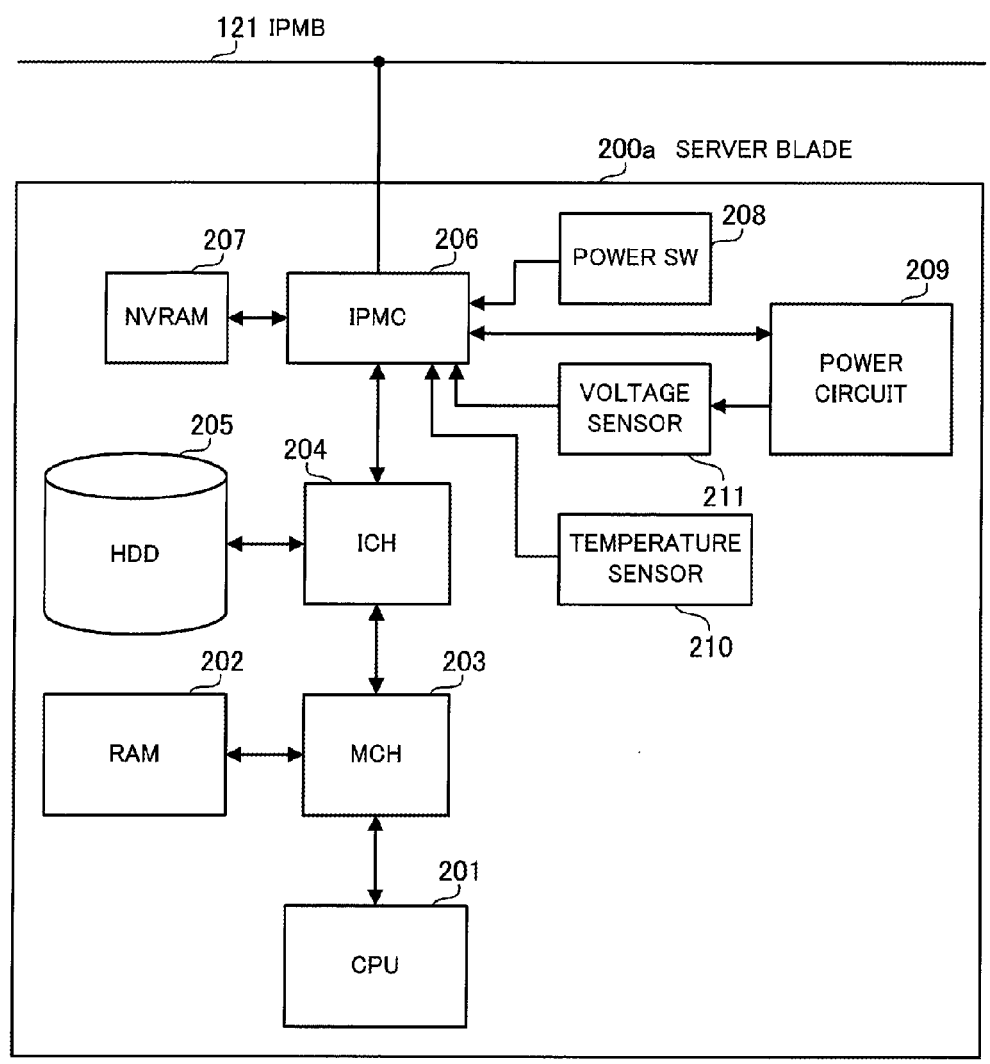
FIG. 3 illustrates a hardware configuration example of a server blade.

FIG. 3 illustrates a hardware configuration example of a server blade. It is to be noted that although the configuration example of the server blade 200*a* is illustrated in FIG. 3 as the example, the other server blades 200*b* to 200*h* may just have a similar configuration in FIG. 3.

The server blade 200*a* includes: a CPU 201; a RAM (Random Access Memory) 202; an MCH (Memory Controller Hub) 203; an ICH (In/Out Controller Hub) 204; an HDD (Hard Disk Drive) 205; an IPMC (Intelligent Platform Management Controller) 206; an NVRAM (Non Volatile RAM) 207; a power switch 208; a power circuit 209; a temperature sensor 210; and a voltage sensor 211.

The CPU 201 totally controls the whole server blade 200*a*. The RAM 202 is used as a main storage device of the server blade 200*a*, and temporarily stores at least a part of a program that the CPU 201 is made to execute, and various data needed for processing by the program.

The MCH 203 relays data between each of the CPU 201, RAM 202, and ICH 204. The ICH 204 relays data between each of the MCH 203, HDD 205, and IPMC 206.

The HDD 205 is used as a secondary storage device of the server blade 200*a*, and stores the program executed by the CPU 201, various data needed for the execution, and the like. It is to be noted that as the secondary storage device, for example, a semiconductor storage device, such as a flash memory, may be used.

The IPMC 206 communicates with an operation system management card through an IPMB (IPM Bus) 121 in the backplane 120 conforming to the IPMI (IPM Interface) standard. In addition, the IPMC 206 transmits and receives data to and from the CPU 201 through the ICH 204 and MCH 203. The IPMC 206 is, for example, a microcomputer including thereinside a CPU, a ROM (Read Only Memory), and the like.

When the server blade 200*a* is attached to a slot of the blade server system 100, and the power circuit 209 of the server blade 200*a* and the power line in the backplane 120 are connected to each other, the IPMC 206 becomes in a state where power from the power circuit 209 is turned on. At this time, power from the power circuit 209 is not input to devices other than the IPMC 206 in the server blade 200*a*. Hereinafter, as one of power states in the server blade 200*a*, a state where power is input only to the IPMC 206 in the server blade 200*a* is called a "power-off state". This "power-off state" corresponds to a "state 1" that will be mentioned later. In addition, a state where power is input to the whole server blade 200*a* is called an "operation state". This "operation state" corresponds to a "state 4" that will be mentioned later.

The IPMC 206 controls operation of each unit in the server blade 200*a* including the power circuit 209 under control of the operation system management card at the time of start-up in which the server blade 200*a* transitions from the power-off state to the operation state, and at the time of power-off in which the server blade 200*a* transitions from the operation state to the power-off state. In addition, when the server blade 200*a* is in the operation state, the IPMC 206 transmits to the operation system management card a temperature detection value by the temperature sensor 210 and a voltage detection value by the voltage sensor 211 according to a request of the operation system management card. It is to be noted that the IPMC 206 may voluntarily transmit to the operation system management card the temperature detection value by the temperature sensor 210 and the voltage detection value by the voltage sensor 211.

The NVRAM 207 is a nonvolatile memory that stores various data needed for processing by the IPMC 206. Information notified to the operation system management card by the IPMC 206, and the like are previously stored in the NVRAM 207, for example, at the time of start-up of the server blade 200a.

The power switch 208 supplies to the IPMC 206 a signal according to input manipulation to a switch mechanism. The IPMC 206 starts either of start-up processing that makes the server blade 200a transition from the power-off state to the operation state, and power-off processing that makes the server blade 200a transition from the operation state to the power-off state according to the input manipulation to the power switch 208.

The power circuit 209 receives power supply from the power module 410 through the power line (not shown) in the backplane 120, and supplies power to each unit in the server blade 200a. The power circuit 209 respectively and individually supplies power at least to the IPMC 206 and the other devices of the devices in the server blade 200a. For example, the power circuit 209 starts or stops power supply to the other devices according to a request of the IPMC 206 in a state of supplying power only to the IPMC 206.

The temperature sensor 210 detects a temperature of a predetermined position in the server blade 200a, such as a periphery of the CPU 201, and outputs a detection result to the IPMC 206. The voltage sensor 211 detects a voltage of power output to each unit in the server blade 200a from the power circuit 209, and outputs a detection result to the IPMC 206.

Figure 4:
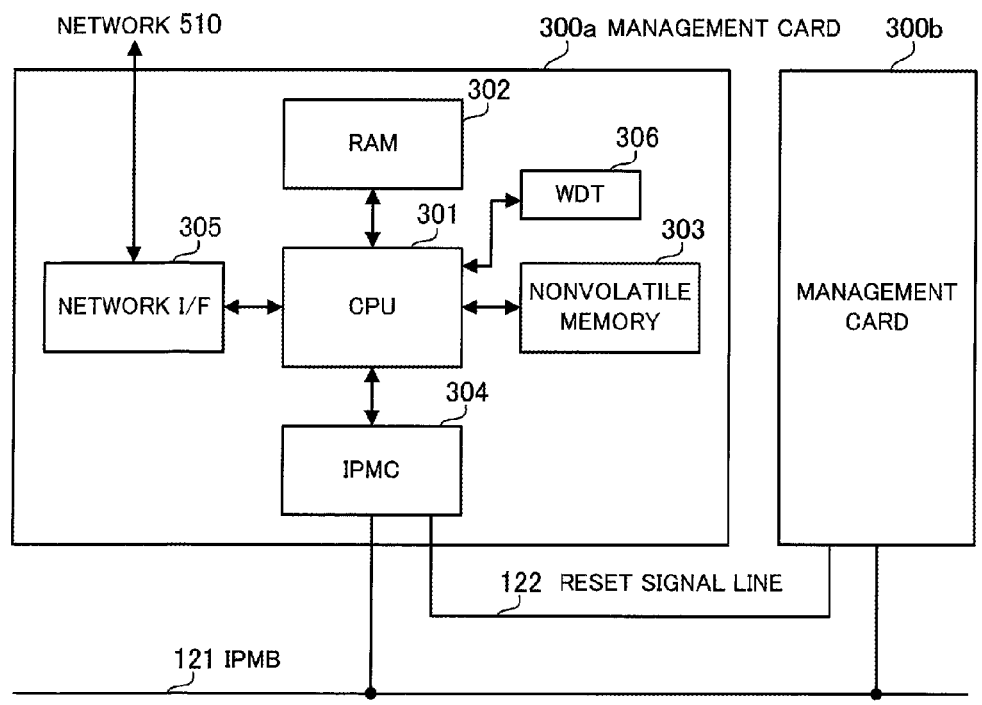
FIG. 4 illustrates a hardware configuration example of a management card.

FIG. 4 illustrates a hardware configuration example of the management card.

The management card 300a includes: a CPU 301; a RAM 302; a nonvolatile memory 303; an IPMC 304; a network I/F (interface) 305; and a WDT (Watch Dog Timer) 306.

The CPU 301 totally controls the whole management card 300a. The RAM 302 is used as a main storage device of the management card 300a, and temporarily stores at least a part of a program that the CPU 301 is made to execute, and various data needed for processing by the program.

The nonvolatile memory 303 is used as a secondary storage device of the management card 300a, and stores the program executed by the CPU 301, various data needed for the execution, and the like. The nonvolatile memory 303 is, for example, a semiconductor storage device, such as a flash memory. It is to be noted that an HDD may be used as the secondary storage device.

The IPMC 304 communicates with blades in the chassis 110, such as the server blades 200a to 200h, through an IPMB 121 in the backplane 120 conforming to the IPMI standard. In addition, it is also possible for the IPMC 304 to communicate with the other management card 300b. Furthermore, the IPMC 304 controls data transmission and reception between the IPMB 121 in the backplane 120 and the CPU 301. In addition, the IPMC 304 is connected to the management card 300b through a reset signal line 122. When the management card 300a is reset, the IPMC 304 outputs a reset pulse to the reset signal line 122, and notifies the management card 300b of generation of reset. In addition, the IPMC 304 receives the reset pulse output from the management card 300b through the reset signal line 122, and thereby detects the generation of reset in the management card 300b.

The network I/F 305 is connected to the network 510, and transmits and receives data to and from other equipment on the network 510, such as the remote monitoring apparatus 520.

When monitoring program execution processing of the CPU 301 based on a measurement time of a timer provided thereinside, and detecting that the management card 300a stopped abnormally, the WDT 306 resets the management card 300a.

It is to be noted that although a circuit that supplies power to each unit in the management card 300a, a controller of the circuit, and the like are provided also in the management card 300a, they are omitted in FIG. 4. In addition, the management card 300b is also achieved with a hardware configuration similar to that of the above-described management card 300a.

Next, there will be described operation control of the server blades 200a to 200h by the management cards 300a and 300b. Particularly, hereinafter, there will be described in detail a procedure in which an operation system management card controls operation of the server blades 200a to 200h at the time of start-up and power-off thereof.

In each of the server blades 200a to 200h, next six states from states 1 to 6 are prescribed as the states relevant to power-on/power-off. The state 1 is a power-off state. However, in the state 1, power is supplied from the power circuit 209 only to the IPMC 206 in the server blade. In starting from the state 1, the server blade transitions to the state 4 as an operation state where power-on of the whole server blade has been completed through the state 2 where start-up processing has been started, and the state 3 where start-up processing is being performed. In addition, the server blade transitions from the state 4 to the state 1 at the time of power-off through a state 5 where power-off processing has been started and a state 6 where power-off processing is being performed.

State change in each of the server blades 200a to 200h is managed by the operation system management card. The operation system management card respectively and individually controls state transition in each server blade for each server blade according to a previously decided sequence.

Figure 5:
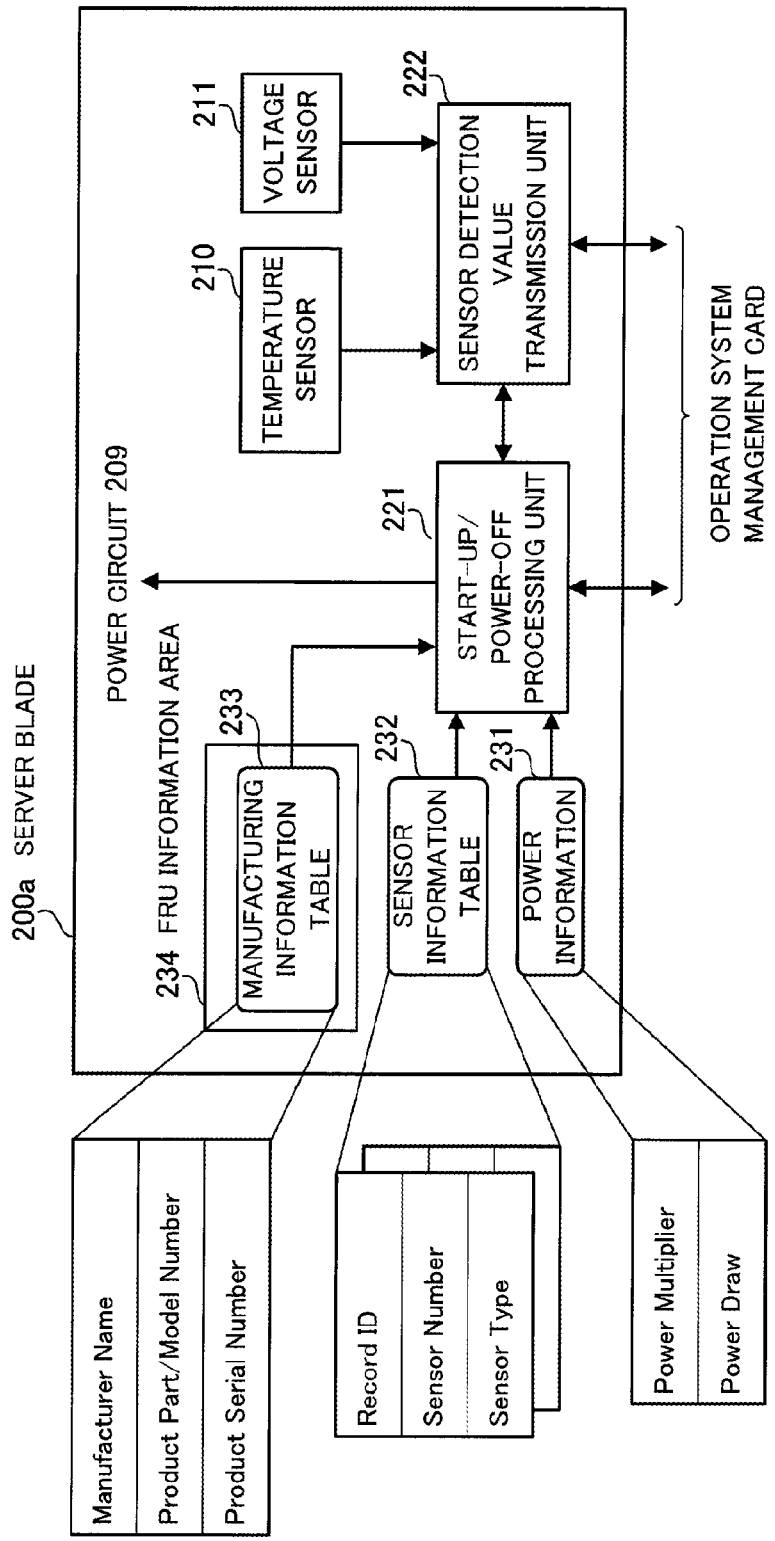
FIG. 5 is a block diagram illustrating an example of a processing function of the server blade.

FIG. 5 is a block diagram illustrating an example of a processing function of the server blade. It is to be noted that although the processing function of the server blade 200a is illustrated in FIG. 5 as the example, the other server blades 200b to 200h each also have a processing function similar to that in FIG. 5.

The server blade 200a includes a start-up/power-off processing unit 221 and a sensor detection value transmission unit 222. Processing of these start-up/power-off processing unit 221 and sensor detection value transmission unit 222 is achieved, for example, by a CPU included in the IPMC 206 executing a predetermined program.

The start-up/power-off processing unit 221 executes start-up processing (power-on processing) and power-off processing of the server blade 200a under control of the operation system management card according to the previously decided sequence. When basically, executing processing decided in each of the above-mentioned states 1 to 6 according to a request or an execution permission notification from the operation system management card, and ending the execution, the start-up/power-off processing unit 221 transitions to a next state, and notifies the operation system management card of state information indicating the state to which the start-up/power-off processing unit 221 has transitioned. As will be mentioned later, the server blade 200a notifies the operation system management card of state information as 4 bits of data using a "Platform Event Message" command prescribed in the ATCA standard. Subsequently, the start-up/ power-off processing unit 221 executes processing decided with respect to the state to which the start-up/power-off processing unit 221 has transitioned according to the request or the execution permission notification from the operation system management card.

In addition, in the start-up processing of the server blade 200a, the start-up/power-off processing unit 221 reads power information 231 stored in the NVRAM 207, and transmits it to the operation system management card. The power information 231 is the information indicating power consumption in the operation state of the server blade 200a and, for example, includes "Power Multiplier" and "Power Draw", each of which is 1 byte of data. When a value of the "Power Multiplier" is set as P1, and a value of the "Power Draw" is P2, a value (W) of power consumption is calculated using P1/10×P2. When receiving a "Get Power Level" command prescribed in the ATCA standard from the operation system management card, the server blade 200a transmits the "Power Multiplier" and the "Power Draw" as a response of the received command.

Furthermore, after the server blade 200a transitions to the operation state, the start-up/power-off processing unit 221 reads information from a sensor information table 232 and a manufacturing information table 233 that have been stored in the NVRAM 207, and transmits it to the operation system management card.

The sensor information table 232 is, for example, the table called a "Full Sensor Record" in the IPMI standard, and holds information indicating a type of sensor included in the server blade 200a. A record is provided in the sensor information table 232 for each sensor included in the server blade 200a. As the example illustrated in FIG. 5, when the server blade 200a includes two sensors of the temperature sensor 210 and the voltage sensor 211, a record corresponding to each of the temperature sensor 210 and the voltage sensor 211 is provided in the sensor information table 232.

In each record in the sensor information table 232, registered are 2 bytes of "Record ID", which is an identification number of the record, 1 byte of "Sensor Number", which is an identification number of a sensor corresponding to the record, 1 byte of "Sensor Type" indicating a sensor type corresponding to the record, and the like. Here, assuming that a hexadecimal number is represented by adding an "h" after a numerical value in the description below, the "Sensor Type" is represented as "01h" when the sensor is a temperature sensor, and the "Sensor Type" is "02h" when the sensor is a voltage sensor.

The manufacturing information table 233 holds information, such as a manufacturing maker, a model number, a serial number of the server blade 200a. The manufacturing information table 233 is, for example, stored in an FRU (Field Replacement Unit) information area 234 set in the NVRAM 207. The FRU information area 234 is an accessible memory area by the operation system management card directly designating an address to the server blade 200a.

The manufacturing information table 233 is stored in 80 bytes of area called a "Product Info Area" in the IPMI standard. In the manufacturing information table 233, stored are for example, a "Manufacturer Name" indicating a manufacturer name, a "Product Part/Model Number" indicating a model number of a product, and a "Product Serial Number" indicating a serial number of the product.

In addition, the start-up/power-off processing unit 221 also has a function that notifies of state information indicating a current state of the server blade 200a according to the request of the operation system management card. As will be mentioned later, when the operation system management card is changed, a notification request of the state information is output to the server blade 200a if needed from a new operation system management card, i.e., a management card that took over processing from the management card that was the operation system at first.

When the server blade 200a is in the operation state, the sensor detection value transmission unit 222 transmits each detection value of the temperature sensor 210 and the voltage sensor 211 to the operation system management card. When receiving a "Get Sensor Reading" command prescribed in the ATCA standard from the operation system management card, the sensor detection value transmission unit 222 transmits as 1 byte of data each detection value of the temperature sensor 210 and the voltage sensor 211 to the operation system management card as a response of the received command. It is to be noted that the sensor detection value transmission unit 222 may, for example, periodically transmit each detection value of the temperature sensor 210 and the voltage sensor 211 to the operation system management card without according to the request of the operation system management card.

Figure 6:
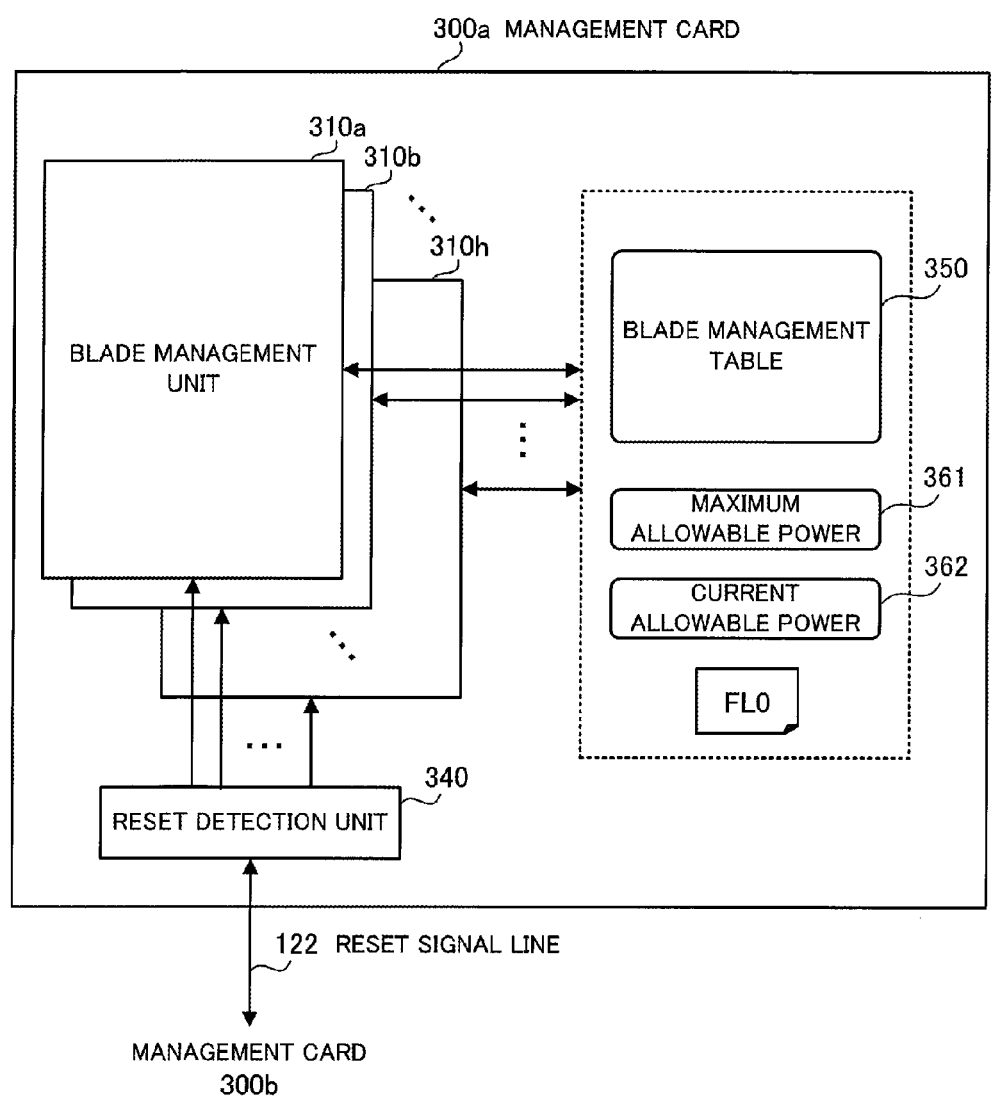
FIG. 6 is a block diagram illustrating an example of a processing function of the management card.

Next, FIG. 6 is a block diagram illustrating an example of a processing function of the management card. It is to be noted that although the processing function of the management card 300a is illustrated in FIG. 6 as the example, the management card 300b also has a processing function similar to that in FIG. 6.

The management card 300a includes blade management units 310a to 310h, and a reset detection unit 340. Processing of these blade management units 310a to 310h and reset detection unit 340 is, for example, achieved by the CPU 301 included in the management card 300a executing a predetermined program.

When the management card 300a is the operation system, the blade management units 310a to 310h manage transition of the states 1 to 6 in the server blades 200a to 200h, respectively. For example, the blade management unit 310a manages state transition in the server blade 200a, and the blade management unit 310b manages state transition in the server blade 200b.

In addition, the blade management units 310a to 310h control in parallel state transition in the server blades 200a to 200h, respectively. For example, control of start-up processing in which the blade management unit 310c makes the server blade 200c transition from the state 1 to the state 4, and control of power-off processing in which the blade management unit 310d makes the server blade 200d transition from the state 4 to the state 1 are executable in parallel.

When managing the state transition in the server blades 200a to 200h, the blade management units 310a to 310h utilize a blade management table 350. For example, the blade management units 310a to 310h register state information indicating a state of a server blade to be managed in the blade management table 350. In addition, while making the server blade to be managed transition from the state 1 to the state 4, the blade management units 310a to 310h register power information indicating power consumption of the server blade in the blade management table 350. Furthermore, when the server blade to be managed transitions to the state 4, the blade management units 310a to 310h register sensor information and manufacturing information of the server blade to be managed in the blade management table 350. In addition, while making the server blade to be managed transition from the state 4 to the state 1, the blade management units 310a to 310h delete from the blade management table 350 power information, the sensor information, and the manufacturing information of the server blade to be managed.

Although the blade management table 350 may just be, for example, stored in the RAM 302 of the management card 300a, a part of information (an address of the server blade) held in the blade management table 350 is previously stored in the nonvolatile memory 303. It is to be noted that details of the information held in the blade management table 350 will be described in FIG. 7.

In addition, in managing the state transition in the server blades 200a to 200h, the blade management units 310a to 310h reference maximum allowable power 361 and current allowable power 362. The maximum allowable power 361 is referenced when power distribution calculation is performed in a process where each of the blade management units 310a to 310h controls the state transition of the server blades 200a to 200h. The maximum allowable power 361 represents maximum power that may be supplied to the whole server blades 200a to 200h from the power module 410 mounted in the blade server system 100. The maximum allowable power 361 is, for example, set to the nonvolatile memory 303 of the management card 300a.

The current allowable power 362 is a value indicating how much power the power module 410 may supply to the server blades other than the server blade currently in the state 4, and it is calculated and updated by the blade management units 310a to 310h. The current allowable power 362 is obtained by subtracting from the maximum allowable power 361 a total sum of values of the power information of the server blades registered in the blade management table 350. In actual calculation, an initial value of the current allowable power 362 is set as a value of the maximum allowable power 361, and a value of the current allowable power 362 is subtracted by the power consumption of the server blade that has transitioned to the state 4 whenever the server blade transitions to the state 4. In addition, the value of the current allowable power 362 is added by the power consumption of the server blade that has transitioned to the state 1 whenever the server blade transitions to the state 1. It is to be noted that the current allowable power 362 is, for example, stored in the RAM 302 of the management card 300a.

It is to be noted that when the management card 300a is the standby system, the blade management units 310a to 310h update the information in the blade management table 350 and the current allowable power 362 using information notified from the operation system management card (i.e., the management card 300b).

In addition, in managing the state transition in the server blades 200a to 200h, the blade management units 310a to 310h reference an update permission flag FL0. The update permission flag FL0 indicates whether or not a state occurs where update of the current allowable power 362 is permitted. The update permission flag FL0 is turned on in an initial state, and when it is on, the blade management units 310a to 310h update the current allowable power 362 by turning the update permission flag FL0 on. When one of the blade management units 310a to 310h turns off the update permission flag FL0, only the blade management unit that turned off the update permission flag FL0 may update the current allowable power 362, and a state occurs where the other blade management units do not update the current allowable power 362. In addition, it is only the blade management unit which most recently turned off the update permission flag FL0 that may restore the update permission flag FL0 from off to on.

The update permission flag FL0 is used, and thereby calculation of the current allowable power 362 is accurately executed even in a state where start-up processing and power-off processing in the plurality of server blades are controlled in parallel by the plurality of blade management units.

When the management card 300a is the standby system, the reset detection unit 340 monitors whether or not reset is generated in the operation system management card based on a reset pulse transmitted from the operation system management card (i.e., the management card 300b) through the reset signal line 122. When reset in the operation system management card is detected by the reset detection unit 340, the management card 300a transitions to the operation system.

Figure 7:
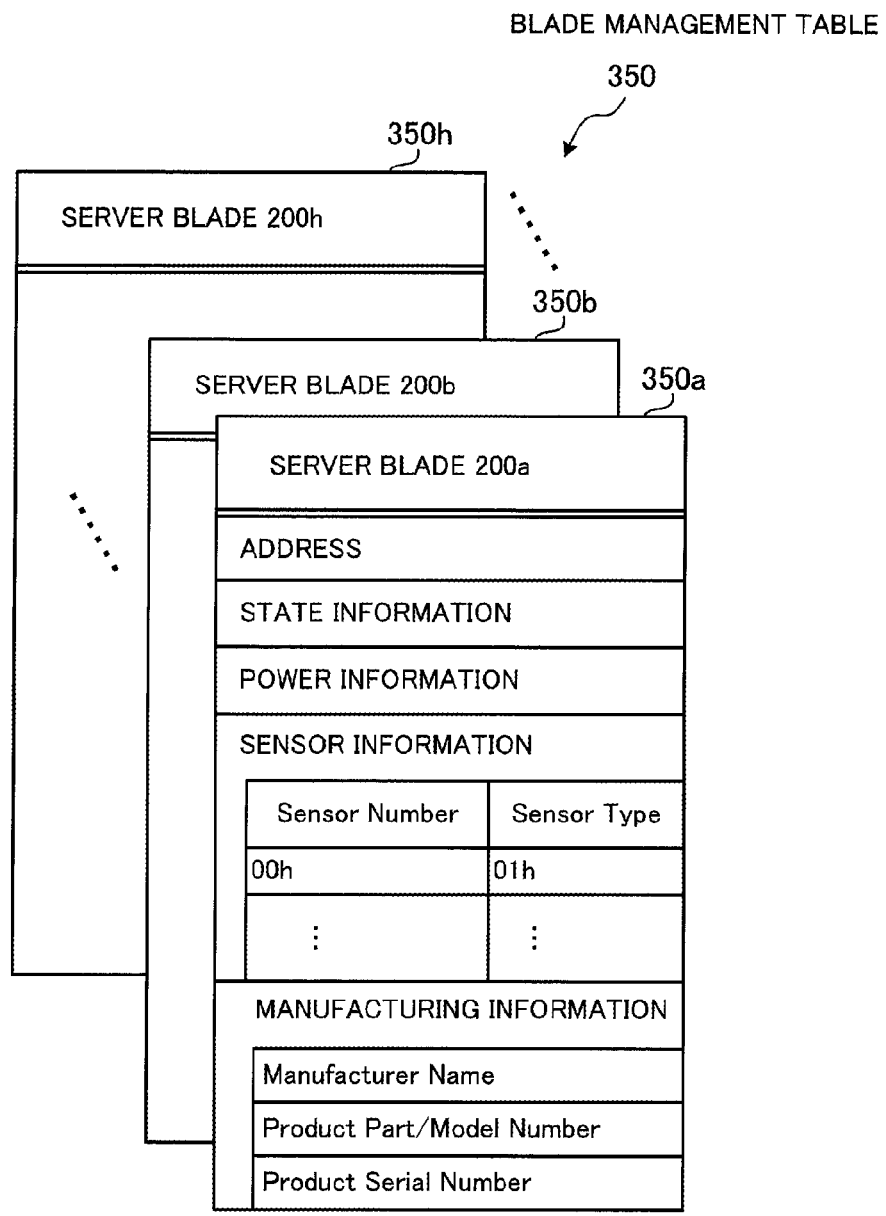
FIG. 7 illustrates an example of information held in a blade management table.

FIG. 7 illustrates an example of information held in the blade management table.

The blade management table 350 includes records 350a to 350h, respectively, corresponding to the server blades 200a to 200h. An address, state information, power information, sensor information, and manufacturing information are stored in each of the records 350a to 350h.

Address is information indicating a position of each server blade in the IPMB 121, and is previously decided for each slot of the chassis 110. For example, addresses from "41h" to "48h" are previously given to eight slots in which the server blades are inserted. It is to be noted that addresses of slots in which the management cards 300a and 300b are inserted are also previously decided. For example, the address of the management card 300a is "08h", and the address of the management card 300b is "09h". When a command is transmitted and received through the IPMB 121, these addresses in the IPMB 121 are used as information that identifies a source and a destination of the command, respectively.

The state information, power information, sensor information, and manufacturing information in the record are updated by the blade management unit that controls the server blade corresponding to the record. For example, state information, power information, sensor information, and manufacturing information in the record 350a are updated by the blade management unit 310a, and state information, power information, sensor information, and manufacturing information in the record 350b are updated by the blade management unit 310b.

In addition, when the management card 300a is the operation system, state information, power information, sensor information, and manufacturing information notified from the server blade to be managed are registered in the blade management table 350 in the management card 300a. Meanwhile, when the management card 300a is the standby system, state information, power information, sensor information, and manufacturing information transferred from the operation system management card (i.e., the management card 300b) are registered in the blade management table 350 in the management card 300a.

State information indicates the above-mentioned states (states 1 to 6) relevant to power of the server blade. The blade management unit updates state information in a record corresponding to the server blade to be managed whenever a state of the server blade to be managed changes.

Notification of the state information is provided from the server blade to the operation system management card using the "Platform Event Message" command prescribed in the ATCA standard. In the "Platform Event Message" command, state information is transmitted as 4 bits of data, and the states 1 to 6 are set as values of "1h" to "6h", respectively.

It is to be noted that when not communicating with the IPMC 206 of the server blade to be managed (for example, when the server blade is not inserted in the slot), the blade management unit sets state information in a record as a blank. Alternatively, when not communicating with the IPMC 206 of the server blade to be managed, the blade management unit may also set the state information in the record as a state 0. In any of these cases, when the server blade to be managed is inserted in the slot, power of the IPMC 206 of the server blade to be managed is turned on, and communication with the IPMC 206 in which power is turned on is started, the blade management unit sets the state information in the record as the state 1. In addition, when it becomes impossible to communicate with the IPMC 206 of the server blade to be managed (for example, when the server blade is removed from the slot) when the server blade to be managed is in the state 1, the blade management unit sets the state information in the record as the blank or the state 0.

Notification of the power information 231 held in the server blade is provided from the server blade, and is registered in a field of power information as information indicating power consumption of the server blade. Notification of the power information 231 is provided from the server blade to the operation system management card as a response to the "Get Power Level" command, and the power information 231 includes the "Power Multiplier" and the "Power Draw", each of which is 1 byte of data. It is to be noted that for example, a value (W) of power consumption calculated based on the "Power Multiplier" and the "Power Draw" notified from the server blade may be stored in the field of the power information of the blade management table 350.

When the server blade to be managed is in the state 3, the blade management unit in the operation system management card transmits the "Get Power Level" command to the server blade to be managed, and receives the power information 231 from the server blade to be managed. At this time, the blade management unit subtracts the value of the power consumption calculated based on the received power information 231 from a value of the current allowable power 362. It is to be noted that as mentioned above, the initial value of the current allowable power 362 is the value of the maximum allowable power 361. When a subtraction result is not less than zero, the blade management unit permits the server blade to be managed to transition to the state 4. At this time, the blade management unit registers the received power information 231 in the field of power information in the blade management table 350, and updates the value of the current allowable power 362 using the above-described subtraction result.

In addition, when permitting the server blade to be managed to transition to the state 1, the blade management unit in the operation system management card deletes the value of power consumption of the server blade to be managed from the field of power information of the blade management table 350. In addition to this, the blade management unit adds to the value of the current allowable power 362 a value of power consumption of the server blade that has been made to transition to the state 1, and updates the current allowable power 362 using an addition result.

Sensor information is the information on a sensor included in the server blade. In the sensor information, stored are 1 byte of "Sensor Number", which is identification information given for each sensor included in the server blade, and 1 byte of "Sensor Type" indicating a sensor type corresponding to each identification information. The "Sensor Number" and the "Sensor Type" are read from the sensor information table 232 of the server blade, and notification thereof is provided to the operation system management card, as a response to a "Get Device SDR" command prescribed in the ATCA standard.

In a field of manufacturing information, as information on a product of the server blade, stored are a "Manufacturer Name" indicating a manufacturer name, a "Product Part/Model Number" indicating a model number of the product, and a "Product Serial Number" indicating a serial number of the product. These "Manufacturer Name", "Product Part/Model Number", and "Product Serial Number" are read from the manufacturing information table 233 of the server blade, and notification thereof is provided to the operation system management card, as a response to a "Read FRU Data" command prescribed in the ATCA standard.

Figure 8:
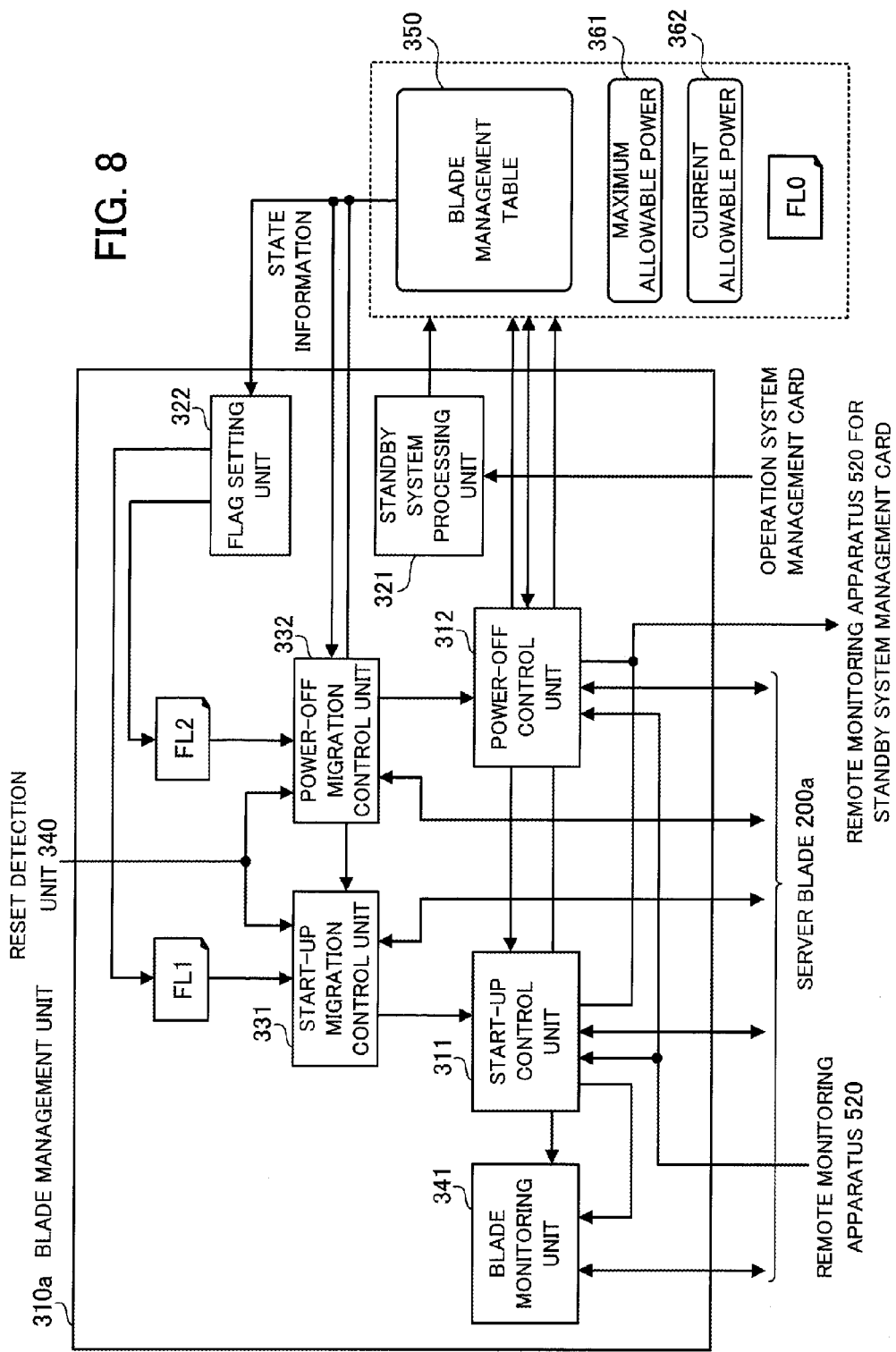
FIG. 8 is a block diagram illustrating an internal configuration example of a blade management unit.

Next, FIG. 8 is a block diagram illustrating an internal configuration example of the blade management unit. It is to be noted that although the blade management unit 310a that manages the server blade 200a is described in FIG. 8, each of the blade management units 310b to 310h may just also have the same configuration as in FIG. 8.

The blade management unit 310a includes: a start-up control unit 311; a power-off control unit 312; a standby system processing unit 321; a flag setting unit 322; a start-up migration control unit 331; a power-off migration control unit 332; and a blade monitoring unit 341.

The start-up control unit 311 and the power-off control unit 312 operate when the management card 300a is the operation system management card. The start-up control unit 311 controls start-up processing in which the server blade to be managed 200a transitions from the state 1 to the state 4, according to a previously decided sequence. The power-off control unit 312 controls power-off processing in which the server blade to be managed 200a transitions from the state 4 to the state 1 through the states 5 and 6, according to a previously decided sequence.

The start-up control unit 311 receives a notification of state information from the server blade 200a whenever a state of the server blade 200a changes, during start-up control of the server blade 200a. The start-up control unit 311 updates the state information in the record 350a of the blade management table 350 using the state information notified from the server blade 200a.

In addition, in the start-up control of the server blade 200a, the start-up control unit 311 determines whether or not to permit the server blade 200a to transition to the state 4 based on power information notified from the server blade 200a and the current allowable power 362 stored in the RAM 302. When subtracting from the value of the current allowable power 362 a value of power consumption based on the power information notified from the server blade 200a, and the subtraction result is not less than zero, the start-up control unit 311 permits the server blade 200a to transition to the state 4. At this time, the start-up control unit 311 registers a value of power information notified from the server blade 200a in a field of power information in the record 350a of the blade management table 350. In addition to this, the start-up control unit 311 updates the value of the current allowable power 362 using the above-described subtraction result.

Furthermore, in the start-up control of the server blade 200a, the start-up control unit 311 registers information notified from the server blade 200a in each field of sensor information and manufacturing information in the record 350a of the blade management table 350.

In addition, during the start-up control of the server blade 200a, the start-up control unit 311 transmits to the standby system management card (i.e., the management card 300b) the information registered in the blade management table 350 and an updated value of the current allowable power 362. In addition, the start-up control unit 311 transmits at least a part of the information transmitted to the standby system management card also to the remote monitoring apparatus 520.

In addition, when the management card 300a transitions from the standby system to the operation system, the start-up control unit 311 starts processing from a processing step requested by the start-up migration control unit 331 among processing steps in a start-up control sequence. As a result, when the management card 300a becomes the operation system during the start-up control of the server blade 200a by the other management card 300b, it becomes possible for the start-up control unit 311 to take over the start-up control of the server blade 200a.

During power-off control of the server blade 200a, the power-off control unit 312 receives the notification of state information from the server blade 200a whenever the state of the server blade 200a changes. The power-off control unit 312 updates the state information in the record 350a of the blade management table 350 using the state information notified from the server blade 200a. In addition to this, the power-off control unit 312 transfers the state information notified from the server blade 200a to the standby system management card and the remote monitoring apparatus 520.

In addition, when permitting the server blade 200a to transition to the state 1, the power-off control unit 312 reads the power information from the record 350a of the blade management table 350, and adds a value of power consumption based on the read power information to the value of the current allowable power 362. The power-off control unit 312 updates the value of the current allowable power 362 using an addition result, and transmits an updated value of the current allowable power 362 to the standby system management card. At this time, the power-off control unit 312 deletes the power information, sensor information, and manufacturing information that have been registered in the record 350a of the blade management table 350.

Furthermore, when the management card 300a transitions from the standby system to the operation system, the power-off control unit 312 starts processing from a processing step requested by the power-off migration control unit 332 among processing steps in a power-off control sequence. As a result, when the management card 300a becomes the operation system during the power-off control of the server blade 200a by the other management card 300b, it becomes possible for the power-off control unit 312 to take over the power-off control of the server blade 200a.

The standby system processing unit 321 and the flag setting unit 322 operate when the management card 300a is the standby system. The standby system processing unit 321 receives the state information, power information, sensor information, and manufacturing information relevant to the server blade 200a transferred from the operation system management card, and registers the received information in the record 350a of the blade management table 350. In addition, the standby system processing unit 321 receives a value of the current allowable power transferred from the operation system management card, and updates the current allowable power 362 in the RAM 302 using the received value.

The flag setting unit 322 monitors the state information on the server blade 200a registered in the record 350a of the blade management table 350, and sets values of a start-up flag FL1 and a power-off flag FL2 according to the registered state information. It is to be noted that the start-up flag FL1 and the power-off flag FL2 are respectively set to the RAM 302 for each blade management unit.

When the management card 300a transitions from the standby system to the operation system, the start-up migration control unit 331 determines operation that the start-up control unit 311 is made to start, and makes the start-up control unit 311 continue start-up control to the server blade 200a. In a case where the start-up flag FL1 is on when the management card 300a transitions from the standby system to the operation system, the start-up migration control unit 331 acquires state information from the server blade 200a, and controls the start-up control unit 311 according to the state information acquired from the server blade 200a.

When the management card 300a transitions from the standby system to the operation system, the power-off migration control unit 332 determines operation that the power-off control unit 312 is made to start, and makes the power-off control unit 312 continue power-off control to the server blade 200a. In a case where the power-off flag FL2 is on when the management card 300a transitions from the standby system to the operation system, the power-off migration control unit 332 acquires state information from the server blade 200a, and controls the power-off control unit 312 according to the state information acquired from the server blade 200a.

When the management card 300a is the operation system, and the server blade 200a is in the operation state, the blade monitoring unit 341 periodically requests a detection value of a sensor from the server blade 200a. The blade monitoring unit 341, for example, controls rotation operation of a fan by the fan module 420 based on a detection value of the temperature sensor 210 of the server blade 200a. In addition, the blade monitoring unit 341 monitors whether or not abnormality has occurred in the server blade 200a based on each detection value of the temperature sensor 210 and the voltage sensor 211 of the server blade 200a. For example, when a temperature notified from the server blade 200a exceeds a predetermined threshold, or when a voltage notified from the server blade 200a departs from a predetermined range, the blade monitoring unit 341 determines that abnormality has occurred in the server blade 200a.

Meanwhile, in the blade server system of the present embodiment, notification of data such as state information is provided from the operation system management card to the standby system management card. However, a protocol when data is transmitted and received between management cards is not prescribed in the IPMI standard and the AICA standard. Consequently, in the present embodiment, a "Set MMC Notice" command as illustrated in next FIG. 9 is prepared as a control command with which the operation system management card notifies the standby system management card of data.

Figure 9:
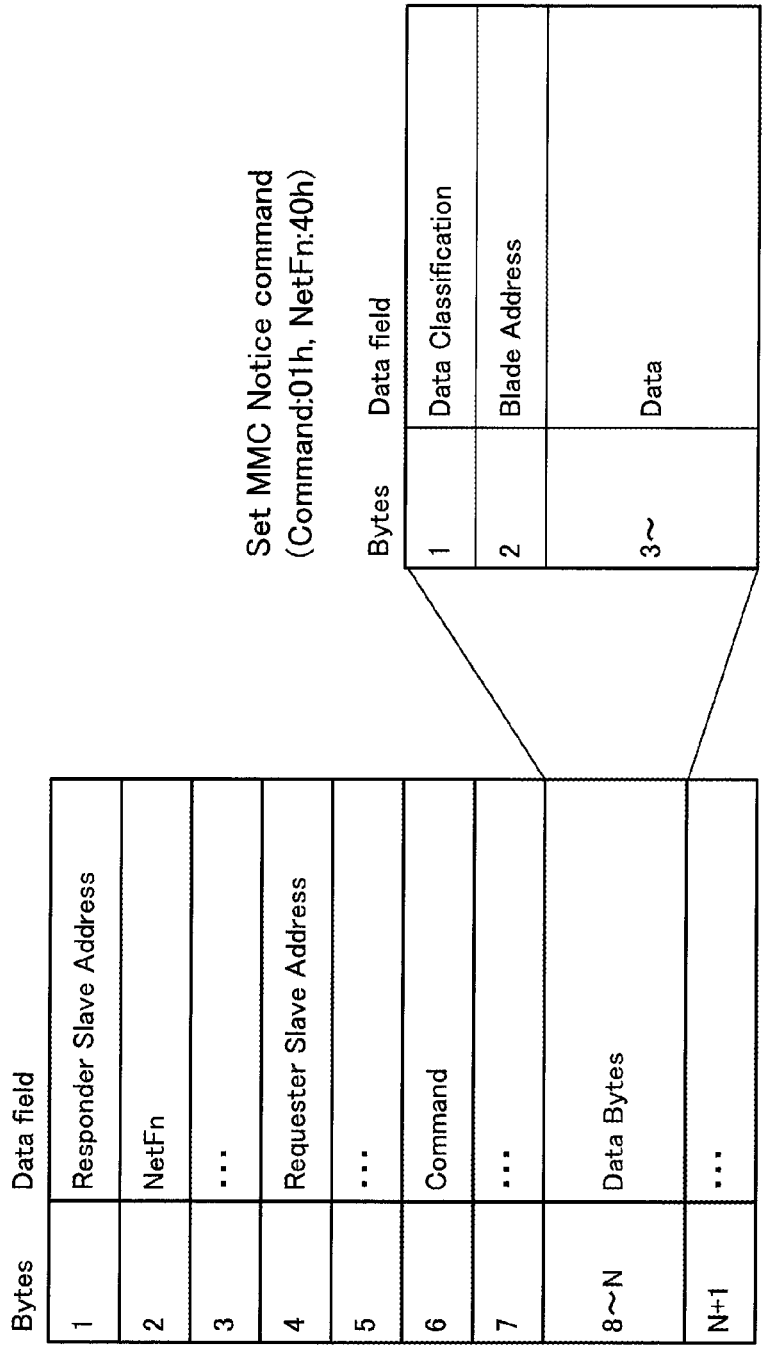
FIG. 9 describes a command used when an operation system management card notifies a standby system management card of data.

FIG. 9 describes a command used when the operation system management card notifies the standby system management card of data.

A communication format of request data prescribed in the IPMI standard (a General IPMI request format) is illustrated on the left side of FIG. 9. A "Responder Slave Address" indicating an address of a destination is stored in the first byte of the request data, and a "Requester Slave Address" indicating an address of a source is stored in the fourth byte thereof. In addition, a "NetFn" (network function) is stored in the second byte of the request data, and a "Command" is stored in the sixth byte thereof. A command is specified using a combination of a value of the "NetFn" and a value of the "Command".

"Data Bytes" is provided in the eighth byte to Nth byte (however, N is an integer from 0 to 31) of the request data. Transmit data is stored in the "Date Bytes" if needed. For example, when notification of certain information is provided to a command issue destination, the information to be notified is stored in the "Data Bytes" in the request data.

In the present embodiment, the "Set MMC Notice" command is prepared in which values a combination of which is unused in the IPMI standard are set to each field of the "Command" and the "NetFn" of the request data. When the "Set MMC Notice" command is transmitted, for example, the value of the "Command" of the request data is set as "01h", and the value of the "NetFn" is set as "40h". It is to be noted that in response data with which a receiver that received the "Set MMC Notice" command replies, the value of the "NetFn" is set as "41h".

In the request data of the "Set MMC Notice" command, stored are "Data Classification" in the first byte of the "Data Byte", a "Blade Address" in the second byte thereof, and "Data" in and after the third byte thereof, respectively. The "Data Classification" indicates a type of data to be notified to the standby system management card. A different value is set to the "Data Classification" for each type of data stored in a field of "Data". Types of data to be notified from the operation system management card to the standby system management card include state information, a power calculation result (the current allowable power 362), power information of a server blade, sensor information of the server blade, manufacturing information of the server blade, a completion notification of information gathering from the server blade, and the like. However, when a value indicating completion of information gathering is set to the "Data Classification", a value does not particularly need to be set to the field of "Data".

An address indicating that the data stored in the field of "Data" is relevant to which server blade is stored in the "Blade Address". The address stored in this "Blade Address" is the address registered in each record of the blade management table 350. For example, when notification of data relevant to the server blade 200a is provided to the standby system management card, an address "41h" is set to the "Blade Address".

When the operation system management card notifies the standby system management card of state information, power information of the server blade, sensor information thereof, and manufacturing information thereof, information of which the server blade notified the operation system management card is stored in the "Data". For example, when notification of the state information is provided to the standby system management card, state information stored in the request data of the "Platform Event Message" command is set to the first byte of the "Data".

In addition, the power calculation result (current allowable power 362) is, for example, transmitted simultaneously with the power information to the standby system management card. For example, when notification of the power information is provided to the standby system management card, each value of the "Power Multiplier" and the "Power Draw" notified from the server blade is set to the first and second bytes of the "Data", and the value of the current allowable power 362 held in the operation system management card is set to the third and fourth bytes.

It is to be noted that the value of the current allowable power 362 may just be, for example, set using the same description scheme as the "Power Multiplier" and the "Power Draw". For example, assuming that the current allowable power 362 is 2 bytes of data, a value of the first byte is P3, and that a value of the second byte is P4, an actual value of the current allowable power 362 is calculated using P3/10×P4.

Next, there will be described a basic processing procedure of start-up control and power-off control of the server blade by the operation system management card. In the description below, as an example, processing will be described when start-up control and power-off control of the server blade 200a are performed by the operation system management card, but also when start-up control and power-off control of each of the server blades 200b to 200h are performed by the operation system management card, similar processing is executed for each server blade to be controlled.

Figure 10:
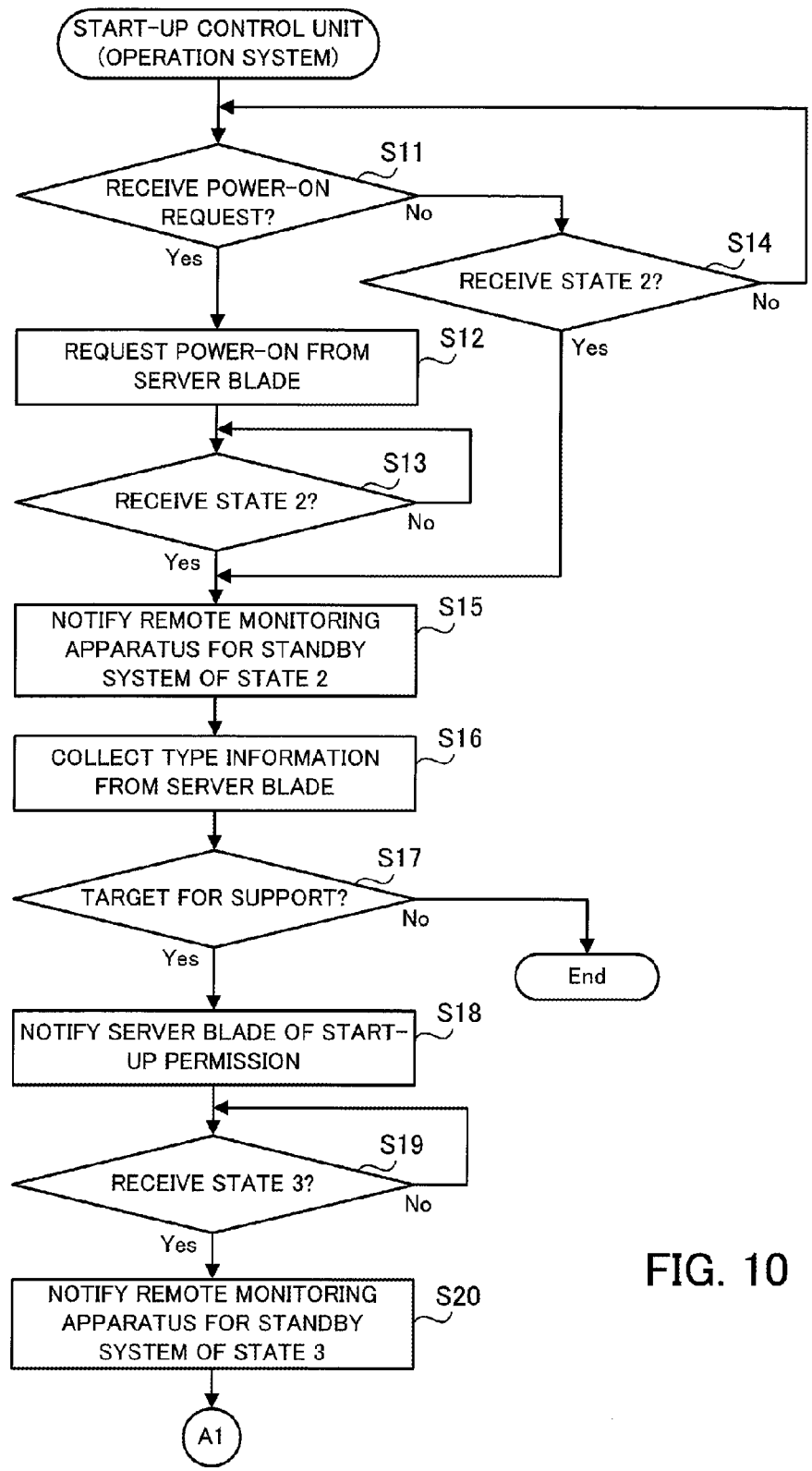
FIG. 10 is a flow chart illustrating an example of a start-up control procedure by the operation system management card.
Figure 11:
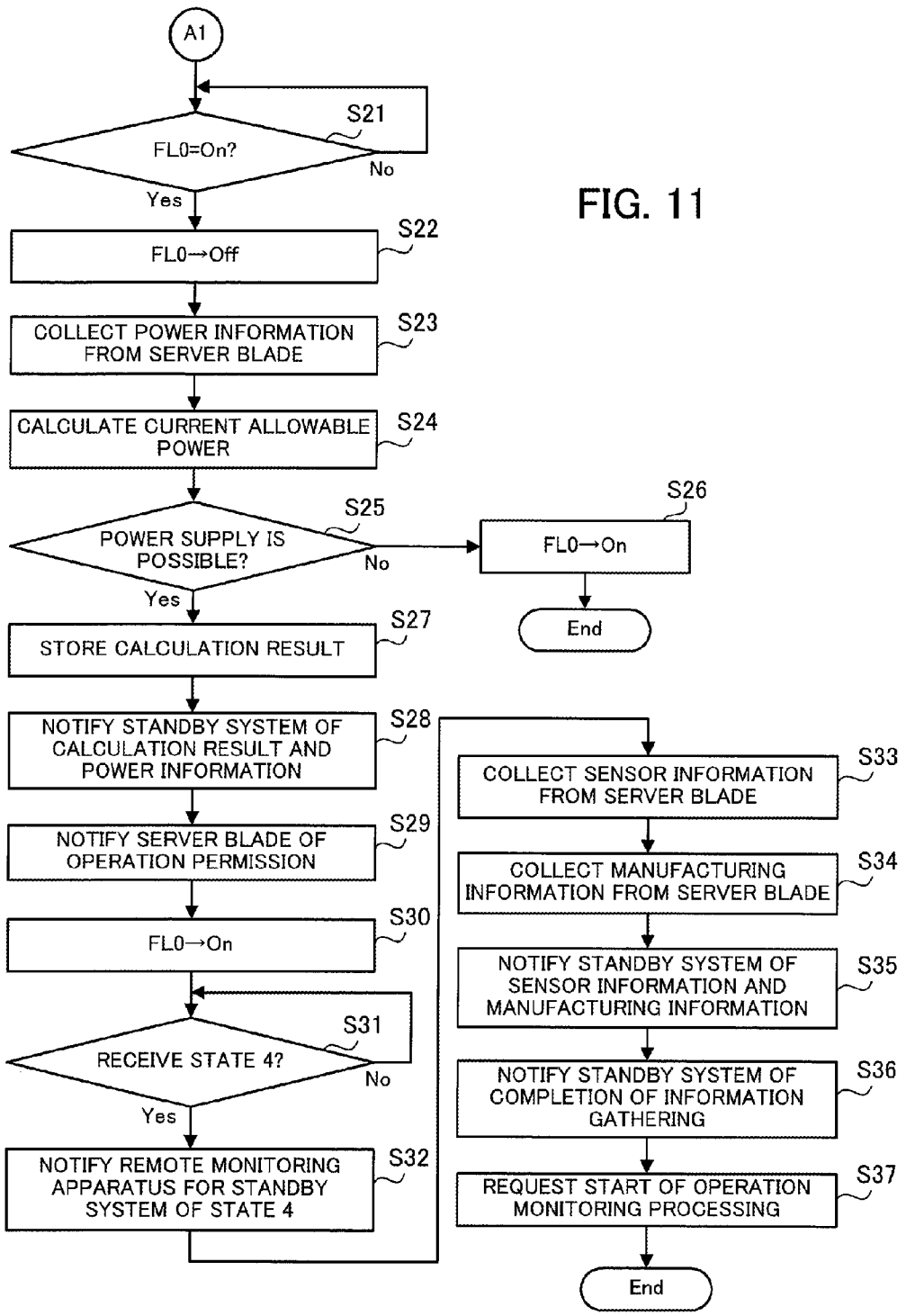
FIG. 11 is a flow chart illustrating an example of a start-up control procedure by the operation system management card.

First, FIGS. 10 and 11 are flow charts illustrating an example of a start-up control procedure by the operation system management card. Processing illustrated in FIGS. 10 and 11 is the processing executed by the start-up control unit 311 of the blade management unit 310a of the operation system management card.

Note that it is assumed that in an initial state of FIG. 10, the server blade 200a is in the state 1, which is a power-off state, and the blade management unit 310a of the operation system management card is in a state of having recognized that the server blade 200a is in the state 1. For example, when the server blade 200a is newly attached to the chassis 110 and communication with the IPMC 206 of the server blade 200a is started, the start-up control unit 311 of the blade management unit 310a of the operation system management card recognizes a state of the server blade 200a as the state 1. At this time, the start-up control unit 311 registers a value indicating the state 1 in the field of state information in the record 350a of the blade management table 350. In addition, also when receiving the state information indicating the state 1 from the server blade 200a by processing of the power-off control unit 312, which will be described later (corresponding to step S57 of subsequent FIG. 12), the start-up control unit 311 recognizes that the server blade 200a has transitioned to the state 1.

[Step S11] When monitoring a power-on request for the server blade 200a from the remote monitoring apparatus 520 and receiving the power-on request, the start-up control unit 311 executes processing of step S12. In addition, when, for example, measuring a time from the start of monitoring processing of step S11, and not receiving the power-on request in a certain time, the start-up control unit 311 executes processing of step S14.

[Step S12] The start-up control unit 311 requests power-on from the server blade 200a.

When receiving the power-on request from the start-up control unit 311, the start-up/power-off processing unit 221 of the server blade 200a starts start-up processing, transitions to the state 2, and notifies the operation system management card of having transitioned to the state 2 using the "Platform Event Message" command.

[Step S13] The start-up control unit 311 monitors state information from the start-up/power-off processing unit 221 of the server blade 200a. When receiving state information indicating the state 2 from the start-up/power-off processing unit 221 of the server blade 200a, the start-up control unit 311 registers the state information indicating the state 2 in the field of state information in the record 350a of the blade management table 350, and subsequently executes processing of step S15.

[Step S14] When not receiving the power-on request, the start-up control unit 311 monitors state information from the start-up/power-off processing unit 221 of the server blade 200a. When receiving the state information indicating the state 2 from the start-up/power-off processing unit 221 of the server blade 200a, the start-up control unit 311 registers the state information indicating the state 2 in the field of state information in the record 350a of the blade management table 350, and subsequently executes processing of step S15. In addition, when for example, measuring a time from the start of monitoring processing of step S14, and not receiving state information in a certain time, the start-up control unit 311 executes processing of step S11.

It is to be noted that a case where the start-up control unit 311 receives state information indicating the state 2 from the start-up/power-off processing unit 221 of the server blade 200a in step S14 means the case where start-up processing of the server blade 200a is started without according to the power-on request from the remote monitoring apparatus 520. As such an example, it is considered a case where power-on of the server blade 200a is requested by manipulation input to the power switch 208 included in the server blade 200a. When manipulation input is performed to the power switch 208 in the state 1, the start-up/power-off processing unit 221 of the server blade 200a starts start-up processing, transitions to the state 2, and notifies the operation system management card of having transitioned to the state 2 using the "Platform Event Message" command.

[Step S15] The start-up control unit 311 notifies the standby system management card of the state information indicating the state 2 received from the server blade 200a using the "Set MMC Notice" command. In addition, the start-up control unit 311 also notifies the remote monitoring apparatus 520 of the state information indicating the state 2.

In the standby system management card that has received the notification of the state information indicating the state 2, the standby system processing unit 321 of the blade management unit 310a registers the received state information in the field of state information in the record 350a of the blade management table 350.

[Step S16] The start-up control unit 311 requests transmission of type information from the start-up/power-off processing unit 221 of the server blade 200a using a "Get Device ID" command. When receiving the type information from the start-up/power-off processing unit 221 of the server blade 200a, the start-up control unit 311 executes processing of step S17.

[Step S17] The start-up control unit 311 determines whether or not the server blade 200a as a communication partner is the partner to be supported as a control target of start-up/power-off processing based on the type information received from the start-up/power-off processing unit 221 of the server blade 200a. In the determination processing, when a value of a "Completion Code" in the response data to the "Get Device ID" command is "00h", the start-up control unit 311 determines that the communication partner is an IPMC with which communication may be normally performed, and is a support target for control. In this case, the start-up control unit 311 executes processing of step S18. Meanwhile, when the value of the "Completion Code" in the response data to the "Get Device ID" command is a value other than "00h", the start-up control unit 311 determines that the communication partner is not the support target for control. In this case, the start-up control unit 311, for example, notifies the server blade 200a of an error, and subsequently ends start-up control.

[Step S18] The start-up control unit 311 transmits a start-up permission notification to the start-up/power-off processing unit 221 of the server blade 200a.

When receiving the start-up permission notification from the start-up control unit 311, the start-up/power-off processing unit 221 of the server blade 200a transitions to the state 3, and notifies the operation system management card of having transitioned to the state 3 using the "Platform Event Message" command.

[Step S19] The start-up control unit 311 monitors state information from the start-up/power-off processing unit 221 of the server blade 200a. When receiving state information indicating the state 3 where start-up processing is being performed from the start-up/power-off processing unit 221 of the server blade 200a, the start-up control unit 311 registers the state information indicating the state 3 in the field of state information in the record 350a of the blade management table 350, and subsequently executes processing of step S20.

[Step S20] The start-up control unit 311 notifies the standby system management card of the state information indicating the state 3 using the "Set MMC Notice" command.

In addition, the start-up control unit 311 also notifies the remote monitoring apparatus 520 of the state information indicating the state 3.

In the standby system management card that has received the notification of the state information indicating the state 3, the standby system processing unit 321 of the blade management unit 310a registers the received state information in the field of state information in the record 350a of the blade management table 350.

[Step S21] The start-up control unit 311 references a value of the update permission flag FL0 indicating whether or not a state occurs where update of the current allowable power 362 is permitted. If the update permission flag FL0 is on, the start-up control unit 311 executes processing of step S22. Meanwhile, when the update permission flag FL0 is off, the start-up control unit 311 temporarily stops processing, and executes processing of step S22 after the update permission flag FL0 becomes on.

[Step S22] The start-up control unit 311 turns off the value of the update permission flag FL0 to produce a state where the other blade management units 310b to 310h do not update the current allowable power 362.

[Step S23] The start-up control unit 311 requests transmission of power information from the start-up/power-off processing unit 221 of the server blade 200a using the "Get Power Level" command. When receiving the power information from the start-up/power-off processing unit 221 of the server blade 200a, the start-up control unit 311 executes processing of step S24.

The start-up/power-off processing unit 221 of the server blade 200a that received request data of the "Get Power Level" command reads the power information 231 from the NVRAM 207, and transmits to the operation system management card response data in which the read power information 231 is set to the "Power Multiplier" and the "Power Draw".

[Step S24] The power information received from the server blade 200a indicates power consumption of the server blade 200a in the state 4, which is the operation state. The start-up control unit 311 subtracts a value of power consumption indicated by the power information received from the server blade 200a from a value held as the current allowable power 362 in the RAM 302, and calculates remaining allowable power when the server blade 200a transitions to the operation state.

It is to be noted that an initial value of the current allowable power 362 is a value of the maximum allowable power 361 indicating maximum power that may be supplied by the power module 410. For example, when the server blades 200b to 200h other than the server blade 200a are in the power-off state (state 1), a value of the current allowable power 362 coincides with the maximum allowable power 361.

[Step S25] When a subtraction result in step S24 is not less than zero, the start-up control unit 311 determines that it is possible to supply power from the power module 410 to the server blade 200a, and executes processing of step S27. Meanwhile, when the subtraction result in step S24 is less than zero, the start-up control unit 311 determines that it is impossible to supply power from the power module 410 to the server blade 200a, and executes processing of step S26.

[Step S26] When determining that it is impossible to supply power from the power module 410 to the server blade 200a, the start-up control unit 311 restores the value of the update permission flag FL0 to on, and subsequently ends start-up control. At this time, the start-up control unit 311 may, for example, notify the start-up/power-off processing unit 221 of the server blade 200a of an error.

[Step S27] The start-up control unit 311 updates the value of the current allowable power 362 held in the RAM 302 using the subtraction result in step S24. In addition, the start-up control unit 311 registers the power information received from the server blade 200a in step S23 in the field of power information in the record 350a of the blade management table 350.

[Step S28] The start-up control unit 311 notifies the standby system management card of the subtraction result (i.e., the value of the current allowable power 362 after update) in step S24, and the power information received from the server blade 200a in step S23, using the "Set MMC Notice" command.

In the standby system management card that has received the "Set MMC Notice" command, the standby system processing unit 321 of the blade management unit 310a updates the value of the current allowable power 362 held in the RAM 302 using the received subtraction result. In addition to this, the standby system processing unit 321 registers the received power information in the field of power information in the record 350a of the blade management table 350.

[Step S29] The start-up control unit 311 transmits an operation permission notification that permits transition to the operation state to the start-up/power-off processing unit 221 of the server blade 200a.

The start-up/power-off processing unit 221 of the server blade 200a that received the operation permission notification requests the power circuit 209 to turn on the power to the whole server blade 200a. As a result, the server blade 200a transitions to the state 4, which is the operation state. Subsequently, the start-up/power-off processing unit 221 of the server blade 200a notifies the operation system management card of having transitioned to the state 4, using the "Platform Event Message" command.

[Step S30] The start-up control unit 311 restores the value of the update permission flag FL0 to on.

[Step S31] The start-up control unit 311 monitors state information from the start-up/power-off processing unit 221 of the server blade 200a. When receiving state information indicating the state 4, which is the operation state, from the start-up/power-off processing unit 221 of the server blade 200a, the start-up control unit 311 registers the state information indicating the state 4 in the field of state information in the record 350a of the blade management table 350, and subsequently executes processing of step S32.

[Step S32] The start-up control unit 311 notifies the standby system management card of the state information indicating the state 4 using the "Set MMC Notice" command. In addition, the start-up control unit 311 also notifies the remote monitoring apparatus 520 of the state information indicating the state 4.

In the standby system management card that has received the notification of the state information indicating the state 4, the standby system processing unit 321 of the blade management unit 310a registers the received state information in the field of state information in the record 350a of the blade management table 350.

[Step S33] The start-up control unit 311 requests transmission of sensor information from the start-up/power-off processing unit 221 of the server blade 200a using the "Get Device SDR" command. The start-up control unit 311 sets one "Record ID" to request data of the "Get Device SDR" command. The start-up/power-off processing unit 221 of the server blade 200a that received the request data of the "Get Device SDR" command selects from the sensor information table 232 a record corresponding to an ID set to the "Record ID" of the request data, and reads a "Sensor Number" and a "Sensor Type" from the selected record. The start-up/power-off processing unit 221 transmits response data in which each read information has been stored to the operation system management card.

The start-up control unit 311 that received the response data registers each value of the "Sensor Number" and the "Sensor Type" that have been extracted from the received response data in association with each other in the field of sensor information in the record 350a of the blade management table 350. In addition, the start-up control unit 311 sequentially issues the "Get Device SDR" command while changing a value of the "Record ID" to thereby acquire sensor information on all the sensors included in the server blades, and registers the sensor information in the record 350a of the blade management table 350.

[Step S34] The start-up control unit 311 requests transmission of manufacturing information from the start-up/power-off processing unit 221 of the server blade 200a using the "Read FRU Data" command, and acquires the manufacturing information from the start-up/power-off processing unit 221.

In this step S34, the start-up control unit 311 first acquires, for example, 8 bytes of data from a head of the FRU information area 234 in the server blade 200a using the "Read FRU Data" command. The start-up control unit 311 then extracts from the acquired 8 bytes of data a head address of the manufacturing information table 233 (Product Info Area) in the FRU information area 234. Next, the start-up control unit 311 acquires, for example, 80 bytes of data from a head of the manufacturing information table 233 using the "Read FRU Data" command. The start-up control unit 311 extracts manufacturing information, such as a "Manufacturer Name", a "Product Part/Model Number", and a "Product Serial Number" from the acquired 80 bytes of data.

The start-up control unit 311 registers each value of the "Manufacturer Name", the "Product Part/Model Number", and the "Product Serial Number" that have been extracted from the received response data in the field of manufacturing information in the record 350a of the blade management table 350.

[Step S35] The start-up control unit 311 notifies the standby system management card of the sensor information and the manufacturing information that have been received from the server blade 200a in steps S33 and S34, using the "Platform Event Message" command.

In the standby system management card that has received the "Platform Event Message" command, the standby system processing unit 321 of the blade management unit 310a registers the sensor information and the manufacturing information that have been received from the operation system management card in each field of sensor information and manufacturing information in the record 350a of the blade management table 350.

[Step S36] The start-up control unit 311 notifies the standby system management card using the "Platform Event Message" command that information gathering from the server blade 200a has been completed.

[Step S37] The start-up control unit 311 requests the blade monitoring unit 341 in the blade management unit 310a to start operation monitoring processing of the server blade 200a, and ends the start-up control of the server blade 200a.

According to the above processing at the time of start-up illustrated in FIGS. 10 and 11, transition from the state 1 to the state 4 in the server blade 200a is managed by the start-up control unit 311 of the blade management unit 310a. In a process where the server blade 200a starts, the start-up control unit 311 collects information on the server blade 200a from the server blade 200a in accordance with a previously decided procedure. If there is no problem in the collected information, the start-up control unit 311 then makes the state of the server blade 200a transition, and collects information prescribed in the next state.

The start-up control unit 311 determines, based on the collected information, whether there is any problem if power is supplied to the server blade 200a from the power module 410 shared in the chassis 110. Only when determining that there is no problem if power is supplied, the start-up control unit 311 then permits the server blade 200a to be completely started. Such a procedure is executed, whereby a probability of occurrence of abnormality at completion of start-up of the server blade 200a is reduced, and reliability of the blade server system 100 improves.

In addition, in the processing of the above-described FIGS. 10 and 11, the start-up control unit 311 of the blade management unit 310a determines whether to permit the server blade 200a to transition to the state 4 after the server blade 200a transitions to the state 3, and turns off the update permission flag FL0 until it permits the server blade 200a to transition to the state 4. As a result, the current allowable power 362 is not updated by the other blade management units 310b to 310h until the server blade 200a is permitted to transition to the state 4 after the transition to the state 3. Therefore, even when start-up processing or power-off processing in at least one of the other server blades 200b to 200h is executed in parallel, when the server blade 200a transitions from the state 3 to the state 4, it is possible to accurately calculate the current allowable power 362. Accordingly, it is possible to make the server blade inserted in the blade server system 100 operate in a range not exceeding allowable power of the power module 410, and to maintain reliability of the blade server system 100.

It is to be noted that in the processing of FIG. 11, processing which updates the current allowable power 362 by the subtraction result in step S24 (step S27), notifies the standby system management card of each value of the subtraction result and the current allowable power 362 (step S28), and restores the update permission flag FL0 to on (step S30) may be, for example, executed after a notification that the server blade 200a has transitioned to the state 4 is received in step S31.

Incidentally, the above-described processing illustrated in FIGS. 10 and 11 is the processing executed by the start-up control unit 311 of the blade management unit 310a of the operation system management card, when the operation system management card is not changed during the start-up processing of the server blade 200a. However, as will be mentioned later, when the operation system management card is changed to another management card during the start-up processing of the server blade 200a, start-up control is taken over in the middle of the above-described processing procedure by the start-up control unit 311 of the blade management unit 310a of the management card that has newly operated as the operation system.

Figure 12:
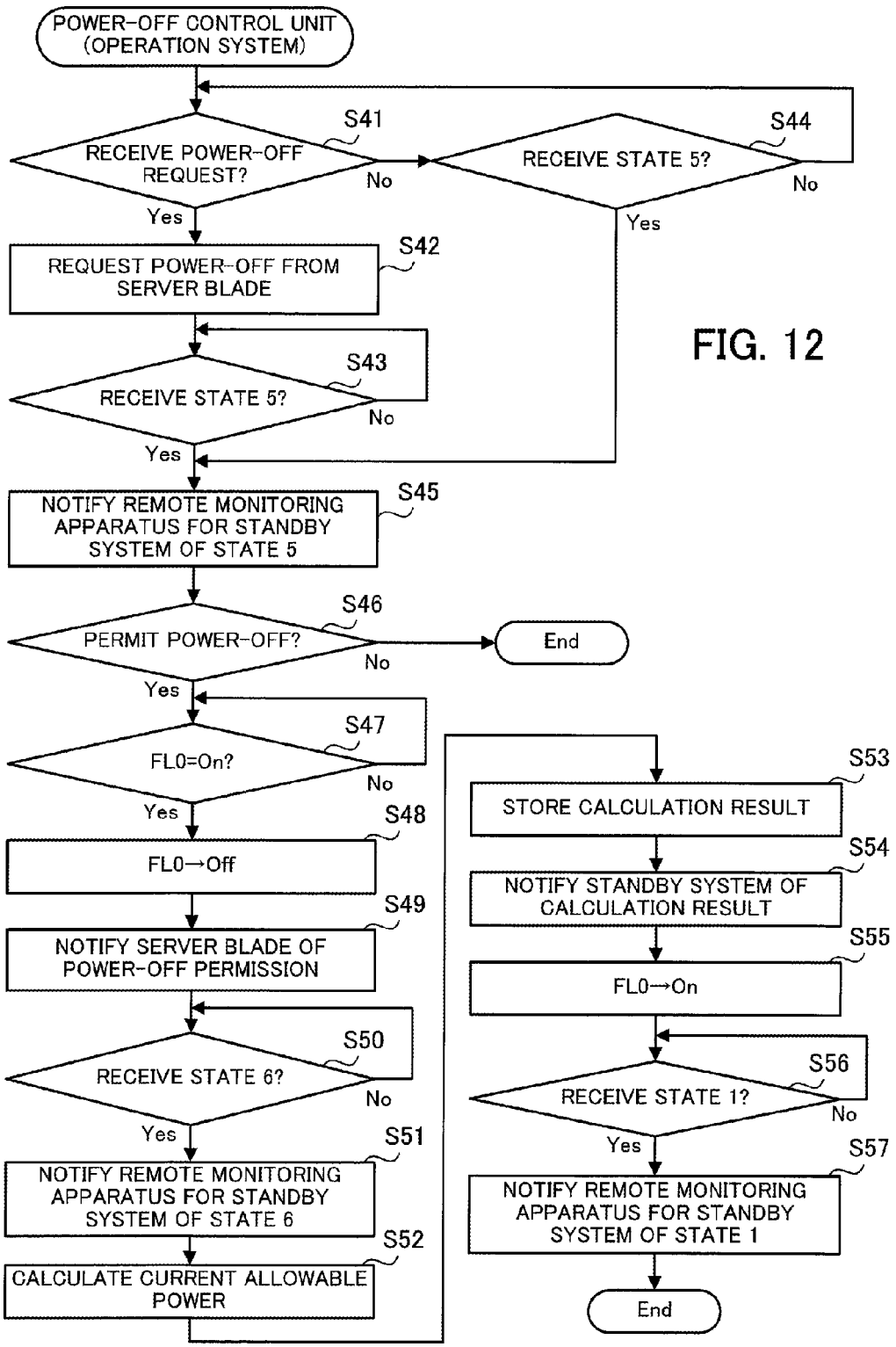
FIG. 12 is a flow chart illustrating an example of a power-off control procedure by a power-off control unit of the operation system management card.

Next, FIG. 12 is a flow chart illustrating an example of a power-off control procedure by the power-off control unit of the operation system management card. Processing illustrated in FIG. 12 is the processing executed by the power-off control unit 312 of the blade management unit 310a of the operation system management card.

Note that it is assumed that in an initial state of FIG. 12, the server blade 200a is in the state 4, which is the operation state, and the blade management unit 310a of the operation system management card is in a state of having recognized that the server blade 200a is in the state 4. When the start-up control unit 311 receives the state information indicating the state 4 from the server blade 200a, and the information indicating the state 4 is registered in the field of state information in the record 350a of the blade management table 350 (corresponding to step S31 of FIG. 11), the power-off control unit 312 of the blade management unit 310a recognizes that the server blade 200a has transitioned to the state 4.

[Step S41] When monitoring a power-off request to the server blade 200a from the remote monitoring apparatus 520, and receiving the power-off request, the power-off control unit 312 executes processing of step S42. In addition, when for example, measuring a time from the start of monitoring processing of step S41, and not receiving the power-off request in a certain time, the power-off control unit 312 executes processing of step S44.

[Step S42] The power-off control unit 312 requests power-off from the start-up/power-off processing unit 221 of the server blade 200a.

When receiving the power-off request from the power-off control unit 312, the start-up/power-off processing unit 221 of the server blade 200a starts power-off processing, transitions to the state 5, and notifies the operation system management card of having transitioned to the state 5 using the "Platform Event Message" command.

[Step S43] The power-off control unit 312 monitors state information from the start-up/power-off processing unit 221 of the server blade 200a. When receiving the state information indicating the state 5 where power-off processing has been started from the start-up/power-off processing unit 221 of the server blade 200a, the power-off control unit 312 registers the state information indicating the state 5 in the field of state information in the record 350a of the blade management table 350, and subsequently executes processing of step S45.

[Step S44] The power-off control unit 312 monitors state information from the start-up/power-off processing unit 221 of the server blade 200a. When receiving the state information indicating the state 5 from the start-up/power-off processing unit 221 of the server blade 200a, the power-off control unit 312 registers the state information indicating the state 5 in the field of state information in the record 350a of the blade management table 350, and subsequently executes processing of step S45. In addition, when for example, measuring a time from the start of monitoring processing of step S44, and not receiving state information in a certain time, the power-off control unit 312 executes processing of step S41.

It is to be noted that a case where the power-off control unit 312 receives the state information indicating the state 5 from the start-up/power-off processing unit 221 of the server blade 200a in step S44 means the case where power-off processing of the server blade 200a is started without according to the power-off request from the remote monitoring apparatus 520. As such an example, it is considered a case where power-off of the server blade 200a is requested by manipulation input to the power switch 208 included in the server blade 200a. When manipulation input is performed to the power switch 208 in the state 4, the start-up/power-off processing unit 221 of the server blade 200a starts power-off processing, transitions to the state 5, and notifies the operation system management card of having transitioned to the state 5 using the "Platform Event Message" command.

[Step S45] The power-off control unit 312 notifies the standby system management card of the state information indicating the state 5 using the "Set MMC Notice" command. In addition, the power-off control unit 312 also notifies the remote monitoring apparatus 520 of the state information indicating the state 5.

In the standby system management card that has received the notification of the state information indicating the state 5, the standby system processing unit 321 of the blade management unit 310a registers the received state information in the field of state information in the record 350a of the blade management table 350.

[Step S46] The power-off control unit 312 determines whether to permit the start-up/power-off processing unit 221 of the server blade 200a to turn off the power. In this processing, the power-off control unit 312 recognizes that the server blade 200a has transitioned from the state 4 to the state 5 based on the state information, and thereby permits power-off. When permitting power-off, the power-off control unit 312 executes processing of step S47. Meanwhile, when determining not to permit power-off, the power-off control unit 312, for example, notifies the start-up/power-off processing unit 221 of the server blade 200a of an error, and subsequently ends power-off control.

[Step S47] The power-off control unit 312 references a value of the update permission flag FL0 indicating whether or not it is possible to update the current allowable power 362. If the update permission flag FL0 is on, the power-off control unit 312 executes processing of step S48. Meanwhile, when the update permission flag FL0 is off, the power-off control unit 312 temporarily stops processing, and executes processing of step S48 after the update permission flag FL0 becomes on.

[Step S48] The power-off control unit 312 turns off the value of the update permission flag FL0 to thereby produce a state where the other blade management units 310b to 310h do not update the current allowable power 362.

[Step S49] The power-off control unit 312 transmits a power-off permission notification to the start-up/power-off processing unit 221 of the server blade 200a.

When receiving the power-off permission notification from the power-off control unit 312, the start-up/power-off processing unit 221 of the server blade 200a transitions to the state 6 where power-off processing is being performed, and notifies the operation system management card of having transitioned to the state 6 using the "Platform Event Message" command. Subsequently, the start-up/power-off processing unit 221 controls the power circuit 209, and stops power supply into the server blade 200a excluding the IPMC 206. When the power supply into the server blade 200a excluding the IPMC 206 is stopped, the start-up/power-off processing unit 221 transitions to the state 1, and notifies the operation system management card of having transitioned to the state 1 using the "Platform Event Message" command.

[Step S50] When monitoring state information from the start-up/power-off processing unit 221 of the server blade 200a, and receiving state information indicating the state 6 where power-off processing is being performed, the power-off control unit 312 executes processing of step S51.

[Step S51] The power-off control unit 312 notifies the standby system management card of the state information indicating the state 6 using the "Set MMC Notice" command. In addition, the power-off control unit 312 also notifies the remote monitoring apparatus 520 of the state information indicating the state 6.

In the standby system management card that has received the notification of the state information indicating the state 6, the standby system processing unit 321 of the blade management unit 310a registers the received state information in the field of state information in the record 350a of the blade management table 350.

[Step S52] The power-off control unit 312 recalculates the current allowable power 362. Specifically, the power-off control unit 312 reads the value of power consumption of the server blade 200a registered in the field of power information from the record 350a of the blade management table 350. The power-off control unit 312 adds the read value of power consumption to the value of the current allowable power 362 held in the RAM 302.

[Step S53] The power-off control unit 312 updates the value of the current allowable power 362 held in the RAM 302 using an addition result in step S52. In addition, the power-off control unit 312 deletes the value of power consumption of the server blade 200a from the field of power information in the record 350a of the blade management table 350.

[Step S54] The power-off control unit 312 notifies the standby system management card of the addition result (i.e., a value of the current allowable power 362 after update) in step S52 using the "Set MMC Notice" command.

In the standby system management card that has received the "Set MMC Notice" command, the standby system processing unit 321 of the blade management unit 310a updates the value of the current allowable power 362 held in the RAM 302 using the received addition result. In addition to this, the standby system processing unit 321 deletes the value registered in the field of power information in the record 350a of the blade management table 350.

[Step S55] The power-off control unit 312 restores the update permission flag FL0 to on.

[Step S56] The power-off control unit 312 monitors state information from the start-up/power-off processing unit 221 of the server blade 200a. When receiving state information indicating the state 1, which is the power-off state, from the start-up/power-off processing unit 221 of the server blade 200a, the power-off control unit 312 executes processing of step S57.

[Step S57] The power-off control unit 312 notifies the standby system management card of the state information indicating the state 1 using the "Set MMC Notice" command. In addition, the power-off control unit 312 also notifies the remote monitoring apparatus 520 of the state information indicating the state 1. With that, power-off control to the server blade 200a is ended.

In the standby system management card that has received the notification of the state information indicating the state 1, the standby system processing unit 321 of the blade management unit 310a registers the received state information in the field of state information in the record 350a of the blade management table 350.

According to the above processing at the time of power-off illustrated in FIG. 12, transition from the state 4 to the state 1 in the server blade 200a is managed by the power-off control unit 312 of the blade management unit 310a. The power-off control unit 312 makes the server blade 200a transition from the state 4 to the state 1 according to a previously decided procedure. As a result, a probability of occurrence of abnormality at the time of power-off processing in the server blade 200a is reduced, and reliability of the blade server system improves.

In addition, in a process where the server blade 200a transitions from the state 4 to the state 1, a value of power consumption of the server blade 200a is added to the current allowable power 362 held in the RAM 302. As a result, power consumed by the server blade 200a is returned to allowable power of the whole blade server system 100, and for example, it becomes possible to supply power from the power module 410 to a server blade to be newly started.

In addition, in the above-described processing of FIG. 12, the power-off control unit 312 of the blade management unit 310a updates the current allowable power 362 after permitting the server blade 200a to transition to the state 6, and turns off the update permission flag FL0 until it notifies the standby system management card of the updated current allowable power 362. As a result, the current allowable power 362 is not updated by the other blade management units 310b to 310h, after the power-off control unit 312 permits the server blade 200a to transition to the state 6, until the power-off control unit 312 updates the current allowable power 362 and notifies the standby system management card of the updated current allowable power 362. Therefore, when the server blade 200a transitions from the state 6 to a state 7 or the state 1, even when start-up processing or power-off processing in at least one of the other server blades 200b to 200h is executed in parallel, it is possible to accurately calculate the current allowable power 362. Accordingly, it is possible to make the server blade inserted in the blade server system 100 operate in a range not exceeding allowable power of the power module 410, and to maintain reliability of the blade server system 100.

It is to be noted that in the processing of FIG. 12, processing that updates the current allowable power 362 (step S53), notifies the standby system management card of the updated current allowable power 362 (step S54), and restores the update permission flag FL0 to on (step S55) may be, for example, executed after a notification that the server blade 200a has transitioned to the state 1 is received in step S57.

Incidentally, the above processing illustrated in FIG. 12 is the processing executed by the power-off control unit 312 of the blade management unit 310a of the operation system management card, when the operation system management card is not changed during the power-off processing of the server blade 200a. However, as will be mentioned later, when the operation system management card is changed to another management card during the power-off processing of the server blade 200a, power-off control is taken over in the middle of the above-described processing procedure by the power-off control unit 312 of the blade management unit 310a of the management card that has newly operated as the operation system.

Next, there will be described using a sequence diagram a processing example of each apparatus in the system when start-up processing and power-off processing of the server blade are normally executed by one operation system management card.

Figure 13:
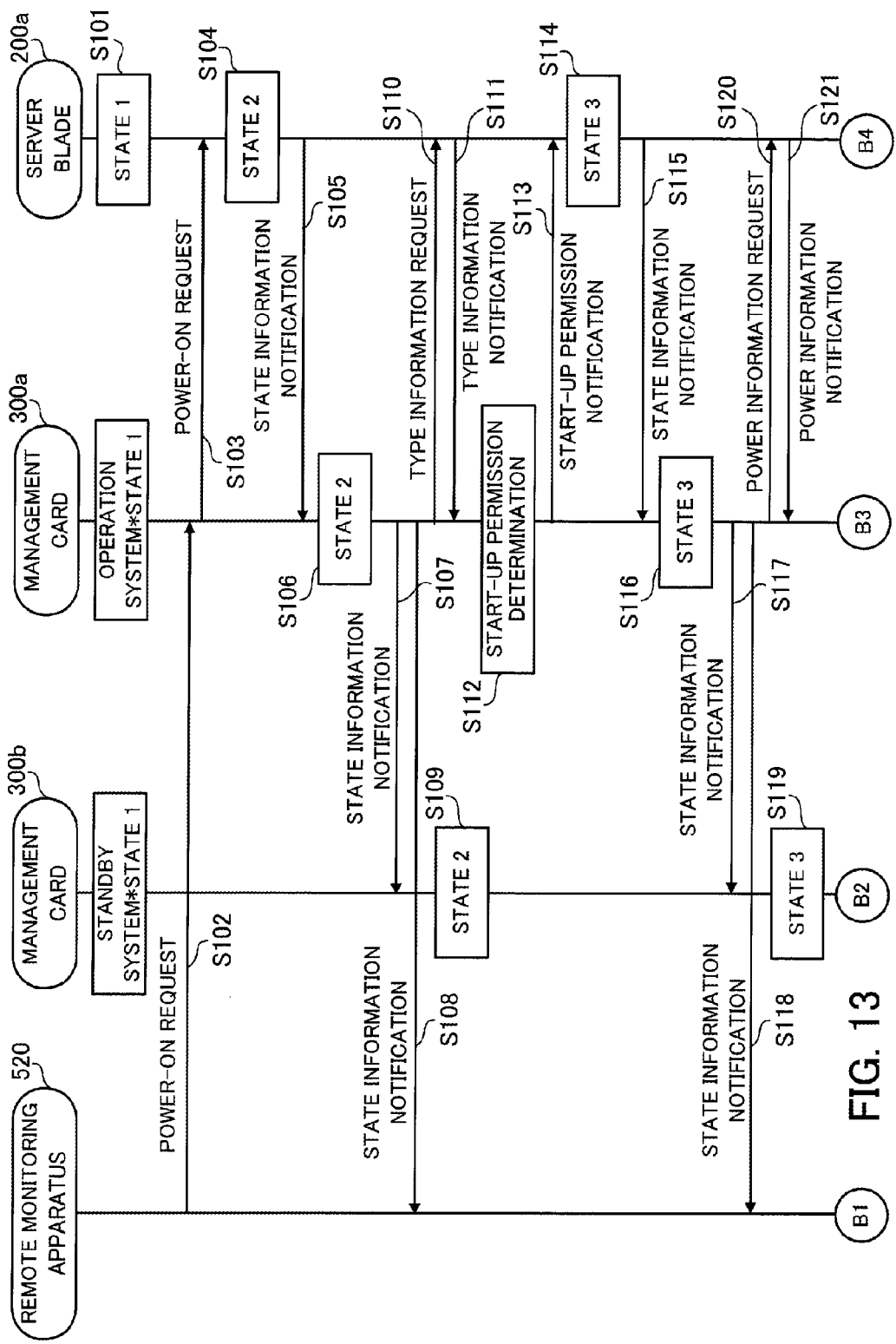
FIG. 13 is a sequence diagram illustrating a processing example of each apparatus when the server blade starts up.
Figure 14:
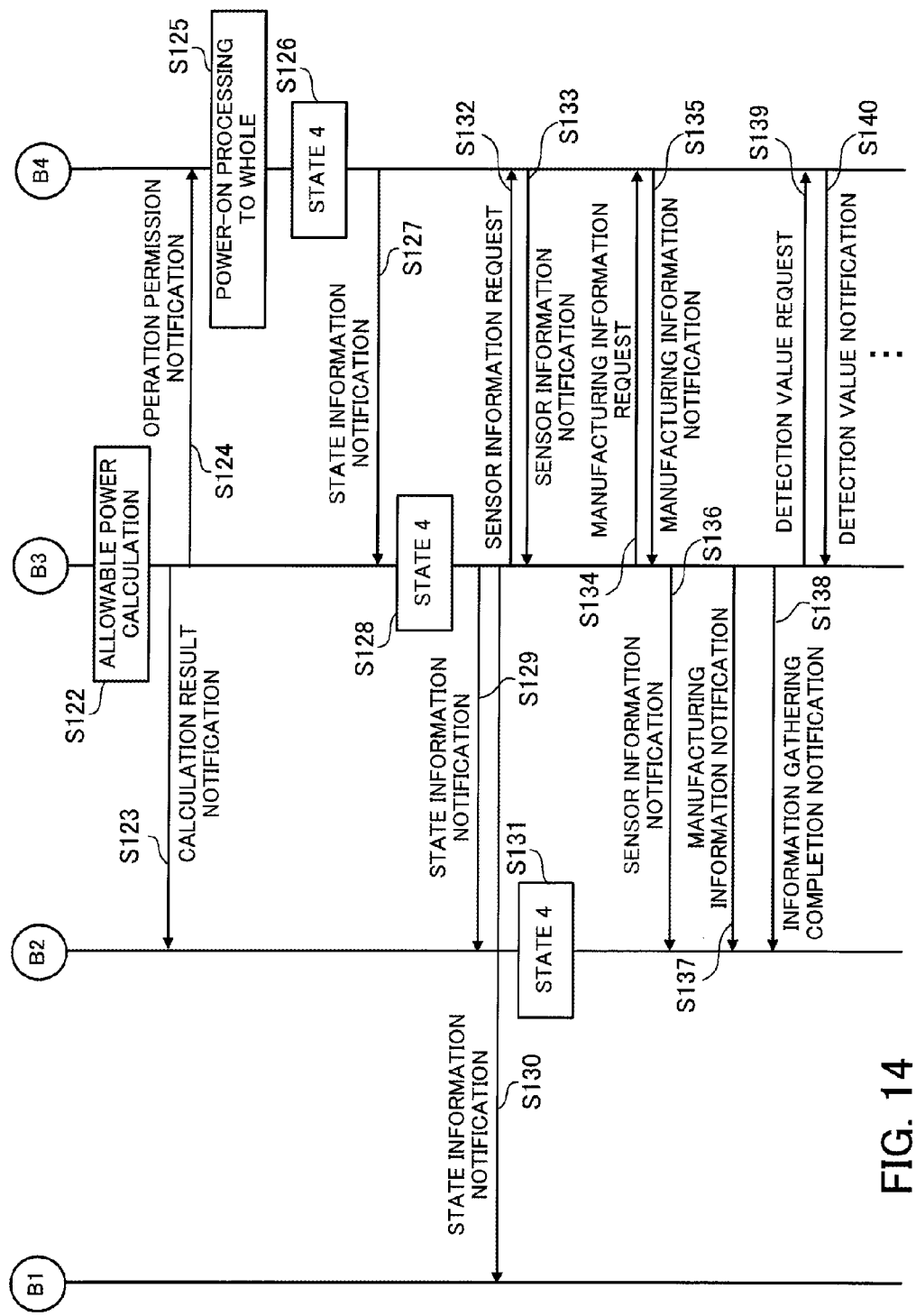
FIG. 14 is a sequence diagram illustrating a processing example of each apparatus when the server blade starts up.

First, FIGS. 13 and 14 are sequence diagrams illustrating a processing example of each apparatus when the server blade is started.

It is to be noted that processing when the server blade 200a is started will be described as an example in FIGS. 13 and 14. Therefore, processing of the start-up control unit 311 of the management card 300a described in FIGS. 13 and 14 is the processing executed by the start-up control unit 311 in the blade management unit 310a of the management card 300a. In addition, processing of the standby system processing unit 321 of the management card 300b described in FIGS. 13 and 14 is the processing executed by the standby system processing unit 321 in the blade management unit 310a of the management card 300b. When the server blades other than the server blade 200a are started, in the management cards 300a and 300b, similar processing to the management cards 300a and 300b of FIGS. 13 and 14 is performed by the blade management unit corresponding to the server blade to be started.

It is assumed that in an initial state of FIG. 13, the management card 300a is the operation system and the management card 300b is the standby system. In addition, it is assumed that the server blade 200a is in the state 1, and both the management cards 300a and 300b are in a state of having recognized that the server blade 200a is in the state 1 (step S101).

From the above-described state, for example, a request to turn on the power of the server blade 200a is issued from the remote monitoring apparatus 520 to the operation system management card 300a (step S102). The start-up control unit 311 of the management card 300a requests power-on from the start-up/power-off processing unit 221 of the server blade 200a according to the request from the remote monitoring apparatus 520 (step S103).

The start-up/power-off processing unit 221 of the server blade 200a transitions to the state 2 where start-up processing has been started (step S104), and notifies the management card 300a of state information indicating the state 2 using the "Platform Event Message" command (step S105). The start-up control unit 311 of the blade management unit 310a of the management card 300a recognizes that the server blade 200a has transitioned to the state 2 (step S106), and registers the state information indicating the state 2 in the field of state information in the record 350a of the blade management table 350. The start-up control unit 311 notifies the management card 300b of the state information indicating the state 2 using the "Set MMC Notice" command (step S107). At this time, the start-up control unit 311 also notifies the remote monitoring apparatus 520 of the state information indicating the state 2 (step S108). The standby system processing unit 321 of the management card 300b receives the state information from the management card 300a, and registers it in the field of state information in the record 350a of the blade management table 350 (step S109).

It is to be noted that for example, when power-on of the server blade 200a is requested by manipulation input to the power switch 208 included in the server blade 200a, the remote monitoring apparatus 520 does not issue a power-on request, and thus processing of step S104 is executed without steps S102 and S103 being executed.

The start-up control unit 311 of the management card 300a that has recognized the transition to the state 2 requests transmission of type information from the server blade 200a using the "Get Device ID" command (step S110). The start-up/power-off processing unit 221 of the server blade 200a sends back to the management card 300a response data in which "00h" has been set to the "Completion Code" as type information (step S111).

The start-up control unit 311 of the management card 300a determines whether or not the server blade 200a is the server blade in which its own blade monitors an operation state and supports start-up/power-off control, based on the notified type information (step S112). In the determination processing, when a value of the "Completion Code" is "00h", the start-up control unit 311 determines that the server blade 200a is the server blade that supports control. When determining that the server blade 200a is the support target, the start-up control unit 311 of the management card 300a transmits a start-up permission notification to the server blade 200a (step S113).

When receiving the start-up permission notification, the start-up/power-off processing unit 221 of the server blade 200a transitions to the state 3 where start-up processing is being performed (step S114), and notifies the management card 300a of state information indicating the state 3 using the "Platform Event Message" command (step S115). The start-up control unit 311 of the management card 300a recognizes that the server blade 200a has transitioned to the state 3 (step S116), and registers the state information indicating the state 3 in the field of state information in the record 350a of the blade management table 350. The start-up control unit 311 notifies the management card 300b of the state information indicating the state 3 using the "Set MMC Notice" command (step S117). At this time, the start-up control unit 311 also notifies the remote monitoring apparatus 520 of the state information indicating the state 3 (step S118). The standby system processing unit 321 of the management card 300b receives the state information from the management card 300a, and registers it in the field of state information in the record 350a of the blade management table 350 (step S119).

In addition, the start-up control unit 311 of the management card 300a that has recognized the transition to the state 3 turns off the update permission flag FL0, and subsequently requests transmission of power information using the "Get Power Level" command from the start-up/power-off processing unit 221 of the server blade 200a (step S120). The start-up/power-off processing unit 221 of the server blade 200a reads the power information 231 from the NVRAM 207, and notifies the management card 300a of the power information 231 (step S121).

The start-up control unit 311 of the management card 300a subtracts a value of power consumption indicated by the power information received from the server blade 200a from the value held as the current allowable power 362 in the RAM 302, and determines whether or not it is possible to supply power to the server blade 200a based on its subtraction result (step S122). When the subtraction result is not less than zero, the start-up control unit 311 determines that it is possible to supply power to the server blade 200a. At this time, the start-up control unit 311 updates the value of the current allowable power 362 held in the RAM 302 using the subtraction result. Furthermore, the start-up control unit 311 notifies the management card 300b of the subtraction result using the "Set MMC Notice" command (step S123), and subsequently transmits an operation permission notification to the start-up/power-off processing unit 221 of the server blade 200a (step S124). In addition, the start-up control unit 311 restores the update permission flag FL0 to on.

When receiving the operation permission notification, the start-up/power-off processing unit 221 of the server blade 200a makes the power circuit 209 start power supply to the whole server blade 200a (step S125). When the power supply to the whole apparatus is completed, the start-up/power-off processing unit 221 transitions to the state 4, which is the operation state where power-on to the whole server blade 200a is completed (step S126). The start-up/power-off processing unit 221 notifies the management card 300a of the state information indicating the state 4 using the "Platform Event Message" command (step S127).

The start-up control unit 311 of the management card 300a recognizes that the server blade 200a has transitioned to the state 4 (step S128), and registers the state information indicating the state 4 in the field of state information in the record 350a of the blade management table 350. The start-up control unit 311 notifies the management card 300b of the state information indicating the state 4 using the "Set MMC Notice" command (step S129). At this time, the start-up control unit 311 also notifies the remote monitoring apparatus 520 of the state information indicating the state 4 (step S130). The standby system processing unit 321 of the management card 300b receives the state information from the management card 300a, and registers it in the field of state information in the record 350a of the blade management table 350 (step S131).

In addition, the start-up control unit 311 of the management card 300a that has recognized the transition to the state 4 requests transmission of sensor information from the server blade 200a using the "Get Device SDR" command (step S132). The start-up/power-off processing unit 221 of the server blade 200a selects from the sensor information table 232 a record corresponding to an ID set to the "Record ID" in the request data of the "Get Device SDR" command. The start-up/power-off processing unit 221 reads a "Sensor Number" and a "Sensor Type" from the selected sensor information table 232, and transmits to the management card 300a response data in which the read information has been stored in the "Requested bytes" (step S133).

The start-up control unit 311 of the management card 300a that has received the response data registers each value of the "Sensor Number" and the "Sensor Type" that have been extracted from the received response data in association with each other in the field of sensor information in the record 350a of the blade management table 350. In addition, the start-up control unit 311 sequentially issues the "Get Device SDR" command while changing a value of the "Record ID" to thereby acquire sensor information on all the sensors included in the server blades, and registers the sensor information in the record 350a of the blade management table 350.

The start-up control unit 311 of the management card 300a further requests transmission of manufacturing information from the server blade 200a using the "Read FRU Data" command (step S134). When transmission of the manufacturing information is requested, the start-up control unit 311 first acquires 8-bytes of data from the head of the FRU information area 234 in the server blade 200a using the "Read FRU Data" command. The start-up control unit 311 then acquires from the acquired 8 bytes of data the head address of the manufacturing information table 233 (Product Info Area) in the FRU information area 234. Next, the start-up control unit 311 acquires, for example, 80 bytes of data from a head of the manufacturing information table 233 using the "Read FRU Data" command. Manufacturing information, such as a "Manufacturer Name", a "Product Part/Model Number", and a "Product Serial Number", is included in the 80 bytes of data acquired at this time (step S135).

The start-up control unit 311 registers each value of the "Manufacturer Name", the "Product Part/Model Number", and the "Product Serial Number" that have been extracted from the received response data in the field of manufacturing information in the record 350a of the blade management table 350.

The start-up control unit 311 of the management card 300a notifies the management card 300b of sensor information 223 and manufacturing information 224 that have been received from the server blade 200a using the "Platform Event Message" command (steps S136 and S137). The standby system processing unit 321 of the management card 300b registers the received sensor information and manufacturing information in each field of sensor information and manufacturing information in the record 350a of the blade management table 350. The start-up control unit 311 of the management card 300a notifies the management card 300b using the "Platform Event Message" command that information gathering has been completed, completes the start-up control (step S138), and starts processing of the blade monitoring unit 341 in the blade management unit 310a.

The blade monitoring unit 341 periodically requests transmission of a detection value of the sensor from the server blade 200a using the "Get Sensor Reading" command (step S139). The sensor detection value transmission unit 222 of the server blade 200a notifies the blade monitoring unit 341 of the management card 300a of each detection value of the temperature sensor 210 and the voltage sensor 211 according to a request from the management card 300a (step S140).

According to the above processing at the time of start-up illustrated in FIGS. 13 and 14, transition from the state 1 to the state 4 in the server blade 200a is managed by the start-up control unit 311 of the management card 300*a*. In the process where the server blade 200*a* starts, the start-up control unit 311 collects information on the server blade 200*a* from the server blade 200*a* in accordance with the previously decided procedure. If there is no problem in the collected information, the start-up control unit 311 then makes the state of the server blade 200*a* transition, and collects information prescribed in the next state.

The start-up control unit 311 determines based on the collected information whether there is a problem if power is supplied to the server blade 200*a* from the power module 410 shared in the chassis 110. Only when determining that there is no problem if power is supplied, the start-up control unit 311 then permits the server blade 200*a* to be completely started. Such a procedure is executed, whereby a probability of occurrence of abnormality when start-up of the server blade 200*a* has been completed is reduced, and reliability of the blade server system 100 improves.

Figure 15:
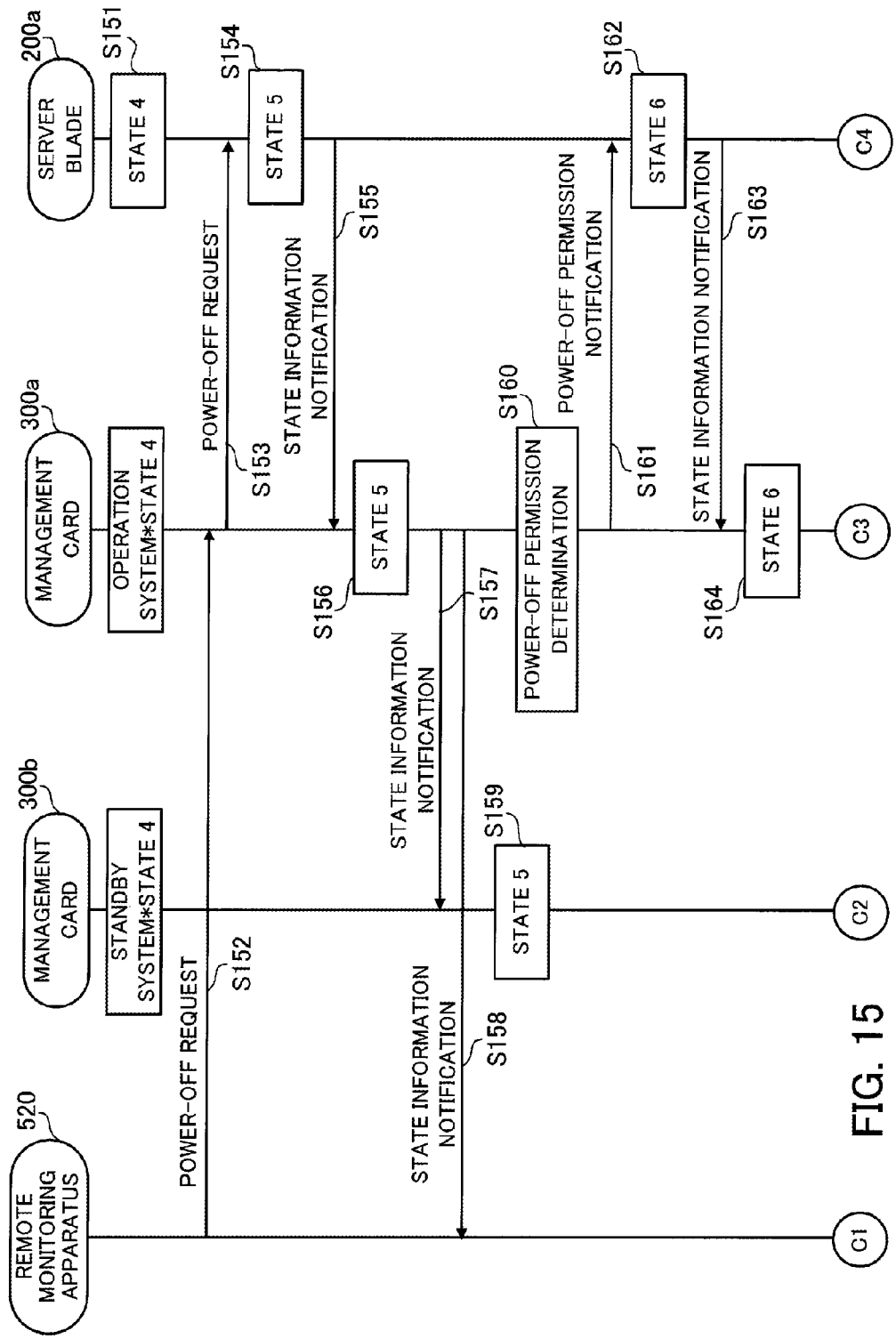
FIG. 15 is a sequence diagram illustrating a processing example of each apparatus when power of the server blade is turned off.
Figure 16:
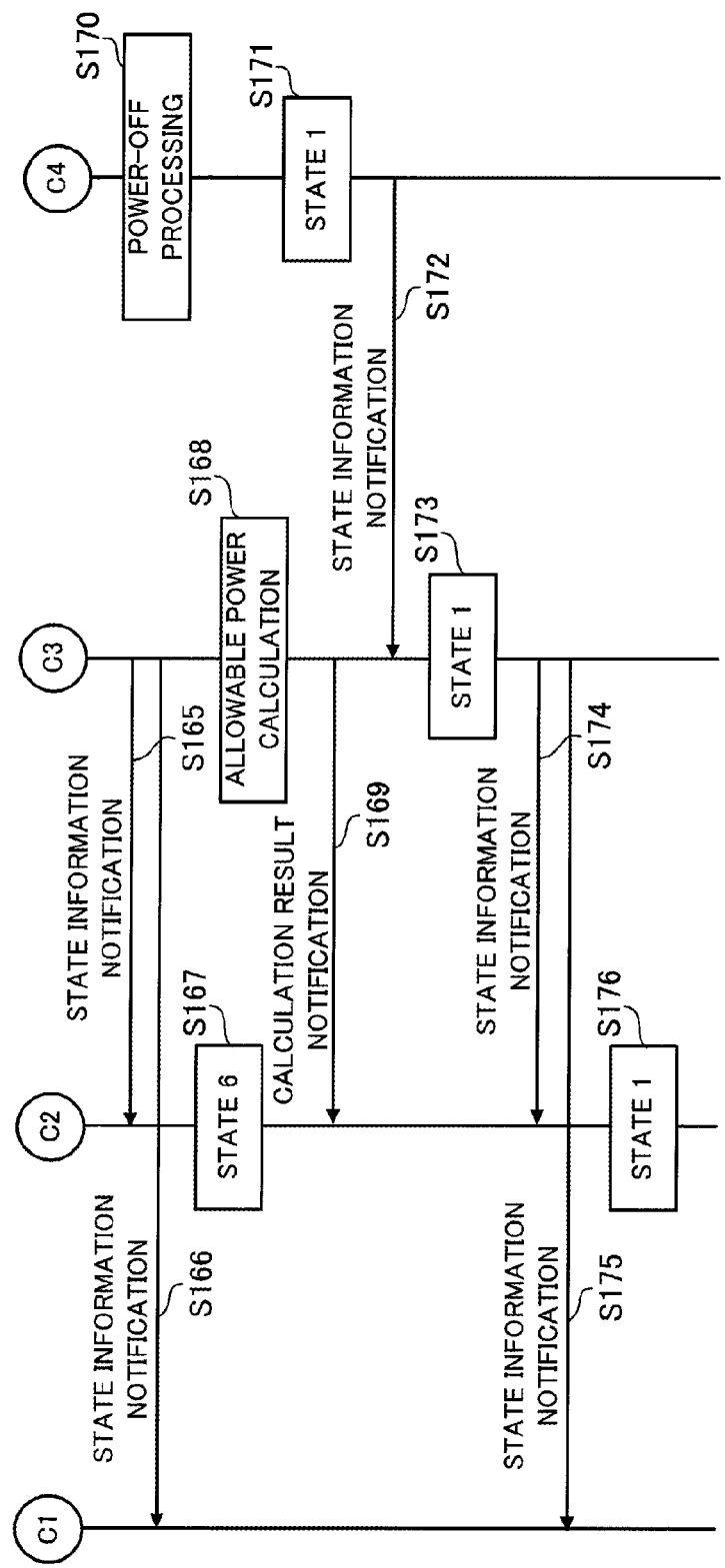
FIG. 16 is a sequence diagram illustrating a processing example of each apparatus when power of the server blade is turned off.

Next, FIGS. 15 and 16 are sequence diagrams illustrating a processing example of each apparatus when power of the server blade is turned off.

It is to be noted that processing when power of the server blade 200*a* is turned off will be described as an example in FIGS. 15 and 16. Therefore, processing of the power-off control unit 312 of the management card 300*a* described in FIGS. 15 and 16 is the processing executed by the power-off control unit 312 in the blade management unit 310*a* of the management card 300*a*. In addition, processing of the standby system processing unit 321 of the management card 300*b* described in FIGS. 15 and 16 is the processing executed by the standby system processing unit 321 in the blade management unit 310*a* of the management card 300*b*. When power of the server blades other than the server blade 200*a* is turned off, in the management cards 300*a* and 300*b*, similar processing to the management cards 300*a* and 300*b* of FIGS. 15 and 16 is performed by the blade management unit corresponding to the server blade whose power is turned off.

It is assumed that in an initial state of FIG. 15, the management card 300*a* is the operation system, and the management card 300*b* is the standby system. In addition, it is assumed that the server blade 200*a* is in the state 4, and both the management cards 300*a* and 300*b* are in a state of having recognized that the server blade 200*a* is in the state 4 (step S151).

From the above-described state, for example, a request to turn off the power of the server blade 200*a* is issued from the remote monitoring apparatus 520 to the operation system management card 300*a* (step S152). The power-off control unit 312 of the management card 300*a* requests power-off from the start-up/power-off processing unit 221 of the server blade 200*a* according to the request from the remote monitoring apparatus 520 (step S153).

The start-up/power-off processing unit 221 of the server blade 200*a* transitions to the state 5 where power-off processing has been started (step S154), and notifies the management card 300*a* of state information indicating the state 5 using the "Platform Event Message" command (step S155). The power-off control unit 312 of the management card 300*a* recognizes that the server blade 200*a* has transitioned to the state 5 (step S156), and registers the state information indicating the state 5 in the field of state information in the record 350*a* of the blade management table 350. The power-off control unit 312 notifies the management card 300*b* of the state information indicating the state 5 using the "Set MMC Notice" command (step S157). At this time, the power-off control unit 312 also notifies the remote monitoring apparatus 520 of the state information indicating the state 5 (step S158).

The standby system processing unit 321 of the management card 300*b* receives the state information from the management card 300*a*, and registers it in the field of state information in the record 350*a* of the blade management table 350 (step S159).

It is to be noted that for example, when power-off of the server blade 200*a* is requested by manipulation input to the power switch 208 included in the server blade 200*a*, the remote monitoring apparatus 520 does not issue a power-off request, and thus processing of step S154 is executed without steps S152 and S153 being executed.

The power-off control unit 312 of the management card 300*a* that has recognized the transition to the state 5 determines whether to permit power-off of the server blade 200*a* (step S160). When determining to permit the power-off, the power-off control unit 312 transmits a power-off permission notification to the start-up/power-off processing unit 221 of the server blade 200*a* (step S161). At this time, the power-off control unit 312 turns off the update permission flag FL0.

The start-up/power-off processing unit 221 of the server blade 200*a* transitions to the state 6 where power-off processing is being performed (step S162), and notifies the management card 300*a* of state information indicating the state 6 using the "Platform Event Message" command (step S163). The power-off control unit 312 of the management card 300*a* recognizes that the server blade 200*a* has transitioned to the state 6 (step S164), and registers the state information indicating the state 6 in the field of state information in the record 350*a* of the blade management table 350.

The power-off control unit 312 notifies the management card 300*b* of the state information indicating the state 6 using the "Set MMC Notice" command (step S165). At this time, the power-off control unit 312 also notifies the remote monitoring apparatus 520 of the state information indicating the state 6 (step S166). The standby system processing unit 321 of the management card 300*b* receives the state information from the management card 300*a*, and registers it in the field of state information in the record 350*a* of the blade management table 350 (step S167).

In addition, the power-off control unit 312 of the management card 300*a* that has recognized the transition to the state 6 recalculates the current allowable power 362 (step S168). The power-off control unit 312 reads the value of power consumption of the server blade 200*a* registered in the field of power information from the record 350*a* of the blade management table 350. The power-off control unit 312 adds the read value of power consumption to the value of the current allowable power 362 held in the RAM 302, and updates the value of the current allowable power 362 held in the RAM 302 using the addition result. In addition, the power-off control unit 312 deletes the value of power consumption of the server blade 200*a* from the field of power information in the record 350*a* of the blade management table 350.

The power-off control unit 312 notifies the management card 300*b* of the addition result (i.e., a value of the current allowable power 362 after update) using the "Set MMC Notice" command (step S169).

Meanwhile, when the server blade 200*a* transitions to the state 6, the start-up/power-off processing unit 221 of the server blade 200*a* requests the power circuit 209 to stop power supply to each unit in the server blade 200*a* excluding the IPMC 206 (step S170). When power supply to each unit in the server blade 200*a* excluding the IPMC 206 is stopped, the start-up/power-off processing unit 221 transitions to the state 1, which is the power-off state (step S171), and notifies the management card 300a of the state information indicating the state 1 using the "Platform Event Message" command (step S172).

The power-off control unit 312 of the management card 300a recognizes that the server blade 200a has transitioned to the state 1 (step S173), and registers the state information indicating the state 1 in the field of state information in the record 350a of the blade management table 350. The power-off control unit 312 notifies the management card 300b of the state information indicating the state 1 using the "Set MMC Notice" command (step S174). At this time, the power-off control unit 312 also notifies the remote monitoring apparatus 520 of the state information indicating the state 1 (step S175). The standby system processing unit 321 of the management card 300b receives the state information from the management card 300a, and registers it in the field of state information in the record 350a of the blade management table 350 (step S176).

According to the above processing at the time of power-off illustrated in FIGS. 15 and 16, transition from the state 4 to the state 1 in the server blade 200a is managed by the power-off control unit 312 of the management card 300a. The power-off control unit 312 makes the server blade 200a transition from the state 4 to the state 1 according to the previously decided procedure. As a result, a probability of occurrence of abnormality at the time of power-off processing in the server blade 200a is reduced, and reliability of the blade server system improves.

In addition, in the process where the server blade 200a transitions from the state 4 to the state 1, the value of power consumption of the server blade 200a is added to the current allowable power 362 held in the RAM 302. As a result, power consumed by the server blade 200a is returned to allowable power of the whole blade server system 100, and for example, it becomes possible to supply power from the power module 410 to a server blade to be newly started.

Next, there will be described processing when a management card that has newly operated as the operation system takes over the control processing of the server blade, in a case where the operation system management card is changed to the other management card. Start-up processing and power-off processing in each of the server blades need to be executed in accordance with previously decided order under control of the operation system management card. Start-up processing and power-off processing are executed in accordance with the decided order as described above, and thereby reliability of the blade server system is maintained.

Additionally, even when the operation system management card is changed to the other management card in the middle of the start-up processing and the power-off processing, each server blade needs to execute the start-up processing and the power-off processing with the processing order being followed. If order of start-up processing or power-off processing changes, when the operation system management card is changed to the other management card in the middle of start-up processing or power-off processing, the start-up processing and the power-off processing of the server blade are no longer properly executed, and processing stops.

For example, in a case where the management card that has newly operated as the operation system performs control so that the start-up processing of the server blade is executed from the beginning, when the operation system management card is changed during the start-up processing of the server blade, order of the start-up processing is not followed, and thus start-up processing is not normally completed. In addition, since receiving a notification of the state information of the server blade as needed from the operation system management card, it is possible for the remote monitoring apparatus 520 to monitor whether or not a state of the server blade transitions in the decided order. When the management card that has newly operated as the operation system performs control so that the start-up processing of the server blade is executed from the beginning under monitoring of state transition by the remote monitoring apparatus 520 as described above, the remote monitoring apparatus 520 may detect that order of state transition in the server blade is not followed, and thereby determine that break-down has occurred in the server blade.

Meanwhile, in the above processing examples of FIGS. 12 to 16, the operation system management card notifies as needed also the standby system management card of the state information notified from the server blade. As a result, not only the operation system management card but the standby system management card recognize the state of the server blade.

As a utilizing method of the state information in the standby system management card, it is considered, for example, to utilize latest state information notified from the operation system management card, when the standby system management card transitions from the standby system to the operation system. Processing is considered in which another management card that has transitioned to the operation system continues start-up processing of the server blade with a state of the server blade that its own apparatus recognizes being as a starting point, for example, when the operation system management card broke down during the start-up processing of the server blade.

However, there has been such a problem that only by transferring state information from the operation system management card to the standby system management card as needed, it is not possible for the management card that has newly operated as the operation system to properly take over control of the server blade. This problem arises from the fact that a state to which the server blade actually transitioned and a state of the server blade that the standby system management card recognizes do not necessarily coincide with each other, depending on a timing of break-down occurrence in the operation system management card.

Figure 17:
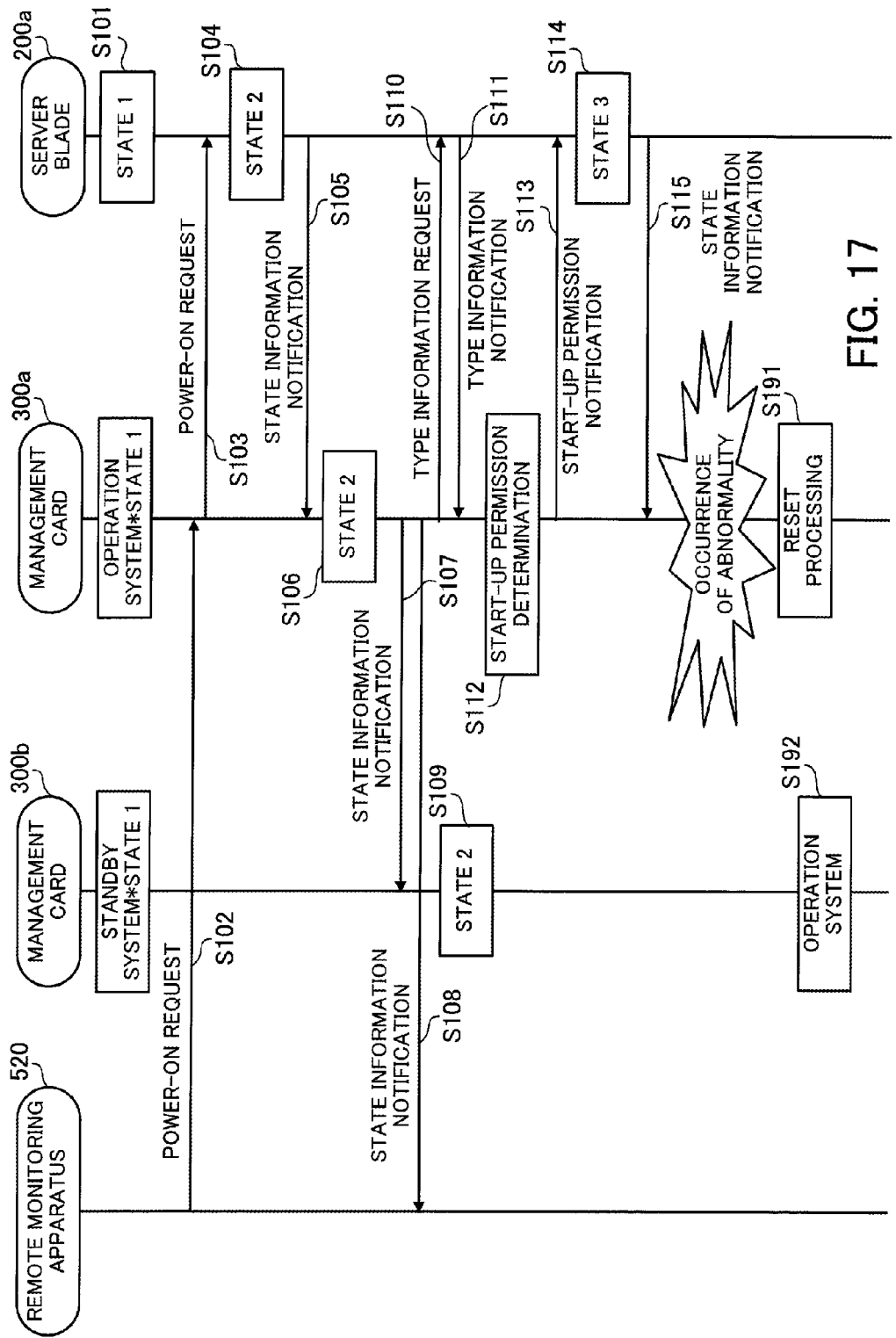
FIG. 17 is a sequence diagram illustrating a reference processing example when a state of the server blade and a state recognized by the standby system management card do not coincide with each other.

Here, FIG. 17 is a sequence diagram illustrating a reference processing example when a state of the server blade and a state recognized by the standby system management card do not coincide with each other. It is to be noted that as an example, processing when the server blade 200a is started is illustrated in FIG. 17 similar to FIG. 13. In addition, in FIG. 17, same symbols are attached to the same processing steps as in FIG. 13.

As mentioned above, when receiving the notification of the state information from the server blade 200a, the start-up control unit 311 of the operation system management card notifies the standby system management card of the state information. For example, in FIG. 17, in step S105, the start-up control unit 311 of the management card 300a receives from the server blade 200a the state information indicating the state 2 where start-up processing has been started, and in step S107, notifies the management card 300b of the state information indicating the state 2. As a result, not only the operation system management card 300a but the standby system management card 300b recognize that the server blade 200a has transitioned to the state 2.

However, in a period until notification of state information indicating a state to which the server blade 200a has transitioned is provided from the operation system management card to the standby system management card after the state of the server blade 200a has transitioned, a state to which the server blade 200a has actually transitioned and the state of the server blade 200a that the standby system management card recognizes do not coincide with each other. Therefore, when the operation system management card is changed to the other management card in this period, it becomes impossible for the new operation system management card to properly discriminate processing that the server blade 200a is made to execute.

For example, when in FIG. 17, transitioning to the state 3 where start-up processing is being performed (step S114), the server blade 200a notifies the operation system management card 300a of the state information indicating the state 3 (step S115). Here, assuming that abnormality occurred in the management card 300a, and the management card 300a was reset immediately after the server blade 200a notified the management card 300a of the state information (step S191), the management card 300b detects reset generation in the management card 300a, and transitions to the operation system (step S192). At this time, in the record 350a of the blade management table 350 that the management card 300b holds, information indicating the state 2 notified from the management card 300a in step S107 has been registered in the field of state information. Namely, since not recognizing that the server blade 200a has transitioned to the state 3, the management card 300b do not execute control decided in the state 3 if this goes on. Accordingly, in the server blade 200a, an instruction of state transition does not come from any of the management cards, and thus processing stops in the state where the server blade 200a has transitioned to the state 3, and the start-up processing is not completed.

In addition, there is a case where also in power-off processing of the server blade, due to a similar cause, control of the power-off processing is not continued depending on timing when the operation system management card is changed, and the power-off processing stops halfway.

In contrast with this, in the present embodiment, when the operation system management card is changed during the start-up processing of the server blade, the start-up control unit 311 of the changed operation system management card takes over control of the start-up processing under control of the start-up migration control unit 331. The start-up migration control unit 331 of the changed operation system management card requests a notification of state information from the server blade if needed, and recognizes a current state of the server blade. This enables the changed operation system management card to take over the start-up control of the server blade more reliably, and to continue the start-up processing in the server blade.

In addition, the start-up migration control unit 331 determines whether to request the notification of the state information according to a value of the start-up flag FL1. Use of the start-up flag FL1 makes efficient take-over processing of start-up control.

Meanwhile, when the operation system management card is changed during the power-off processing of the server blade, the power-off control unit 312 of the changed operation system management card takes over control of the power-off processing under control of the power-off migration control unit 332. The power-off migration control unit 332 of the changed operation system management card requests a notification of state information from the server blade if needed, and recognizes a current state of the server blade. This enables the changed operation system management card to take over the power-off control of the server blade more reliably, and to continue the power-off processing in the server blade.

In addition, the power-off migration control unit 332 determines whether to request the notification of the state information according to a value of the power-off flag FL2. Use of the power-off flag FL2 makes efficient take-over processing of power-off control.

The values of the start-up flag FL1 and the power-off flag FL2 are set by the flag setting unit 322 in a state where the management card is the standby system. Here, there will be described processing of the flag setting unit 322 of each blade management unit in the standby system management card. In next FIG. 18, as an example, there will be described processing in a case where a value of a flag according to the state of the server blade 200a is set by the flag setting unit 322 provided in the blade management unit 310a of the standby system management card. When the value of the flag is set according to a state of a server blade other than the server blade 200a, the following processing is executed by the flag setting unit 322 provided in the blade management unit corresponding to the server blade.

Figure 18:
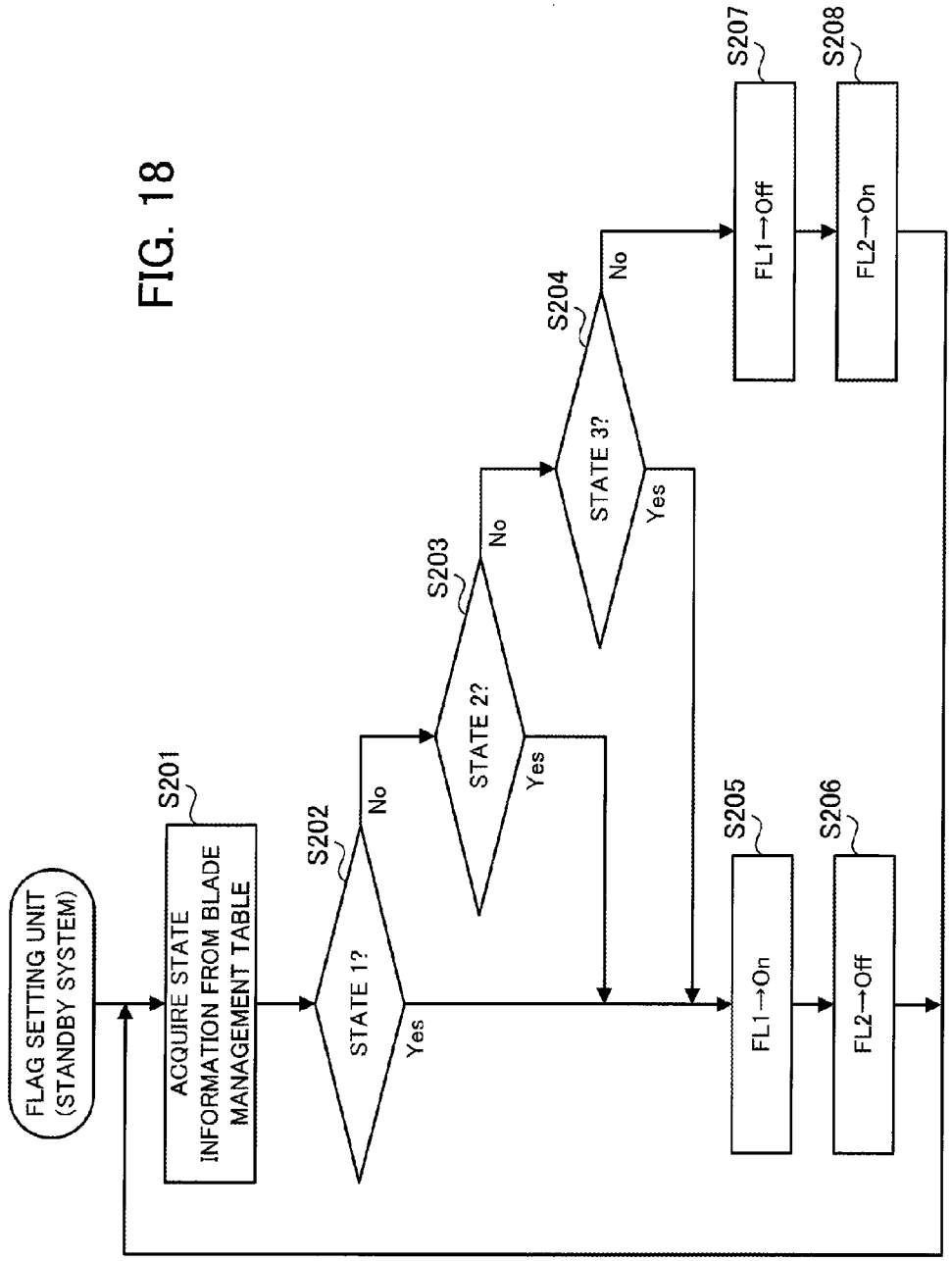
FIG. 18 is a flow chart illustrating an example of a processing procedure of a flag setting unit of a management card that operates as a standby system.

FIG. 18 is a flow chart illustrating an example of a processing procedure of the flag setting unit of the management card that operates as the standby system. The processing of steps S201 to S208 illustrated in FIG. 18 is repeated, for example, for each certain time, while the management card provided with the flag setting unit 322 is the standby system.

[Step S201] The flag setting unit 322 acquires state information indicating a state of the server blade 200a from the record 350a of the blade management table 350. It is to be noted that the flag setting unit 322, for example, acquires updated state information whenever the state information in the record 350a is updated.

[Steps S202 to S204] The flag setting unit 322 determines a state of the server blade 200a that the acquired state information indicates. When the acquired state information indicates any of the states 1 to 3, the flag setting unit 322 executes processing of step S205, and when the acquired state information does not indicate the states 1 to 3, i.e., when the acquired state information indicates any of the state 4, which is the operation state where power-on to the whole server blade 200a has been completed, the state 5 where power-off processing has been started, and the state 6 where power-off processing is being performed, the flag setting unit 322 executes processing of step S207.

[Step S205] The flag setting unit 322 turns on the start-up flag FL1.

[Step S206] The flag setting unit 322 turns off the power-off flag FL2. After that, the procedure returns to the processing of step S201.

[Step S207] The flag setting unit 322 turns off the start-up flag FL1.

[Step S208] The flag setting unit 322 turns on the power-off flag FL2. After that, the procedure returns to the processing of step S201.

According to the above processing, when state information indicating the states 2 and 3 is notified from the operation system management card after start-up processing has been started in the server blade 200a, the start-up flag FL1 that the blade management unit 310a references remains on, and when state information indicating the state 4 is notified from the operation system management card, the start-up flag FL1 is turned off. Namely, the start-up flag FL1 that the blade management unit 310a references is used as information indicating whether or not a notification of the end of the start-up processing of the server blade 200a has been received from the operation system management card, after the start-up processing is started in the server blade 200a.

In addition, when state information indicating the states 5 and 6 is notified from the operation system management card after the power-off processing is started in the server blade 200*a*, the power-off flag FL2 that the blade management unit 310*a* references remains on if it has already been on, and when state information indicating the state 1, which is the power-off state, is notified from the operation system management card, the power-off flag FL2 is turned off. Namely, the power-off flag FL2 that the blade management unit 310*a* references is used as information indicating whether or not a notification of the end of the power-off processing has been received from the operation system management card, after the power-off processing is started in the server blade 200*a*.

Figure 19:
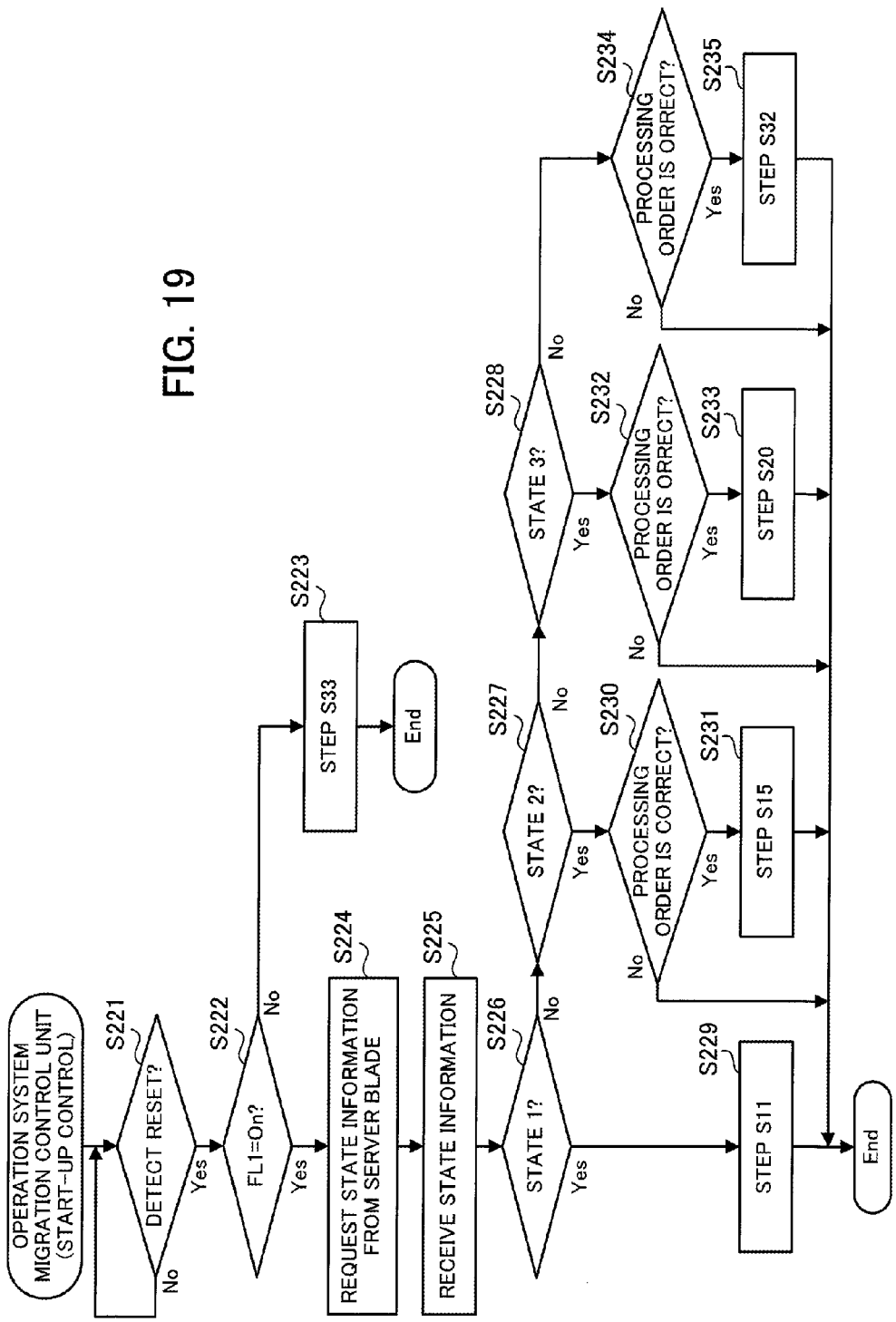
FIG. 19 is a flow chart illustrating an example of a processing procedure of a start-up migration control unit that controls a start-up control unit.

Next, FIG. 19 is a flow chart illustrating an example of a processing procedure of the start-up migration control unit that controls the start-up control unit. Although in this FIG. 19, processing of the start-up migration control unit 331 in the blade management unit 310*a* will be described as an example, similar processing is performed by the start-up migration control unit 331 in the blade management unit corresponding to the server blade in which start-up processing is being performed, during start-up processing of a server blade other than the server blade 200*a*. It is to be noted that in an initial state of processing of FIG. 19, the management card in which the start-up migration control unit 331 that executes processing of FIG. 19 has been provided is in a state of the standby system.

[Step S221] The start-up migration control unit 331 monitors a detection signal by the reset detection unit 340, and determines whether the other management card of the operation system was reset. When reset is detected by the reset detection unit 340, the start-up migration control unit 331 executes processing of step S222. At this time, the management card that has detected the reset transitions to the operation system.

[Step S222] The start-up migration control unit 331 references the start-up flag FL1, and executes processing of step S224 when the start-up flag FL1 is on. In addition, when the start-up flag FL1 is off, i.e., when having already received a notification that the server blade 200*a* has transitioned to the state 4, the start-up migration control unit 331 executes processing of step S223.

[Step S223] The start-up migration control unit 331 requests the start-up control unit 311 to start the start-up control of the server blade 200*a* illustrated in FIG. 11 from step S33 illustrated in FIG. 11, and ends processing. In this case, since it has already been registered in the record 350*a* of the blade management table 350 that the server blade 200*a* is in the state 4, the start-up control unit 311 may just start the start-up processing from step S33 after receiving the notification of the state 4 from the operation system management card.

[Step S224] The start-up migration control unit 331 requests transmission of state information from the server blade 200*a* using a "Set Event Receiver" command.

The server blade 200*a* that has received request data of the "Set Event Receiver" command sends back response data, and subsequently transmits request data of the "Platform Event Message" command in which state information indicating a current state is set to the management card as a source of issue of the "Set Event Receiver" command.

[Step S225] The start-up migration control unit 331 receives the state information notified from the server blade 200*a*.

[Steps S226 to S228] The start-up migration control unit 331 determines a state that the state information received from the server blade 200*a* indicates. When the received state information indicates the state 1, which is the power-off state, the start-up migration control unit 331 executes processing of step S229, and when the received state information indicates the state 2 where start-up processing has been started, the start-up migration control unit 331 executes processing of step S230, and when the received state information indicates the state 3 where start-up processing is being performed, the start-up migration control unit 331 executes processing of step S232. In addition, when the received state information does not indicate the states 1 to 3, i.e., when the received state information indicates any of the state 4, which is the operation state where power-on to the whole server blade 200*a* has been completed, the state 5 where power-off processing has been started, and the state 6 where power-off processing is being performed, the start-up migration control unit 331 executes processing of step S234.

[Step S229] The start-up migration control unit 331 requests the start-up control unit 311 to start the start-up control of the server blade 200*a* from step S11 illustrated in FIG. 10, and ends processing.

[Step S230] The start-up migration control unit 331 determines whether or not processing order of the start-up processing in the server blade 200*a*, i.e., transition order of the state, is correct based on the state information registered in the record 350*a* of the blade management table 350. When the state information registered in the record 350*a* of the blade management table 350 indicates either the state 1, which is the power-off state or the state 2 where start-up processing has been started, the start-up migration control unit 331 determines that start-up processing order is correct, and executes processing of step S231. Meanwhile, when the state information registered in the record 350*a* of the blade management table 350 indicates a state other than the states 1 and 2, the start-up migration control unit 331, for example, notifies the server blade 200*a* of an error, and subsequently ends processing.

[Step S231] The start-up migration control unit 331 requests the start-up control unit 311 to start the start-up control of the server blade 200*a* from step S15 illustrated in FIG. 10. The start-up migration control unit 331 registers the state information received in step S225 in the record 350*a* of the blade management table 350, and ends processing.

[Step S232] The start-up migration control unit 331 determines whether or not processing order of the start-up processing in the server blade 200*a* is correct based on the state information registered in the record 350*a* of the blade management table 350. When the state information registered in the record 350*a* of the blade management table 350 indicates either the state 2, which is the state where start-up processing has been started, or the state 3 where start-up processing is being performed, the start-up migration control unit 331 determines that start-up processing order is correct, and executes processing of step S233. Meanwhile, when the state information registered in the record 350*a* of the blade management table 350 indicates a state other than the states 2 and 3, the start-up migration control unit 331, for example, notifies the server blade 200*a* of an error, and subsequently ends processing.

[Step S233] The start-up migration control unit 331 requests the start-up control unit 311 to start the start-up control of the server blade 200*a* from step S20 illustrated in FIG. 10. The start-up migration control unit 331 registers the state information received in step S225 in the record 350*a* of the blade management table 350, and ends processing.

[Step S234] The start-up migration control unit 331 determines whether or not processing order of the start-up processing in the server blade 200*a* is correct based on the state information registered in the record 350*a* of the blade management table 350. When the state information registered in the record 350*a* of the blade management table 350 indicates either the state 3 where start-up processing is being performed or the state 4, which is the operation state where power-on to the whole server blade 200a has been completed, the start-up migration control unit 331 determines that start-up processing order is correct, and executes processing of step S235. Meanwhile, when the state information registered in the record 350a of the blade management table 350 indicates a state other than the states 3 and 4, the start-up migration control unit 331 determines that processing order is not correct, for example, notifies the server blade 200a of an error, and subsequently ends processing.

[Step S235] The start-up migration control unit 331 requests the start-up control unit 311 to start the start-up control of the server blade 200a from step S32 illustrated in FIG. 11. The start-up migration control unit 331 registers the state information received in step S225 in the record 350a of the blade management table 350, and ends processing.

In the above processing, if the start-up flag FL1 is on when the management apparatus itself transitions from the standby system to the operation system, the start-up migration control unit 331 again acquires state information from the server blade 200a. The start-up migration control unit 331 then makes the start-up control unit 311 take over the start-up control of the server blade 200a based on the acquired state information. With such processing, even in a state where completion of the start-up processing in the server blade 200a is not confirmed, the start-up migration control unit 331 properly recognizes a current state of the server blade 200a, and as a result of it, continues the start-up processing of the server blade 200a to the last.

Accordingly, it is possible to complete power-on to the server blade 200a in the decided processing order, and to maintain reliability of the blade server system 100. For example, a probability of occurrence of a situation is reduced where total power supplied to the devices in the chassis 110 exceeds maximum power that the power module 410 may supply.

In addition, it is determined based on a value of the start-up flag FL1 whether or not state information is acquired from the server blade 200a, whereby determination processing is simplified, and as a result of it, an efficiency of take-over processing of the start-up control improves.

Furthermore, start-up processing in the server blade 200a is executed in correct order by determination processing in steps S230, S232, and S234. Particularly, in these processing steps, even though the state information registered in the record 350a of the blade management table 350 is the state one-stage prior to the state that the state information received in step S225 indicates, the processing order of the start-up processing is determined to be correct. With such determination processing, even though a situation occurs where an actual state of the server blade 200a and a state of the server blade 200a recognized by the management card that has transitioned to the operation system are different from each other, the start-up processing of the server blade 200a is properly continued.

It is to be noted that the start-up control unit 311 of the blade management unit 310a starts the start-up processing of the server blade 200a according to a request issued in any of the above-described steps S223, S229, S231, S233, and S235. At this time, processing in which notification of information is provided to the standby system management card, such as steps S15 and S20, is included in processing executed by the start-up control unit 311. However, in the processing, only when another standby system management card under normal operation is present, notification of information may just be provided to the standby system management card.

Figure 20:
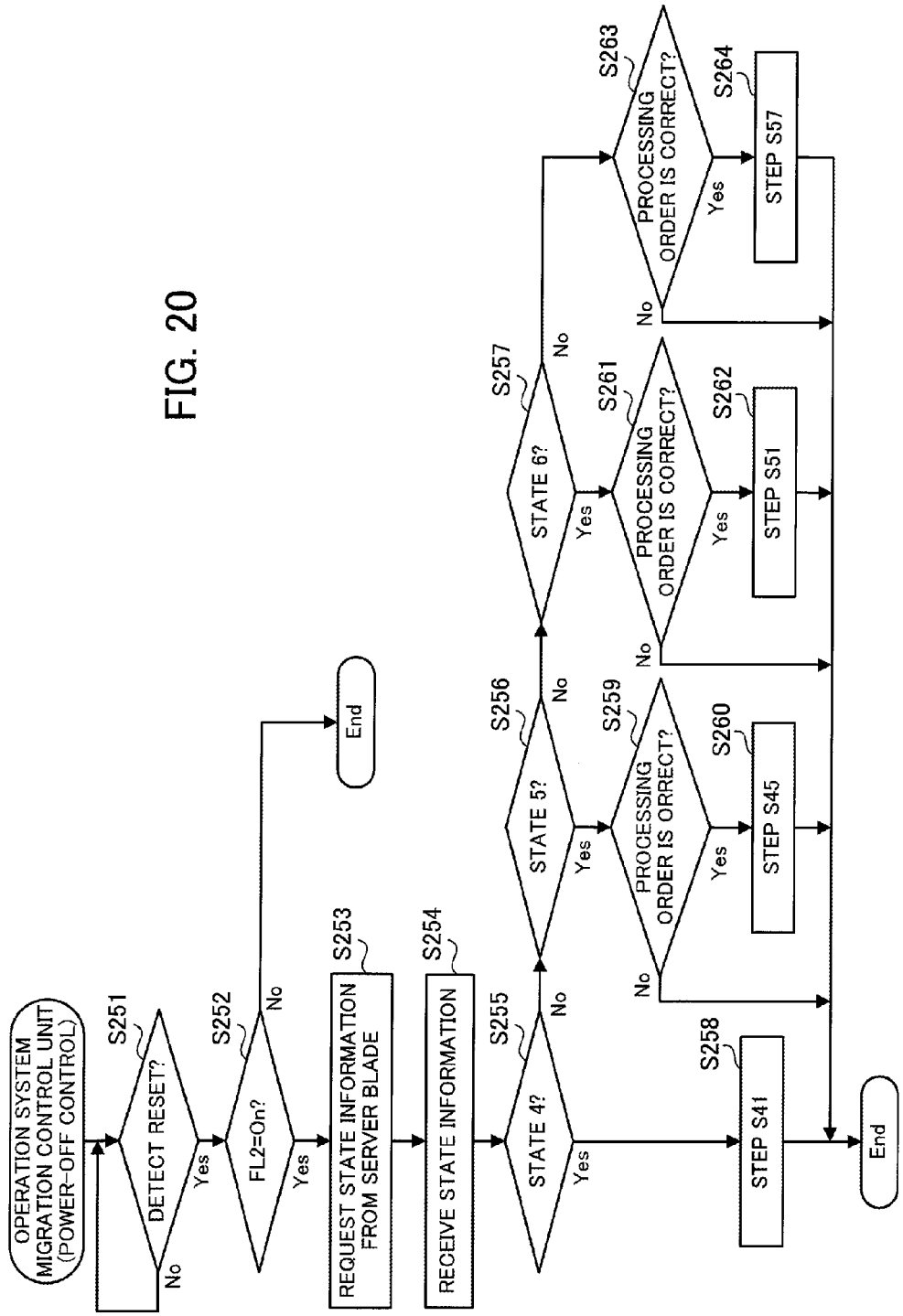
FIG. 20 is a flow chart illustrating an example of a processing procedure of a power-off migration control unit that controls the power-off control unit.

Next, FIG. 20 is a flow chart illustrating an example of a processing procedure of the power-off migration control unit that controls the power-off control unit. Although in this FIG. 20, processing of the power-off migration control unit 332 in the blade management unit 310a will be described as an example, similar processing is performed by the power-off migration control unit 332 in the blade management unit corresponding to the server blade in which power-off processing is being performed, during power-off processing of a server blade other than the server blade 200a. It is to be noted that in an initial state of processing of FIG. 20, the management card in which the power-off migration control unit 332 that executes processing of FIG. 20 has been provided is in a state of the standby system.

[Step S251] The start-up migration control unit 331 monitors a detection signal by the reset detection unit 340, and determines whether the other management card of the operation system was reset. When reset is detected by the reset detection unit 340, the power-off migration control unit 332 executes processing of step S252. At this time, the management card in which the power-off migration control unit 332 has been provided transitions to the operation system.

[Step S252] The power-off migration control unit 332 references the power-off flag FL2, and executes processing of step S253 when the power-off flag FL2 is on. In addition, when the power-off flag FL2 is on, the server blade 200a is in the power-off state, and thus the power-off migration control unit 332 ends power-off control.

[Step S253] The power-off migration control unit 332 requests transmission of state information from the server blade 200a using the "Set Event Receiver" command. The server blade 200a that has received request data of the "Set Event Receiver" command sends back response data, and subsequently transmits request data of the "Platform Event Message" command in which state information indicating a current state is set to the management card as the source of issue of the "Set Event Receiver" command.

[Step S254] The power-off migration control unit 332 receives the state information notified from the server blade 200a.

[Steps S255 to S257] The power-off migration control unit 332 determines a state that the state information received from the server blade 200a indicates. When the received state information indicates the state 4, which is the operation state where power-on to the whole server blade 200a has been completed, the power-off migration control unit 332 executes processing of step S258, and when the received state information indicates the state 5 where power-off processing has been started, the power-off migration control unit 332 executes processing of step S259, and when the received state information indicates the state 6 where power-off processing is being performed, the power-off migration control unit 332 executes processing of step S261. In addition, when the received state information indicates any of the states other than the states 4 to 6, i.e., any of the state 1, which is the power-off state, the state 2 where start-up processing has been started, and the state 3 where start-up processing is being performed, the power-off migration control unit 332 executes processing of step S263.

[Step S258] The power-off migration control unit 332 requests the power-off control unit 312 to start the power-off control of the server blade 200a from step S41 illustrated in FIG. 12, and ends processing.

[Step S259] The power-off migration control unit 332 determines whether or not processing order of the power-off processing in the server blade 200a, i.e., transition order of the state, is correct based on the state information registered in the record 350a of the blade management table 350. When the state information registered in the record 350a of the blade management table 350 indicates either the state 4 or 5, the power-off migration control unit 332 determines that power-off processing order is correct, and executes processing of step S260. Meanwhile, when the state information registered in the record 350a of the blade management table 350 indicates a state other than the states 4 and 5, the power-off migration control unit 332, for example, notifies the server blade 200a of an error, and subsequently ends processing.

[Step S260] The power-off migration control unit 332 requests the power-off control unit 312 to start the power-off control of the server blade 200a from step S45 illustrated in FIG. 12. The power-off migration control unit 332 registers the state information received in step S254 in the record 350a of the blade management table 350, and ends processing.

[Step S261] The power-off migration control unit 332 determines whether or not processing order of the power-off processing in the server blade 200a is correct based on the state information registered in the record 350a of the blade management table 350. When the state information registered in the record 350a of the blade management table 350 indicates either the state 5 or 6, the power-off migration control unit 332 determines that power-off processing order is correct, and executes processing of step S262. Meanwhile, when the state information registered in the record 350a of the blade management table 350 indicates a state other than the states 5 and 6, the power-off migration control unit 332, for example, notifies the server blade 200a of an error, and subsequently ends processing.

[Step S262] The power-off migration control unit 332 requests the power-off control unit 312 to start the power-off control of the server blade 200a from step S51 illustrated in FIG. 12. The power-off migration control unit 332 registers the state information received in step S254 in the record 350a of the blade management table 350, and ends processing.

[Step S263] The power-off migration control unit 332 determines whether or not processing order of the start-up processing in the server blade 200a is correct based on the state information registered in the record 350a of the blade management table 350. When the state information registered in the record 350a of the blade management table 350 indicates either the state 6 or 1, the power-off migration control unit 332 determines that power-off processing order is correct, and executes processing of step S264. Meanwhile, when the state information registered in the record 350a of the blade management table 350 indicates a state other than the states 6 and 1, the power-off migration control unit 332, for example, notifies the server blade 200a of an error, and subsequently ends processing.

[Step S264] The power-off migration control unit 332 requests the power-off control unit 312 to start the power-off control of the server blade 200a from step S57 illustrated in FIG. 12. The power-off migration control unit 332 registers the state information received in step S254 in the record 350a of the blade management table 350, and ends processing.

In the above processing, if the power-off flag FL2 is on when the management apparatus itself transitions from the standby system to the operation system, the power-off migration control unit 332 again acquires state information from the server blade 200a. The power-off migration control unit 332 then makes the power-off control unit 312 take over the power-off control of the server blade 200a based on the acquired state information. With such processing, even in a state where completion of the power-off processing in the server blade 200a is not confirmed, the power-off migration control unit 332 properly recognizes a current state of the server blade 200a, and as a result of it, continues the power-off processing of the server blade 200a to the last. Accordingly, it is possible to complete power-off processing of the server blade 200a in the decided processing order, and to maintain reliability of the blade server system 100.

In addition, it is determined based on a value of the power-off flag FL2 whether or not state information is acquired from the server blade 200a, whereby determination processing is simplified, and as a result of it, an efficiency of take-over processing of the power-off control improves.

Furthermore, power-off processing in the server blade 200a is executed in correct order by determination processing in steps S259, S261, and S263. Particularly, in these processing steps, even though the state information registered in the record 350a of the blade management table 350 is the state one-stage prior to the state that the state information received in step S254 indicates, the processing order of the power-off processing is determined to be correct. With such determination processing, even though a situation occurs where an actual state of the server blade 200a and a state of the server blade 200a recognized by the management card that has transitioned to the operation system are different from each other, the power-off processing of the server blade 200a is properly continued.

It is to be noted that the power-off control unit 312 starts the power-off processing of the server blade 200a according to a request issued in any of the above-described steps S258, S260, S262, and S264. At this time, processing in which notification of information is provided to the standby system management card, such as steps S45 and S49, is included in processing executed by the power-off control unit 312. However, in the processing, only when another standby system management card under normal operation is present, notification of information may just be provided to the standby system management card.

Next, there will be described a processing example where start-up control and power-off control to the server blade are taken over to another management card. In the following FIGS. 21 to 26, a processing example will be taken where abnormality has occurred in the management card 300a from the state where the management card 300a is the operation system. In these FIGS. 21 to 26, as an example, a case will be described where the start-up control and the power-off control to the server blade 200a are performed. Therefore, processing of the management cards 300a and 300b described in FIGS. 21 to 26 is the processing executed by a processing block in the blade management unit 310a included in the management cards 300a and 300b, respectively. When start-up control and power-off control to a server blade other than the server blade 200a are performed, in the management cards 300a and 300b, processing illustrated in FIGS. 21 to 26 is executed by a processing block in a blade management unit corresponding to a server blade targeted for control.

Figure 21:
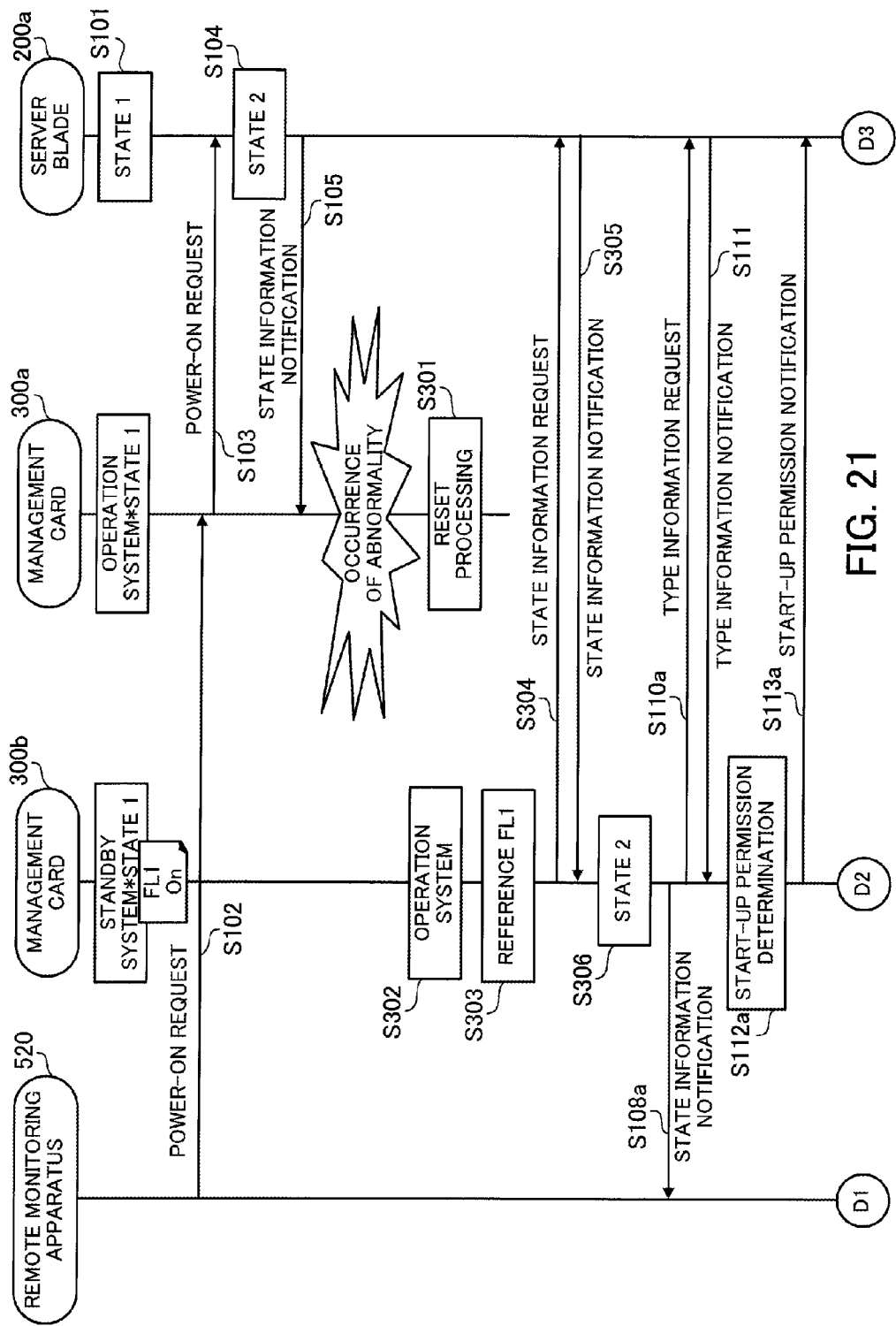
FIG. 21 is a sequence diagram illustrating a processing example 1 when start-up control to the server blade is taken over to another management card.
Figure 22:
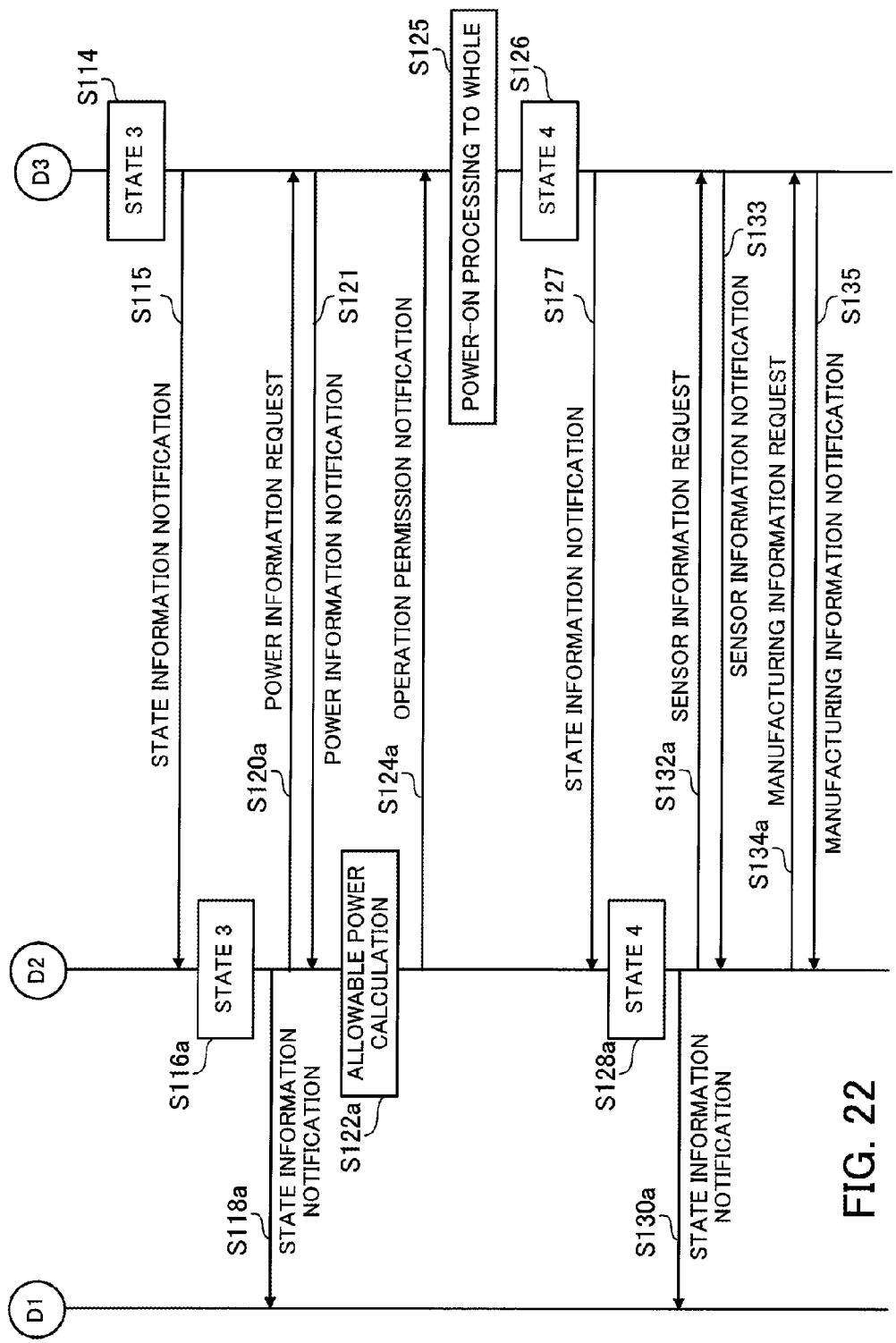
FIG. 22 is a sequence diagram illustrating the processing example 1 when start-up control to the server blade is taken over to another management card.

FIGS. 21 and 22 are sequence diagrams illustrating a processing example 1 when start-up control to the server blade is taken over to another management card. It is to be noted that in FIGS. 21 and 22, same symbols are attached to the same processing steps as in FIGS. 13 and 14.

In an initial state of FIG. 21, similar to FIG. 13, the management card 300a is the operation system, and the management card 300b is the standby system. In addition, the server blade 200a is in the state 1, and both the management cards 300a and 300b are in a state of having recognized that the server blade 200a is in the state 1 (step S101). At this time, the start-up flag FL1 referenced by the blade management unit 310a of the management card 300b is on.

When, from the state, for example, a request to turn on the power of the server blade 200a is issued from the remote monitoring apparatus 520 to the operation system management card 300a (step S102), start-up processing of the server blade 200a is started under control of the start-up control unit 311 of the management card 300a. The start-up control unit 311 of the management card 300a requests power-on from the start-up/power-off processing unit 221 of the server blade 200a (step S103). The start-up/power-off processing unit 221 of the server blade 200a transitions to the state 2 where start-up processing has been started (step S104), and notifies the management card 300a of state information indicating the state 2 (step S105).

When abnormality occurs in the management card 300a in this state, the WDT 306 of the management card 300a detects time-out, and resets the management card 300a (step S301). The reset detection unit 340 of the management card 300b detects reset generation in the management card 300a, and the management card 300b transitions to the operation system (step S302).

The start-up migration control unit 331 of the management card 300a references the start-up flag FL1, and determines whether to acquire state information from the server blade 200a (step S303). Since the start-up flag FL1 is on, the start-up migration control unit 331 of the management card 300b requests transmission of state information from the server blade 200a using the "Set Event Receiver" command (step S304). The start-up/power-off processing unit 221 of the server blade 200a notifies the management card 300b of the state information indicating the state 2 (step S305).

The start-up migration control unit 331 of the management card 300b recognizes that the server blade 200a is in the state 2 (step S306). At this time, the start-up migration control unit 331 of the management card 300b determines processing order of the start-up processing to be correct, and subsequently makes the start-up control unit 311 start processing of FIG. 10 with step S15 being as a starting point (corresponding to steps S230 and S231 of FIG. 19).

As a result, start-up processing of the server blade 200a is continued under control of the start-up control unit 311 of the management card 300b instead of the start-up control unit 311 of the management card 300a. Namely, processing similar to processing that the start-up control unit 311 of the management card 300a, the start-up/power-off processing unit 221 of the server blade 200a, and the remote monitoring apparatus 520 perform after step S108 of FIG. 13 is executed by the start-up control unit 311 of the management card 300b, the start-up/power-off processing unit 221 of the server blade 200a, and the remote monitoring apparatus 520.

When recognizing in step S306 that the server blade 200a is in the state 2, the start-up control unit 311 of the management card 300b acquires type information from the server blade 200a (steps S110a and S111). When determining based on the type information that the server blade 200a is the server blade in which monitoring of an operation state and start-up/power-off control are to be supported by the management card 300b itself (step S112a), the start-up control unit 311 of the management card 300b gives start-up permission to the server blade 200a (step S113a).

When the start-up control unit 311 of the management card 300b recognizes that the server blade 200a has transitioned to the state 3 (step S116a), the start-up control unit 311 of the management card 300b acquires power information from the server blade 200a (steps S120a and S121). When subtracting a value of power consumption indicated by the power information received from the server blade 200a from the value held as the current allowable power 362 in the RAM 302, and the subtraction result is not less than 0, the start-up control unit 311 of the management card 300b transmits an operation permission notification to the server blade 200a (steps S122a and S124a). When recognizing that the server blade 200a has transitioned to the state 4 (step S128a), the start-up control unit 311 of the management card 300b starts collection of sensor information and manufacturing information from the server blade 200a (steps S132a and S135).

In the above processing of FIGS. 21 and 22, at the point of the management card 300b transitioning to the operation system (step S302), a state of the server blade 200a that the management card 300b recognizes and an actual state of the server blade 200a do not coincide with each other. Although such false state recognition occurs, the start-up control unit 311 of the management card 300b properly takes over the start-up control by the start-up control unit 311 of the management card 300a, and as a result of it, start-up processing of the server blade 200a is continued.

In addition, as a case where the state of the server blade 200a that the management card 300b recognizes and the actual state of the server blade 200a do not coincide with each other, there are included the following cases in addition to the above. For example, there is a case (case 1) where break-down occurs in the operation system management card 300a after the server blade 200a transitions to the state 3 and notification of the state information indicating the state 3 is provided to the operation system management card 300a but before the same state information is transferred to the standby system management card 300b. This is the case where in FIG. 13, break-down occurs in the operation system management card 300a after completion of step S115 but before execution of step S117. Alternatively, as another example, there is a case (case 2) where break-down occurs in the operation system management card 300a after the server blade 200a transitions to the state 4 and notification of the state information indicating the state 4 is provided to the operation system management card 300a but before the same state information is transferred to the standby system management card 300b. This is the case where in FIG. 14, break-down occurs in the operation system management card 300a after completion of step S127 but before execution of step S129.

In any of the above-described cases 1 and 2, since the start-up flag FL1 is on, the start-up migration control unit 331 of the management card 300b that detected break-down occurrence in the management card 300a requests transmission of state information from the server blade 200a. In the case 1, the start-up migration control unit 331 recognizes that the server blade 200a is in the state based on the state information from the server blade 200a, and makes the start-up control unit 311 start processing of FIG. 10 with step S20 being as the starting point. In addition, in the case 2, the start-up migration control unit 331 recognizes that the server blade 200a is in the state 4 based on the state information from the server blade 200a, and makes the start-up control unit 311 start processing of FIG. 11 with step S32 being as the starting point. Accordingly, even in both cases, the start-up control unit 311 of the management card 300b properly takes over the start-up control by the start-up control unit 311 of the management card 300a, and as a result of it, start-up processing of the server blade 200a is continued.

Figure 23:
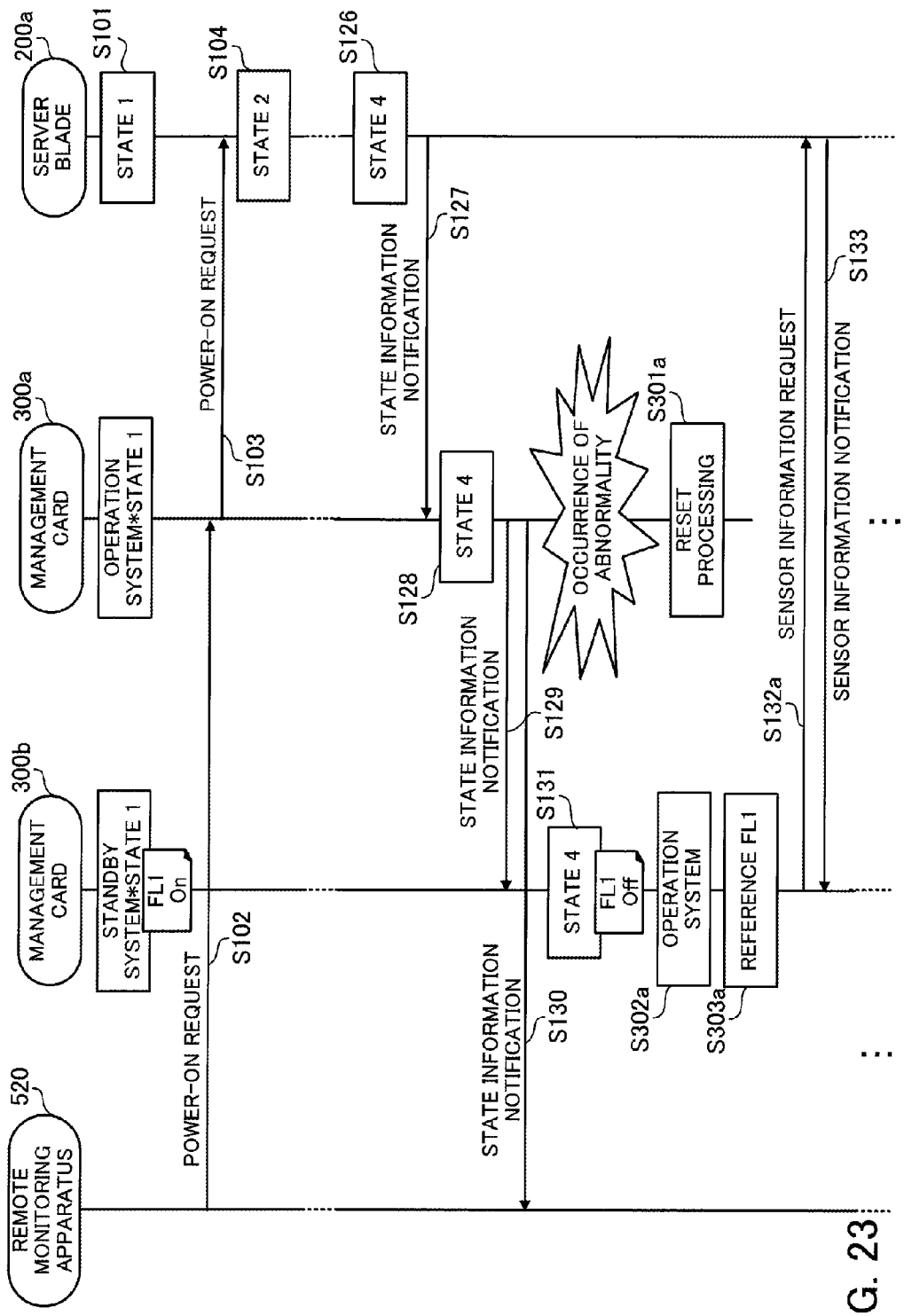
FIG. 23 is a sequence diagram illustrating a processing example 2 when start-up control to the server blade is taken over to another management card.

FIG. 23 is a sequence diagram illustrating a processing example 2 when start-up control to the server blade is taken over to another management card. It is to be noted that in FIG. 23, same symbols are attached to the same processing steps as in FIGS. 13, 14, and 22.

In the example illustrated in FIG. 23, start-up processing of the server blade 200a is started under control of the start-up control unit 311 of the management card 300a. The start-up/power-off processing unit 221 of the server blade 200a transitions to the state 4 (step S126), and notifies the management card 300a of the state information indicating the state 4 (step S127). The start-up control unit 311 of the management card 300a recognizes that the server blade 200a has transitioned to the state 4 (step S128), and notifies each of the management card 300b and the remote monitoring apparatus 520 of the state information indicating the state 4 (steps S129 and S130). The standby system processing unit 321 of the management card 300b registers the received state information from the management card 300a in the record 350a of the blade management table 350 (step S131). At this time, the flag setting unit 322 of the management card 300b turns off the start-up flag FL1.

When abnormality occurs in the management card 300a in this state, the WDT 306 of the management card 300a detects time-out, and resets the management card 300a (step S301a). The reset detection unit 340 of the management card 300b detects reset generation in the management card 300a, and the management card 300b transitions to the operation system (step S302a).

The start-up migration control unit 331 of the management card 300a references the start-up flag FL1, and determines whether to acquire state information from the server blade 200a (step S303a). Since the start-up flag FL1 is off, the start-up migration control unit 331 of the management card 300b makes the start-up control unit 311 start processing of FIG. 11 with step S33 being as the starting point, without acquiring the state information (corresponding to step S223 of FIG. 19). As a result, processing after step S132a of FIG. 22 is executed by the start-up control unit 311 of the management card 300b, the start-up/power-off processing unit 221 of the server blade 200a, and the remote monitoring apparatus 520.

In the above processing of FIG. 23, the start-up migration control unit 331 of the management card 300b recognizes that the server blade 200a has already transitioned to the state 4 based on the start-up flag FL1 at the point of the management card 300b transitioning to the operation system (step S302a). Since the state 4 is the final state where the start-up control unit 311 manages transition, the start-up migration control unit 331 of the management card 300b determines that state information does not need to be acquired again from the server blade 200a. Accordingly, the start-up migration control unit 331 makes the start-up control unit 311 take over start-up control without performing useless communication processing.

It is to be noted that as another case, there is a case where abnormality occurs in the management card 300a in a state where the server blade 200a is in the state 1, and where both the management card 300a of the operation system and the management card 300b of the standby system have recognized that the server blade 200a is in the state 1. In this case, the start-up flag FL1 referenced by the blade management unit 310a of the management card 300b is on. Since the start-up flag FL1 is on, the start-up migration control unit 331 of the management card 300b that detected occurrence of an error in the management card 300a requests transmission of state information from the server blade 200a. The start-up migration control unit 311 of the management card 300b recognizes that the server blade 200a is in the state 1 based on the state information received from the server blade 200a, and, for example, monitors a request for power-on to the server blade 200a from the remote monitoring apparatus 520.

Figure 24:
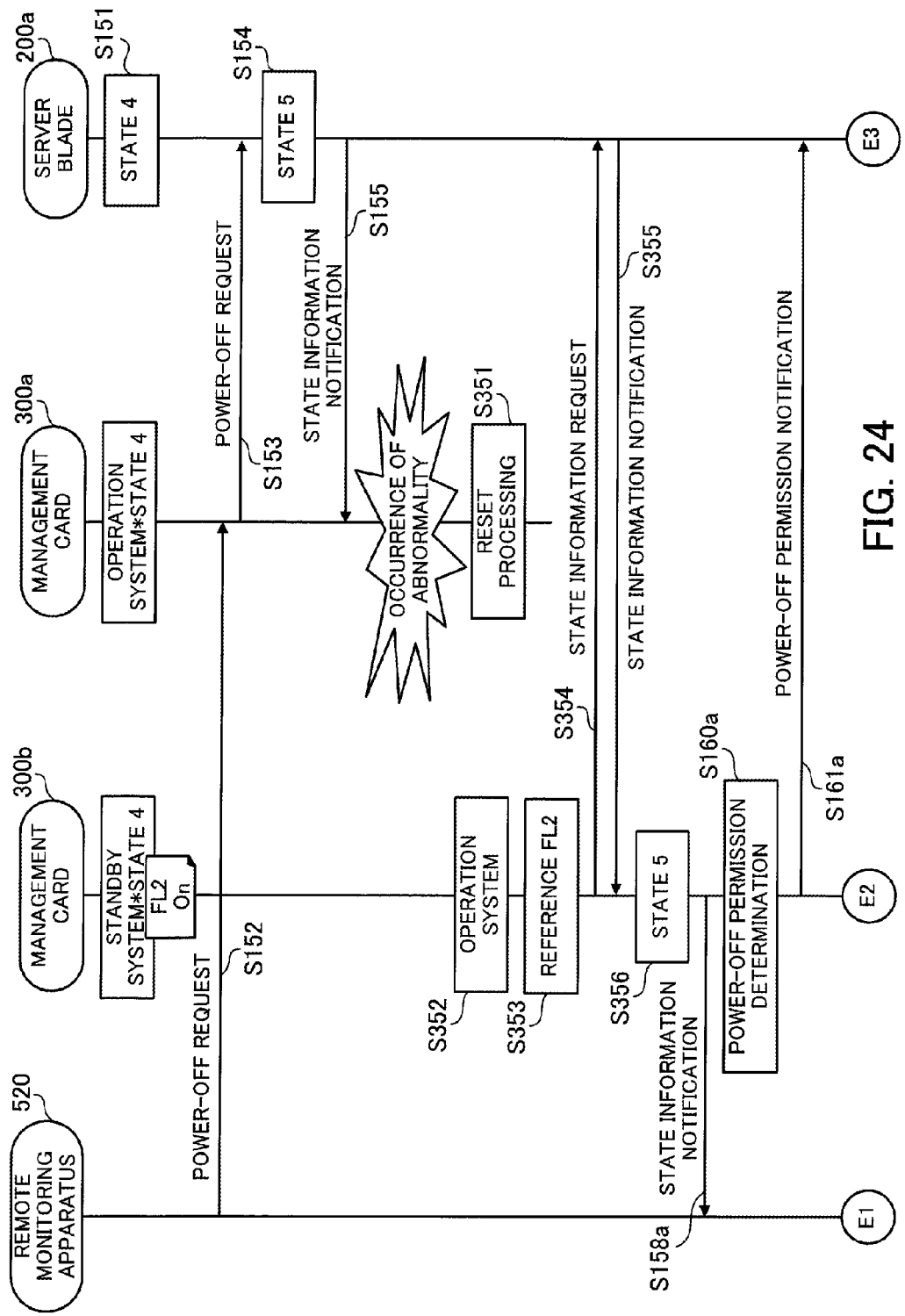
FIG. 24 is a sequence diagram illustrating the processing example 1 when power-off control to the server blade is taken over to another management card.
Figure 25:
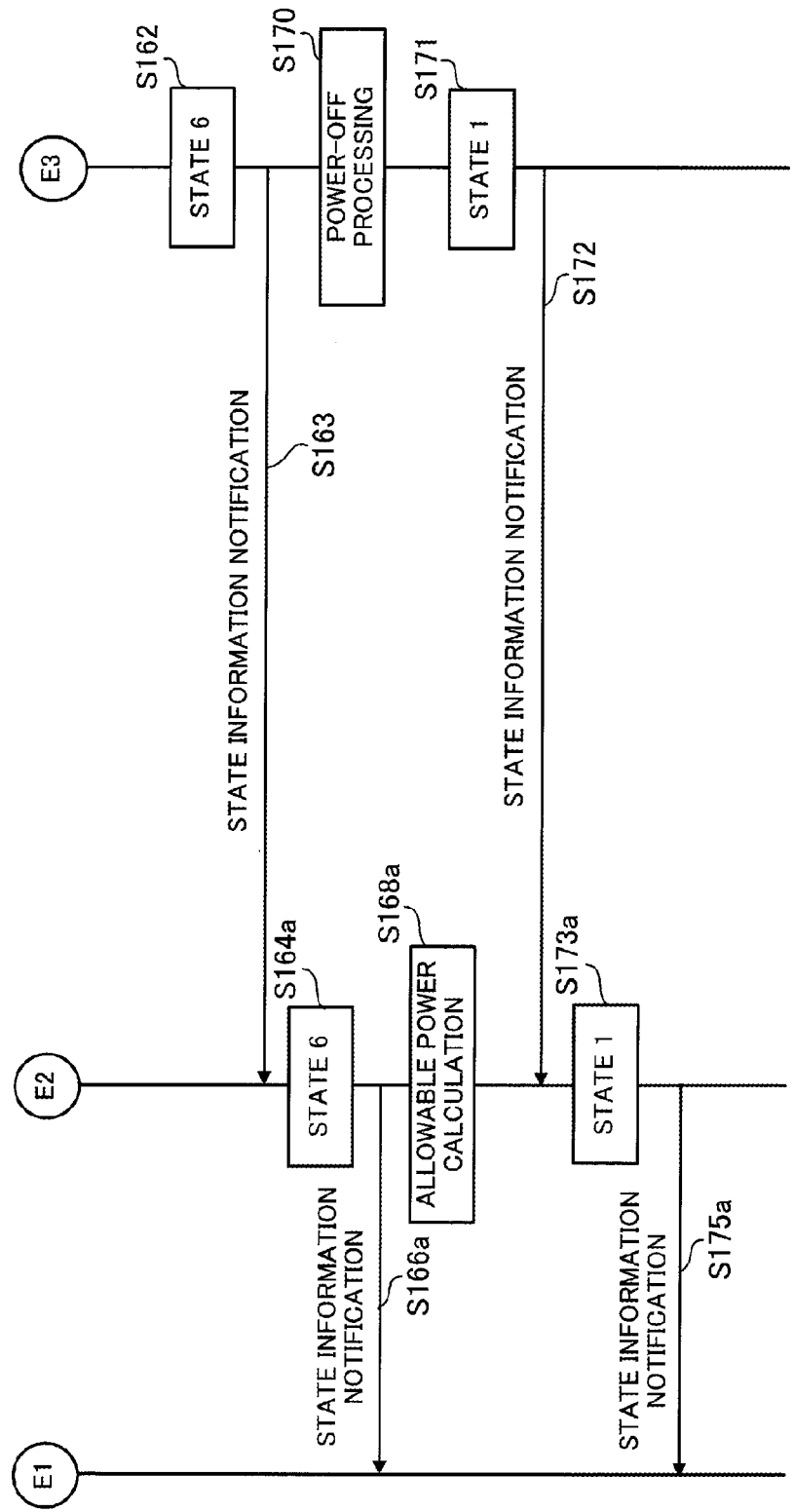
FIG. 25 is a sequence diagram illustrating the processing example 1 when power-off control to the server blade is taken over to another management card.

Next, FIGS. 24 and 25 are sequence diagrams illustrating the processing example 1 when power-off control to the server blade is taken over to another management card. It is to be noted that in FIGS. 24 and 25, same symbols are attached to the same processing steps as in FIGS. 15 and 16.

In an initial state of FIG. 24, similar to FIG. 15, the management card 300a is the operation system, and the management card 300b is the standby system. In addition, the server blade 200a is in the state 4, and both the management cards 300a and 300b are in a state of having recognized that the server blade 200a is in the state 4 (step S151). At this time, the power-off flag FL2 held in the management card 300b is on.

When, from this state, for example, a request to turn off the power of the server blade 200a is issued from the remote monitoring apparatus 520 to the operation system management card 300a (step S152), power-off processing of the server blade 200a is started under control of the power-off control unit 312 of the management card 300a. The power-off control unit 312 of the management card 300b requests power-off from the server blade 200a (step S153). The start-up/power-off processing unit 221 of the server blade 200a transitions to the state 5 (step S154), and notifies the management card 300b of the state information indicating the state 5 (step S155).

When abnormality occurs in the management card 300a in this state, the WDT 306 of the management card 300a detects time-out, and resets the management card 300a (step S351). The reset detection unit 340 of the management card 300b detects reset generation in the management card 300a, and the management card 300b transitions to the operation system (step S352).

The power-off migration control unit 332 of the management card 300a references the power-off flag FL2, and determines whether to acquire state information from the server blade 200a (step S353). Since the power-off flag FL2 is on, the power-off migration control unit 332 of the management card 300b requests transmission of state information from the server blade 200a using the "Set Event Receiver" command (step S354). The start-up/power-off processing unit 221 of the server blade 200a notifies the management card 300b of the state information indicating the state 5 (step S355).

The power-off migration control unit 332 of the management card 300b recognizes that the server blade 200a is in the state 5 (step S356), further determines processing order of power-off processing to be correct, and subsequently makes the power-off control unit 312 start processing of FIG. 12 with step S45 being as the starting point (corresponding to steps S259 and S260 of FIG. 20).

As a result, power-off processing of the server blade 200a is continued under control of the power-off control unit 312 of the management card 300b instead of the power-off control unit 312 of the management card 300a. Namely, processing similar to processing that the power-off control unit 312 of the management card 300a, the start-up/power-off processing unit 221 of the server blade 200a, and the remote monitoring apparatus 520 perform after step S158 of FIG. 15 is executed by the power-off control unit 312 of the management card 300b, the start-up/power-off processing unit 221 of the server blade 200a, and the remote monitoring apparatus 520.

The power-off control unit 312 of the management card 300b determines whether to permit power-off of the server blade 200a (step S160a). When determining to permit the power-off, the power-off control unit 312 of the management card 300b gives power-off permission to the server blade 200a (step S161a). When recognizing that the server blade 200a has transitioned to the state 6 (step S164a), the power-off control unit 312 of the management card 300b reads a value of power consumption of the server blade 200a registered in the field of power information from the record 350a of the blade management table 350. The power-off control unit 312 adds the read value of power consumption to a value of the current allowable power 362 held in the RAM 302, and updates the value of the current allowable power 362 held in the RAM 302 using the addition result (step S168a).

Meanwhile, in the server blade 200a, power supply to each unit in the server blade 200a excluding the IPMC 206 is stopped (step S170), and the server blade 200a transitions to the state 1 (step S171). The power-off control unit 312 of the management card 300b recognizes that the server blade 200a has transitioned to the state 1 (step S173a), notifies the remote monitoring apparatus 520 of the state information indicating the state 1 (step S175a), and thereby completes the power-off control.

In the above processing of FIGS. 24 and 25, at the point of the management card 300b transitioning to the operation system (step S352), a state of the server blade 200a that the management card 300b recognizes and an actual state of the server blade 200a do not coincide with each other. Although such false state recognition occurs, the power-off control unit 312 of the management card 300b properly takes over the power-off control by the power-off control unit 312 of the management card 300a, and as a result of it, power-off processing of the server blade 200a is continued.

In addition, as a case where the state of the server blade 200a that the management card 300b recognizes and the actual state of the server blade 200a do not coincide with each other, there are also included the following cases in addition to the above. For example, there is a case (case 3) where break-down occurs in the operation system management card 300a after the server blade 200a transitions to the state 6 and notification of the state information indicating the state 6 is provided to the operation system management card 300a but before the same state information is transferred to the standby system management card 300b. This is the case where break-down occurs in the operation system management card 300a after completion of step S163 of FIG. 15 but before execution of step S165 of FIG. 16. Alternatively, as another example, there is a case (case 4) where break-down occurs in the operation system management card 300a after the server blade 200a transitions to the state 1 and notification of the state information indicating the state 1 is provided to the operation system management card 300a but before the same state information is transferred to the standby system management card 300b. This is the case where in FIG. 16, break-down occurred in the operation system management card 300a after completion of step S172 but before execution of step S174.

In any of the above-described cases 3 and 4, since the power-off flag FL2 is on, the power-off migration control unit 332 of the management card 300b that detected break-down occurrence in the management card 300a requests transmission of state information from the server blade 200a. In the case 3, the power-off migration control unit 332 recognizes that the server blade 200a is in the state 6 based on the state information from the server blade 200a, and makes the power-off control unit 312 start processing of FIG. 12 with step S51 being as the starting point. In addition, in the case 4, the power-off migration control unit 332 recognizes that the server blade 200a is in the state 1 based on the state information from the server blade 200a, and makes the power-off control unit 312 start processing of FIG. 12 with step S57 being as the starting point. Accordingly, even in both cases, the power-off control unit 312 of the management card 300b properly takes over the power-off control by the power-off control unit 312 of the management card 300a, and as a result of it, power-off processing of the server blade 200a is continued.

Figure 26:
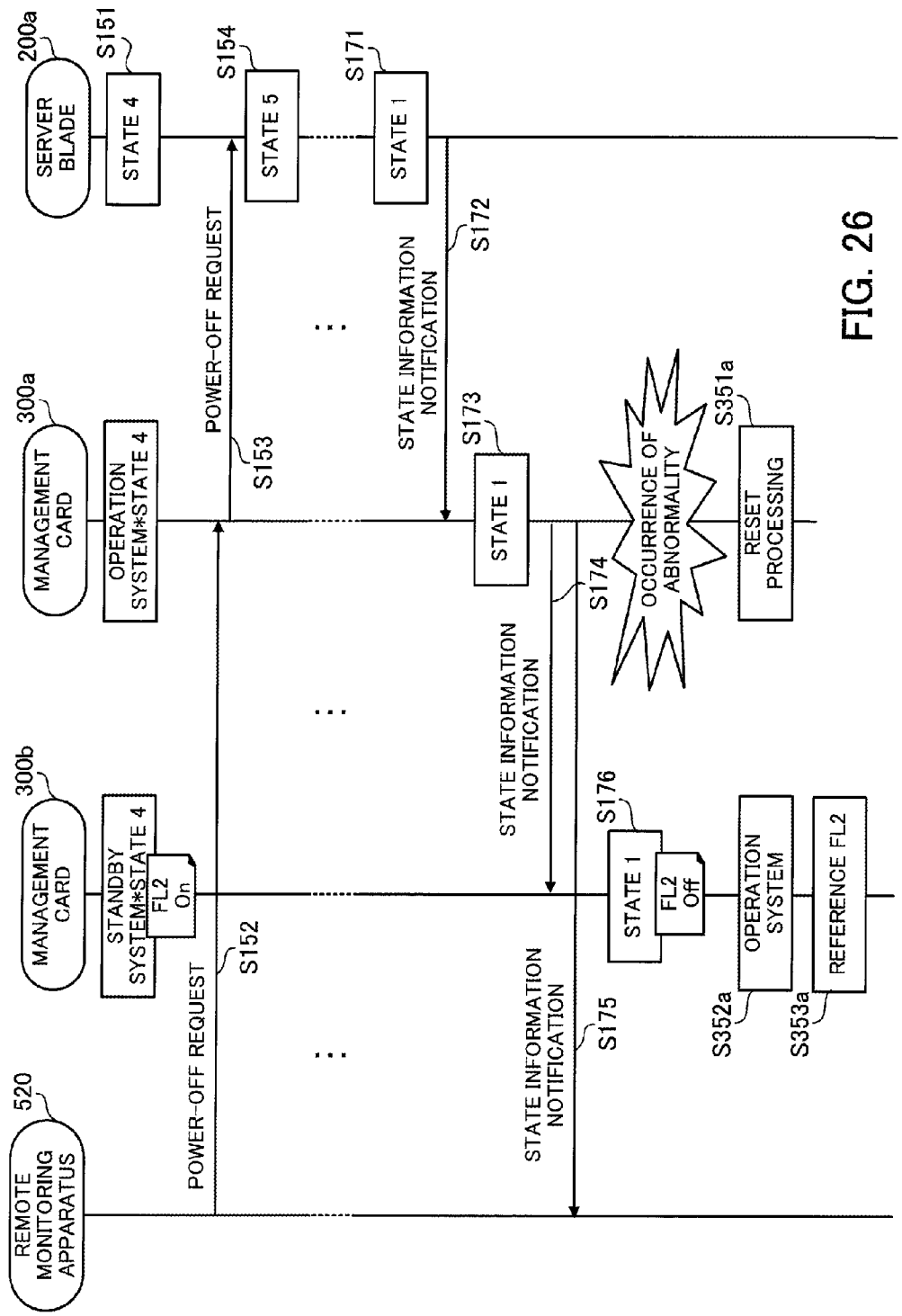
FIG. 26 is a sequence diagram illustrating the processing example 2 when power-off control to the server blade is taken over to another management card.

FIG. 26 is a sequence diagram illustrating the processing example 2 when power-off control to the server blade is taken over to other management card. It is to be noted that in FIG. 26, same symbols are attached to the same processing steps as in FIGS. 15 and 16.

In the example illustrated in FIG. 26, power-off processing of the server blade 200a is started under control of the power-off control unit 312 of the management card 300a. The start-up/power-off processing unit 221 of the server blade 200a transitions to the state 1 (step S171), and notifies the management card 300a of the state information indicating the state 1 (step S172). The power-off control unit 312 of the management card 300a recognizes that the server blade 200a has transitioned to the state 1 (step S173), and notifies each of the management card 300b and the remote monitoring apparatus 520 of the state information indicating the state 1 (steps S174 and S175). The standby system processing unit 321 of the management card 300b registers the received state information from the management card 300a in the record 350a of the blade management table 350 (step S176). At this time, the flag setting unit 322 of the management card 300b turns off the power-off flag FL2.

When abnormality occurs in the management card 300a in this state, the WDT 306 of the management card 300a detects time-out, and resets the management card 300a (step S351a). The reset detection unit 340 of the management card 300b detects reset generation in the management card 300a, and the management card 300b transitions to the operation system (step S352a).

The power-off migration control unit 332 of the management card 300a references the power-off flag FL2, and determines whether to acquire state information from the server blade 200a (step S353a). Since the power-off flag FL2 is off, the power-off migration control unit 332 of the management card 300b ends the power-off control without acquiring state information from the server blade 200a.

In the above-described processing of FIG. 26, the power-off migration control unit 332 of the management card 300b recognizes that the server blade 200a has already transitioned to the state 1 based on the power-off flag FL2 at the point of the management card 300b transitioning to the operation system (step S352d). Since the state 1 is the final state where the power-off control unit 312 manages transition, the power-off migration control unit 332 of the management card 300b determines that state information does not need to be acquired again from the server blade 200a. Accordingly, the power-off migration control unit 332 makes the power-off control unit 312 complete the power-off control without performing useless communication processing.

It is to be noted that as another case, there is a case where abnormality occurs in the management card 300a in a state where the server blade 200a is in the state 4, and where both the management card 300a of the operation system and the management card 300b of the standby system have recognized that the server blade 200a is in the state 4. In this case, the power-off flag FL2 referenced by the blade management unit 310a of the management card 300b is on. Since the power-off flag FL2 is on, the power-off migration control unit 332 of the management card 300b that detected occurrence of an error in the management card 300a requests transmission of state information from the server blade 200a. The power-off migration control unit 332 of the management card 300b recognizes that the server blade 200a is in the state 4 based on the state information received from the server blade 200a, and, for example, monitors a request for power-off of the server blade 200*a* from the remote monitoring apparatus 520.

It is to be noted that the above-described processing functions are achievable with a computer. In that case, a program is provided that describes processing contents of functions preferably included in the above-described management apparatuses, information processing apparatuses, management cards, server blades, and the like. The program is executed by the computer, and thereby the above-described processing functions are achieved on the computer. The program that describes the processing contents is recordable on a computer readable recording medium. As the computer readable recording medium, there are included a magnetic storage device, an optical disk, a magnetooptical recording medium, a semiconductor memory, and the like. In the magnetic storage device, there are included an HDD, a FD (flexible disk), a magnetic tape, and the like. In the optical disk, there are included a DVD (Digital Versatile Disc), a DVD-RAM, a CD-ROM (Compact Disc-Read Only Memory), a CD-R (Recordable)/RW (ReWritable), and the like. In the magnetooptical recording medium, there are included an MO (Magneto-Optical disk) and the like.

When the program is distributed, for example, portable recording media on which the program has been recorded, such as a DVD and a CD-ROM, are sold. In addition, the program may also be stored in a storage device of a server computer, and transferred from the server computer to other computers via a network.

The computer that executes the program, for example, stores in the storage device thereof the program recorded on the portable recording medium or the program transferred from the server computer. The computer then reads the program from the storage device thereof, and executes processing in accordance with the program. It is to be noted that the computer may also read the program directly from the portable recording medium, and execute processing in accordance with the program. In addition, the computer may also sequentially execute processing in accordance with the received program, whenever the program is transferred from the server computer connected via the network.

In addition, at least a part of the above-described processing functions is achievable in electronic circuits, such as a DSP (Digital Signal Processor), an ASIC (Application Specific Integrated Circuit), and a PLD (Programmable Logic Device), and the like.

According to the above-described information processing system, management apparatus, and management method of the information processing apparatus, even when a management apparatus of the operation system that manages execution of a processing sequence in the information processing apparatus is changed to another management apparatus, the processing sequence in the information processing apparatus is continued under control of the changed management apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing system comprising:
  an information processing apparatus that executes a processing sequence including a plurality of processing steps; and
  a plurality of management apparatuses that manage execution of the processing sequence by making the information processing apparatus execute the processing steps in predetermined order, wherein one of the management apparatuses operates as an operation system that performs execution management of the processing sequence, and each of the other management apparatuses operates as a standby system that stands by until taking over the execution management of the processing sequence from the management apparatus operating as the operation system,
  wherein each of the management apparatuses is configured to perform:
  executing, as the management apparatus operating as the operation system, first reception processing that receives state information indicating a progress state of the processing sequence from the information processing apparatus whenever a processing step of the processing sequence is executed,
  executing, as one of the management apparatuses operating as the standby system, second reception processing that receives the state information from the management apparatus operating as the operation system whenever the management apparatus operating as the operation system receives the state information from the information processing apparatus in the first reception processing during the execution management of the processing sequence,
  acquiring, when transitioning from the standby system to the operation system and taking over the execution management of the processing sequence from the management apparatus that has been the operation system, the state information from the information processing apparatus,
  comparing, when taking over the execution management of the processing sequence from the management apparatus that has been the operation system, the state information acquired from the information processing apparatus with the state information already received from the management apparatus that has been the operation system in the second reception processing, to determine whether or not the processing steps are executed in the predetermined order in the information processing apparatus, and
  making the information processing apparatus continue execution of an unexecuted processing step of the processing sequence when the comparing results in a determination that the processing steps are executed in the predetermined order in the information processing apparatus.

2. The information processing system according to claim 1, wherein said each management apparatus further performs:
  receiving, in the second reception processing, final state information from the management apparatus operating as the operation system, the final state information indicating that a final processing step included in the processing sequence has been executed among the state information while said each management apparatus operates as the standby system and the management apparatus operating as the operation system performs execution management of the processing sequence; and acquiring the state information from the information processing apparatus when the final state information has not been received at the time of taking over the execution management of the processing sequence from the management apparatus that has been the operation system.

3. The information processing system according to claim 2, wherein said each management apparatus further performs:

setting flag information indicating a state of the information processing apparatus to a recording medium while operating as the standby system, and changes a value of the flag information upon receiving the final state information in the second reception processing after the execution management of the processing sequence is started by the management apparatus operating as the operation system, and acquiring the state information from the information processing apparatus when the value of the flag information has not been changed due to reception of the final state information at the time of transitioning from the standby system to the operation system.

4. The information processing system according to claim 1, wherein said each management apparatus makes the information processing apparatus continue execution of the unexecuted processing step of the processing sequence based on the state information acquired from the information processing apparatus when the state information acquired from the information processing apparatus is the same as the state information lastly received in the second reception processing, or indicates a state where the processing sequence has progressed by one processing step from the processing step indicated in the lastly received state information.

5. The information processing system according to claim 2, wherein said each management apparatus further performs:

making the information processing apparatus execute a next processing step based on the state information received from the information processing apparatus whenever each processing step of the processing sequence is executed, while operating as the operation system and performing the execution management of the processing sequence, and receiving the state information from the information processing apparatus whenever the processing step is executed after making the information processing apparatus execute the next processing step based on the state information acquired from the information processing apparatus, and making the information processing apparatus execute a next processing step based on the received state information, when taking over the execution management of the processing sequence from the management apparatus that has been the operation system.

6. The information processing system according to claim 1, wherein said each management apparatus receives, in the acquiring of the state information, the state information from the information processing apparatus by requesting the information processing apparatus to transmit the state information.

7. The information processing system according to claim 1, wherein:

the information processing apparatus is provided in plurality; and said each management apparatus manages execution of the processing sequence in each of the information processing apparatuses while operating as the operation system.

8. The information processing system according to claim 7, wherein said each information processing apparatus executes, as the processing sequence, a start-up processing sequence that makes said each information processing apparatus transition from a first power state where power is supplied to some devices in said each information processing apparatus to a second power state where power is input also to other devices in said each information processing apparatus in addition to the some devices.

9. An information processing system comprising:

an information processing apparatus that executes a processing sequence including a plurality of processing steps; and a plurality of management apparatuses that manages execution of the processing sequence by making the information processing apparatus execute the processing steps in predetermined order, wherein one of the management apparatuses operates as an operation system that performs execution management of the processing sequence, and each of others of the management apparatuses operates as a standby system that stands by until taking over the execution management of the processing sequence from the management apparatus operating as the operation system, wherein:

each of the management apparatuses acquires, when transitioning from the standby system to the operation system and taking over the execution management of the processing sequence from another management apparatus that has been the operation system, state information indicating a progress state of the processing sequence from the information processing apparatus, and makes the information processing apparatus continue execution of an unexecuted processing step of the processing sequence based on the acquired state information;

the information processing apparatus is provided in plurality;

said each management apparatus manages execution of the processing sequence in each of the information processing apparatuses while operating as the operation system;

said each information processing apparatus executes, as the processing sequence, a start-up processing sequence that makes said each information processing apparatus transition from a first power state where power is supplied to some devices in said each information processing apparatus to a second power state where power is input also to other devices in said each information processing apparatus in addition to the some devices;

the start-up processing sequence includes: a first processing step in which said each information processing apparatus transmits, in the first power state, power consumption of said each information processing apparatus to the management apparatus operating as the operation system; and a second processing step in which said each information processing apparatus transitions from the first power state to the second power state; and the management apparatus operating as the operation system determines whether or not to permit the information processing apparatus as a transmission source of the power consumption to execute the second processing step, based on the power consumption transmitted from said each information processing apparatus.

10. The information processing system according to claim 9, further comprising a power supply apparatus that supplies power in common to the plurality of information processing apparatuses, wherein the management apparatus operating as the operation system determines, when receiving the power consumption from one of the plurality of information processing apparatuses, whether or not a sum of the power consumption received from the one information processing apparatus and the power consumption already received from others of the information processing apparatuses that have transitioned to the second power state is not more than allowable power of the power supply apparatus, and permits the one information processing apparatus to execute the second processing step when the sum is not more than the allowable power.

11. The information processing system according to claim 9, further comprising a power supply apparatus that supplies power in common to the plurality of information processing apparatuses, wherein said each information processing apparatus further executes, as the processing sequence, a power-off processing sequence that makes said each information processing apparatus transition from the second power state to the first power state, wherein said each management apparatus includes a storage device that stores a first subtraction value obtained by subtracting a sum of the power consumption received from information processing apparatuses that were permitted to execute the second processing step from allowable power of the power supply apparatus, in operating as the operation system, and wherein the management apparatus operating as the operation system determines, when receiving the power consumption from one information processing apparatus of the plurality of information processing apparatuses during execution management of the start-up processing sequence in the one information processing apparatus, whether or not a second subtraction value obtained by subtracting the power consumption received from the one information processing apparatus from the first subtraction value stored in the storage device is not less than zero, and when the second subtraction value is not less than zero, permits the one information processing apparatus to execute the second processing step, and updates the first subtraction value stored in the storage device with the second subtraction value, and updates the first subtraction value stored in the storage device with a value obtained by adding the power consumption received from the one information processing apparatus to the first subtraction value, when permitting the one information processing apparatus to transition to the first power state during management of the power-off processing sequence in the one information processing apparatus.

12. A management apparatus that manages execution of a processing sequence in an information processing apparatus, the management apparatus comprising a processor configured to execute a procedure including:

receiving state information indicating a progress state of the processing sequence from another management apparatus whenever said another management apparatus receives the state information from the information processing apparatus during the execution management of the processing sequence by said another management apparatus;

acquiring the state information from the information processing apparatus when taking over execution management processing that makes the information processing apparatus execute processing steps included in the processing sequence in predetermined order from another management apparatus;

comparing, when taking over the execution management of the processing sequence from said another management apparatus, the state information acquired from the information processing apparatus with the state information already received from said another management apparatus, to determine whether or not the processing steps are executed in the predetermined order in the information processing apparatus; and making the information processing apparatus continue execution of an unexecuted processing step of the processing sequence when the comparing results in a determination that the processing steps are executed in the predetermined order in the information processing apparatus.

13. A management method for managing execution of a processing sequence in an information processing apparatus, the management method comprising:

managing, by a first management apparatus that operates as an operation system out of a plurality of management apparatuses, execution of the processing sequence by making the information processing apparatus execute processing steps included in the processing sequence in predetermined order;

executing, by the first management apparatus, first reception processing that receives state information indicating a progress state of the processing sequence from the information processing apparatus whenever a processing step of the processing sequence is executed, executing, by a second management apparatus that operates as a standby system, second reception processing that receives the state information from the first management apparatus whenever the first management apparatus receives the state information from the information processing apparatus in the first reception processing during the execution management of the processing sequence, acquiring, by the second management apparatus when taking over the execution management of the processing sequence from the first management apparatus, the state information from the information processing apparatus when a management apparatus;

comparing, by the second management apparatus when taking over the execution management of the processing sequence from the first management apparatus, the state information acquired from the information processing apparatus with the state information already received from the first management apparatus in the second reception processing, to determine whether or not the processing steps are executed in the predetermined order in the information processing apparatus, and making, by the second management apparatus, the information processing apparatus continue execution of an unexecuted processing step of the processing sequence when the comparing results in a determination that the processing steps are executed in the predetermined order in the information processing apparatus.

* * * * *